(12) United States Patent  (10) Patent No.: US 11,907,480 B2
Kocovski et al.  (45) Date of Patent: Feb. 20, 2024

(54) TOUCH DEVICE

(71) Applicant: Flatfrog Laboratories AB, Lund (SE)

(72) Inventors: Aleksander Kocovski, Malmo (SE); Hakan Bergstrom, Torna-Hallestad (SE); Jens Thorvinger, Lund (SE)

(73) Assignee: FlatFrog Laboratories AB, Lund (SE)

(*) Notice: Subject to any disclaimer, the term of this patent is extended or adjusted under 35 U.S.C. 154(b) by 0 days.

(21) Appl. No.: 18/342,674

(22) Filed: Jun. 27, 2023

(65) Prior Publication Data

US 2023/0341976 A1 Oct. 26, 2023

Related U.S. Application Data

(63) Continuation of application No. 18/103,118, filed on Jan. 30, 2023, which is a continuation of application
(Continued)

(30) Foreign Application Priority Data

Dec. 7, 2016 (SE) .................... 1630294-5

(51) Int. Cl.
G06F 3/042 (2006.01)
G06F 1/16 (2006.01)
G06F 3/041 (2006.01)

(52) U.S. Cl.
CPC ............. G06F 3/0421 (2013.01); G06F 1/16 (2013.01); G06F 1/1652 (2013.01); G06F 3/041 (2013.01);
(Continued)

(58) Field of Classification Search
CPC .......... G06F 1/1652; G06F 3/041; G06F 1/16; G06F 3/0421; G06F 2203/04102; G06F 2203/04103
See application file for complete search history.

(56) References Cited

U.S. PATENT DOCUMENTS 8,780,066 B2 7/2014 Christiansson et al.
8,816,991 B2 8/2014 Miller et al.
(Continued)

FOREIGN PATENT DOCUMENTS

CN 102117155 7/2011
CN 203386188 U 1/2014
(Continued)

OTHER PUBLICATIONS

Petition for Inter Partes Review Under 37 C.F.R. § 42.100, In the Inter Partes Review of U.S. Pat. No. 11,281,335, Oct. 6, 2023 (130 pages).
(Continued)

Primary Examiner — Vinh T Lam
(74) Attorney, Agent, or Firm — Finnegan, Henderson, Farabow, Garrett & Dunner, LLP

(57) ABSTRACT

An assembly for holding and controlling curvature of a glass plate for an optical touch sensitive system is described. The assembly comprising a first frame element extending in a first plane and configured to extend at least partially around a panel; at least one second frame element extending in a second plane and forming a support portion for the plate, and at least one spacing element positioned at least partially between the support portion and the first frame element. The spacing element us configured to control a curvature of the first frame element and wherein the at least one second frame element is configured to engage the plate at the support portion, is attached to the first frame element, and is tiltable, by controlling the curvature of the first frame element with said spacing element, to control a curvature of the plate.

18 Claims, 54 Drawing Sheets

Related U.S. Application Data

No. 17/020,489, filed on Sep. 14, 2020, now Pat. No. 11,579,731, which is a continuation of application No. 16/706,438, filed on Dec. 6, 2019, now Pat. No. 10,775,935, which is a continuation of application No. 16/403,283, filed on May 3, 2019, now Pat. No. 11,281,335, which is a continuation of application No. 16/190,907, filed on Nov. 14, 2018, now Pat. No. 10,282,035, which is a continuation of application No. PCT/SE2017/051233, filed on Dec. 7, 2017.

(52) U.S. Cl.
CPC .............. *G06F 2203/04102* (2013.01); *G06F 2203/04103* (2013.01)

(56) References Cited

U.S. PATENT DOCUMENTS

| | | | |
|---|---|---|---|
| 9,207,800 B1 | 12/2015 | Eriksson et al. | |
| 9,262,014 B2* | 2/2016 | Lee | G03B 21/10 |
| 9,280,237 B2 | 3/2016 | Kukulj | |
| 9,291,845 B2 | 3/2016 | Shin et al. | |
| 9,733,765 B2* | 8/2017 | Cho | G06F 3/0412 |
| 9,839,145 B2 | 12/2017 | Ryu et al. | |
| 9,857,915 B2* | 1/2018 | Benko | G06F 3/0421 |
| 9,983,626 B2 | 5/2018 | Cao et al. | |
| 10,048,806 B2* | 8/2018 | Lin | G06F 3/0386 |
| 10,261,639 B2* | 4/2019 | Lee | G06F 3/0446 |
| 10,496,226 B2* | 12/2019 | Sugiyama | G02B 6/0065 |
| 10,775,935 B2 | 9/2020 | Kocovski et al. | |
| 10,860,142 B1* | 12/2020 | Northcott | G02B 6/04 |
| 11,281,335 B2 | 3/2022 | Kocovski et al. | |
| 11,579,731 B2* | 2/2023 | Kocovski | G06F 3/041 |
| 2012/0223916 A1 | 9/2012 | Kukulj | |
| 2013/0044073 A1 | 2/2013 | Christiansson et al. | |
| 2013/0234955 A1* | 9/2013 | Takano | G06F 3/0421 345/173 |
| 2013/0342493 A1* | 12/2013 | Crow | G06F 3/0425 345/173 |
| 2015/0261339 A1* | 9/2015 | Pettersson | G06F 3/0428 345/175 |
| 2016/0239153 A1* | 8/2016 | Holmgren | G02B 6/0008 |
| 2016/0295711 A1 | 10/2016 | Ryu et al. | |
| 2016/0334942 A1 | 11/2016 | Wassvik | |
| 2017/0115758 A1* | 4/2017 | Lee | G06F 3/0445 |
| 2017/0123257 A1 | 5/2017 | Zhao | |
| 2017/0308236 A1* | 10/2017 | Lee | G06F 3/04182 |
| 2019/0235701 A1 | 8/2019 | Han et al. | |

FOREIGN PATENT DOCUMENTS

| | | |
|---|---|---|
| CN | 104808843 A | 7/2015 |
| KR | 2018-0037749 | 4/2018 |
| WO | WO2018066761 | 4/2018 |

OTHER PUBLICATIONS

Declaration of Darran Cairns, Ph.D. Under 37 C.F.R. §42.100 Regarding U.S. Pat. No. 11,281,335, Oct. 6, 2023 (176 pages).
Petition for Inter Partes Review Under 37 C.F.R. § 42.100, In the Inter Partes Review of U.S. Pat. No. 10,775,935, Oct. 6, 2023 (125 pages).
Declaration of Darran Cairns, Ph.D. Under 37 C.F.R. §42.100 Regarding U.S. Pat. No. 10,775,935, Oct. 6, 2023 (170 pages).

\* cited by examiner

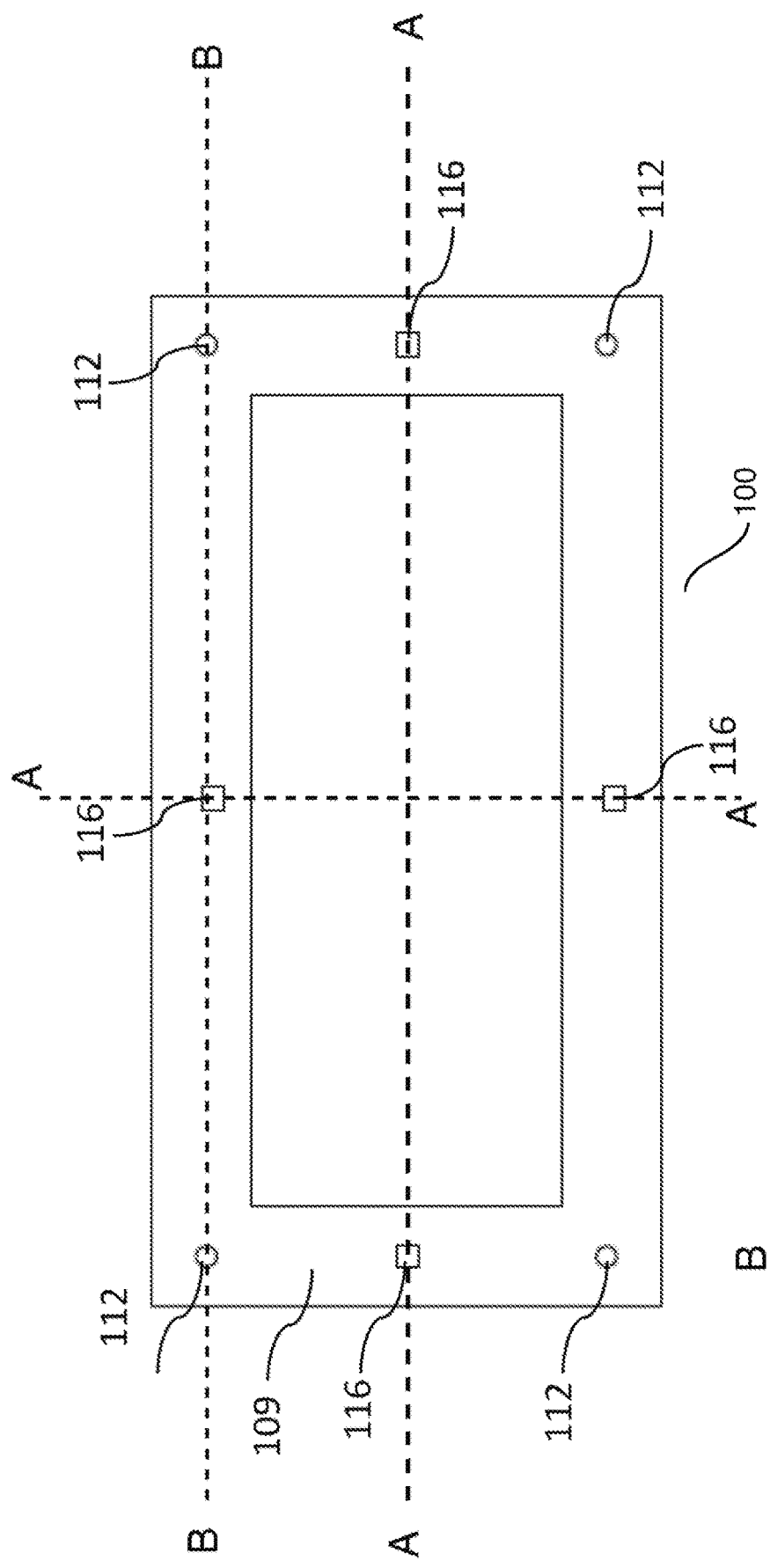

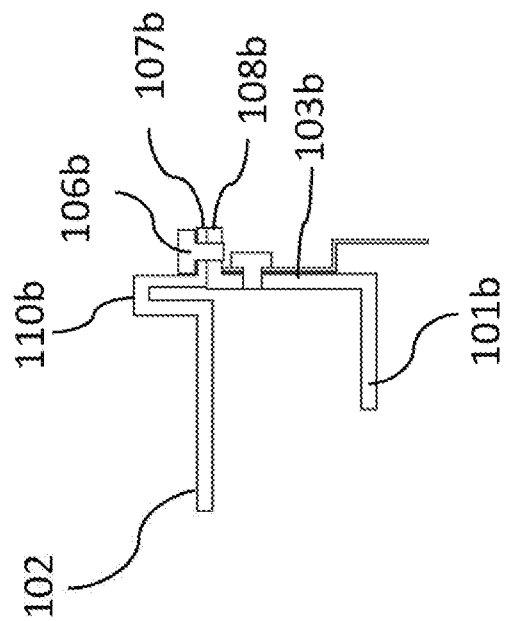
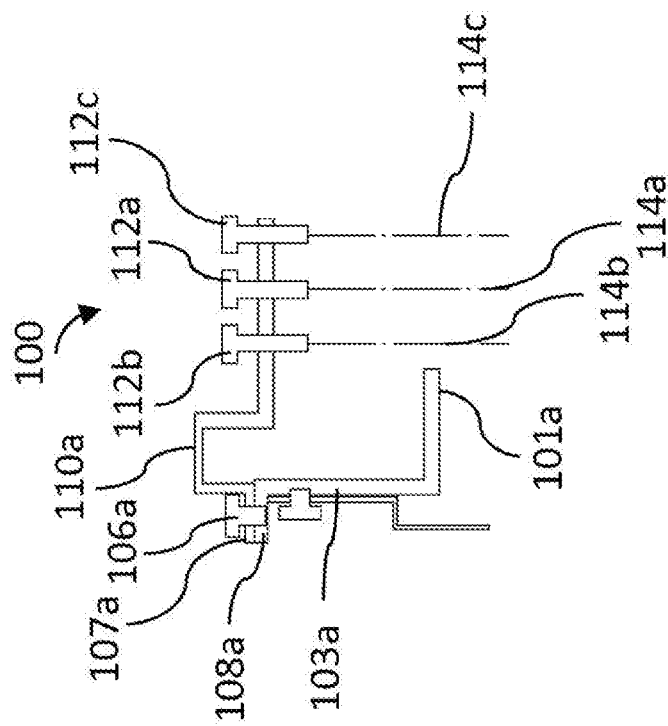
Figure 2a

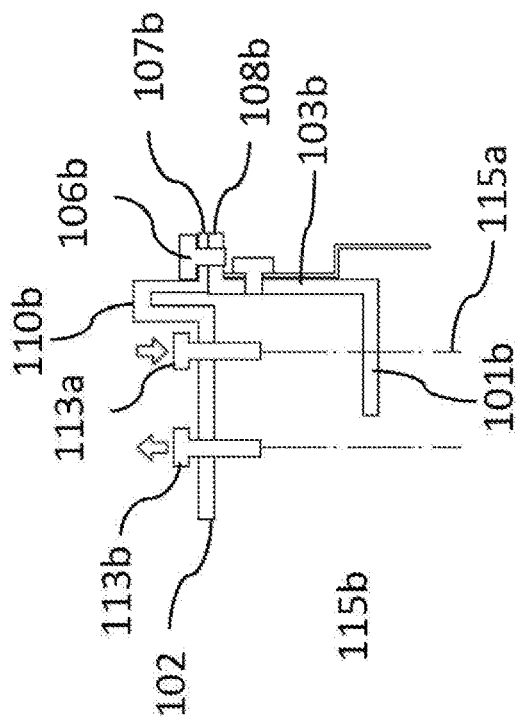
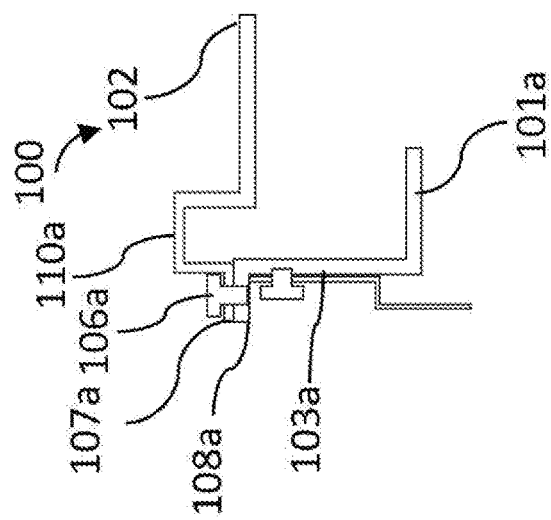
Figure 2b

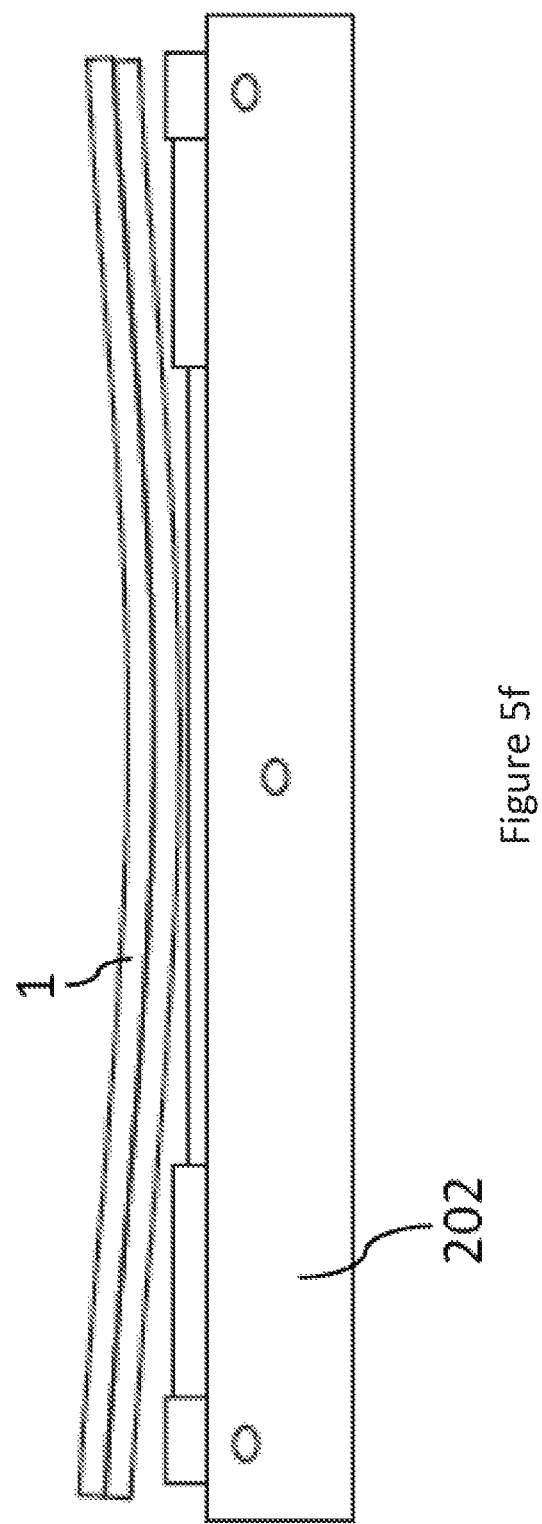

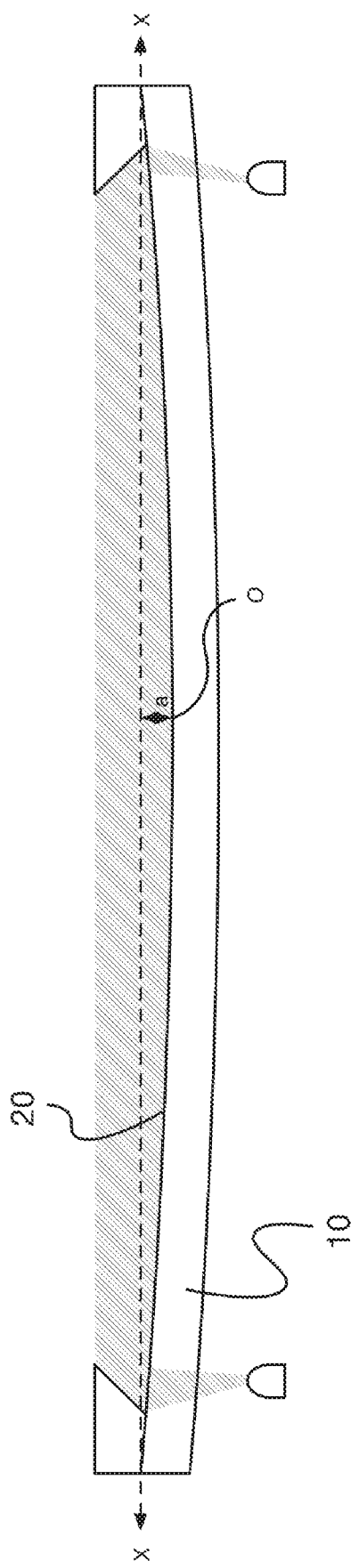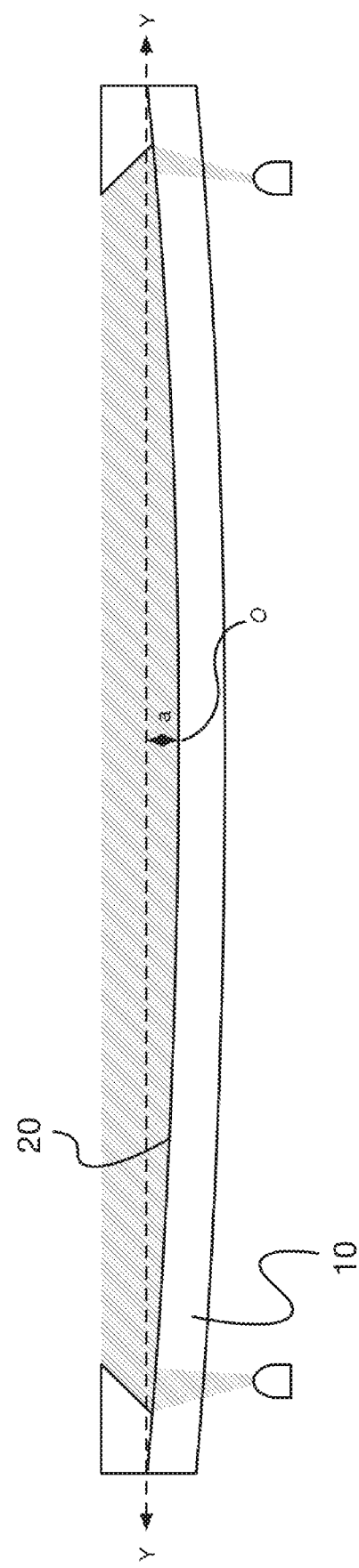
Figure 12c
Figure 12d

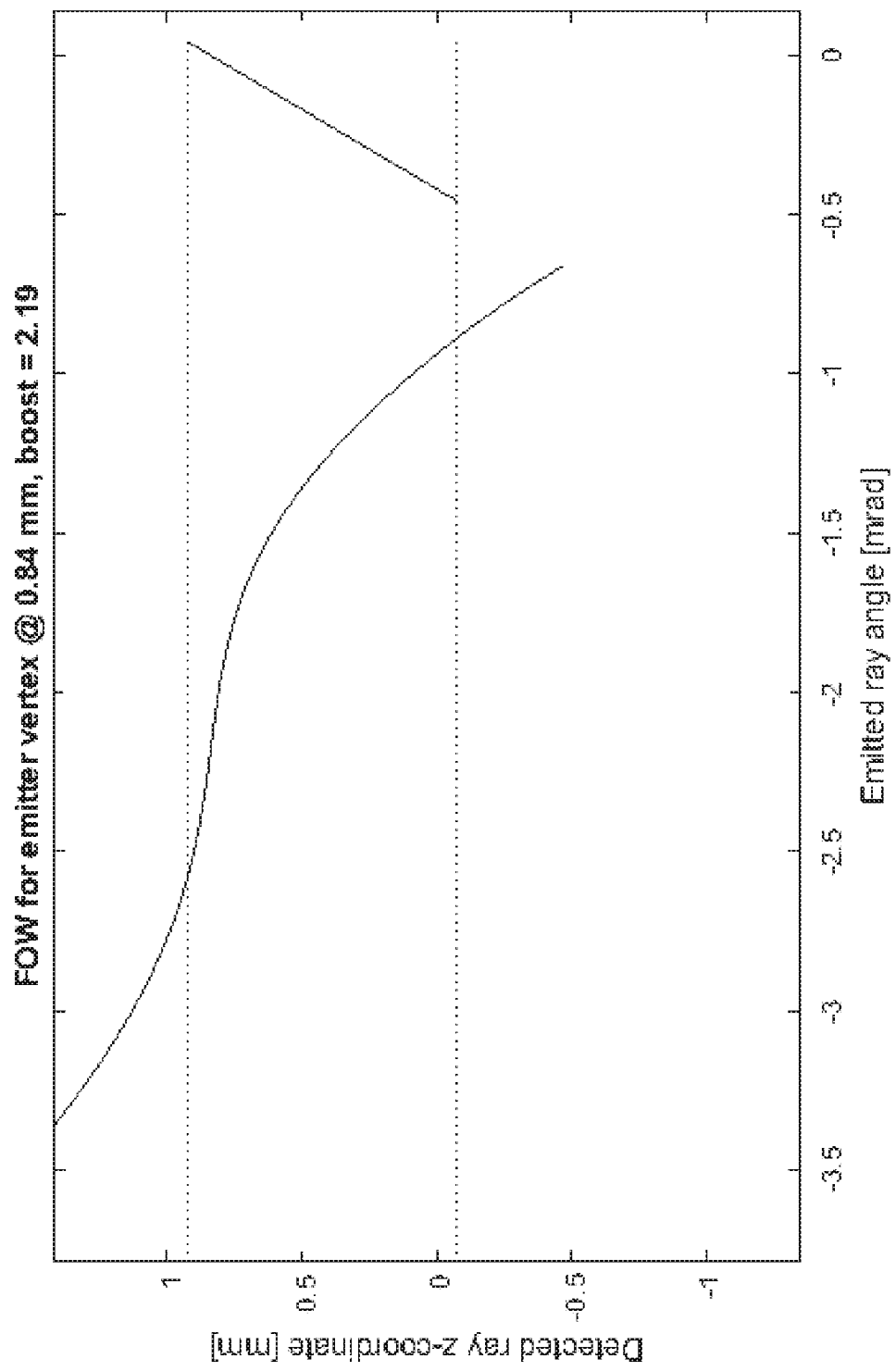

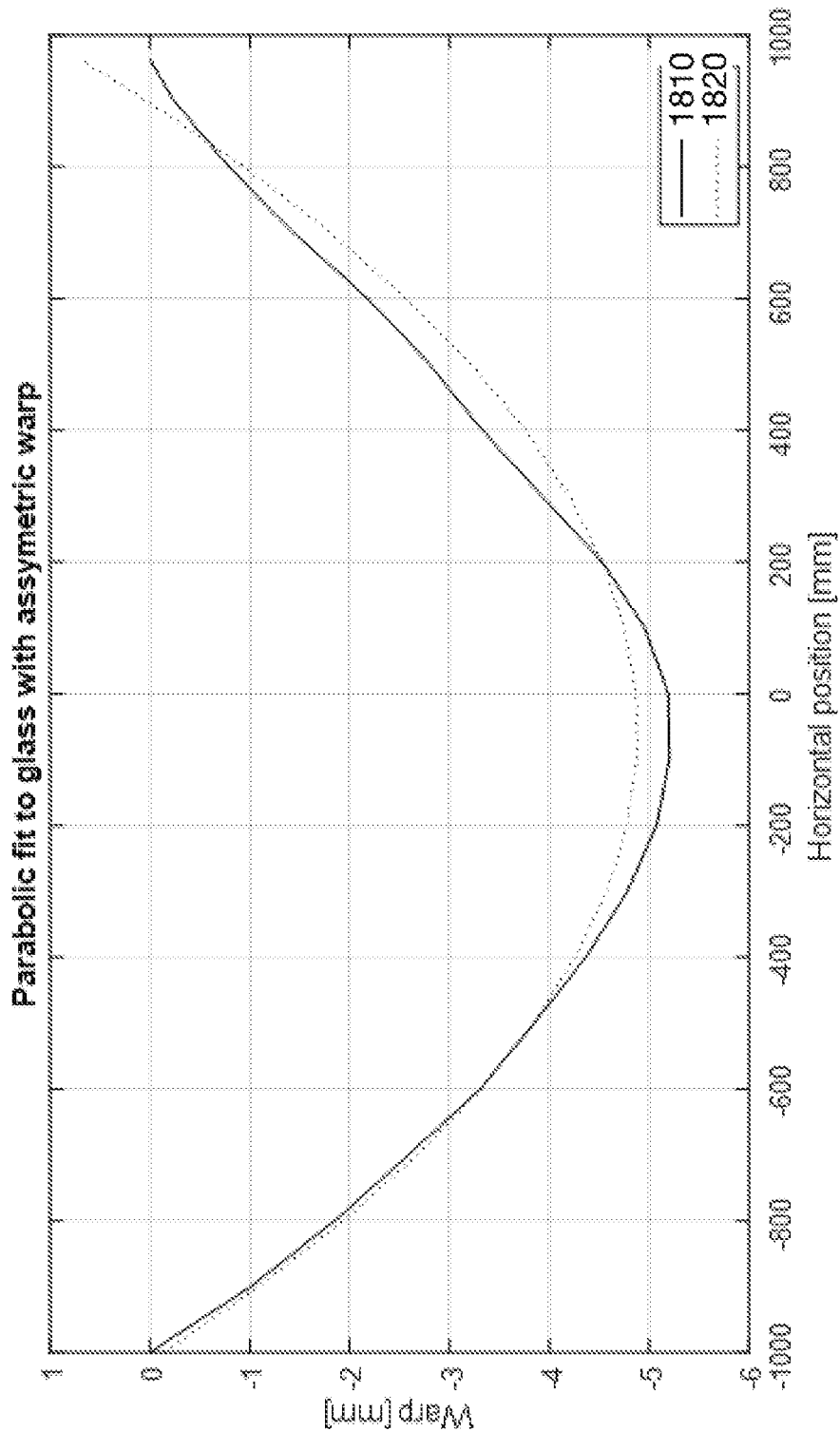

TOUCH DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

This invention relates in general to the field of optical touch sensitive systems. More particularly, the invention relates to a curved plate and an assembly for holding a plate of the system, such as a glass plate, relative to a panel such that curvature of the plate is controlled. The invention also relates to a method for assembling a plate of an optical touch sensitive system with a panel (such as a display panel) in such a way that curvature is controlled.

Background of the Invention

In one category of touch sensitive panels known as above surface optical touch systems and known from e.g. U.S. Pat. No. 4,459,476, a plurality of optical emitters and optical receivers are arranged around the periphery of a touch surface to create a grid of intersecting light paths above the touch surface. Each light path extends between a respective emitter/receiver pair. An object that touches the touch surface will block certain ones of the light paths. Based on the identity of the receivers detecting a blocked light path, a processor can determine the location of the intercept between the blocked light paths. This type of system is only capable of reliably detecting the location of one object (single-touch detection). Further, the required number of emitters and receivers, and thus cost and complexity, increases rapidly with increasing surface area and/or spatial resolution of the touch panel.

In a variant, e.g. shown in WO2006/095320, each optical emitter emits a beam of light that diverges across the touch surface, and each beam is detected by more than one optical receiver positioned around the periphery of the touch surface.

These systems typically direct light to travel across the surface of the touch surface at a height of up to 5 mm.

Other above surface touch sensitive systems use tomographic touch imaging for sensing a touch, e.g. as described in WO2016/130074. Such systems allow for directing the light much closer to the touch surface, which in turn allows for significant improvements in accuracy and requires a lower light budget. The light is typically directed at a height of up to about 1 mm above the plate.

Typically, the touch surface is a glass plate. In systems where the light is directed closer to the touch surface, distortions in the plate have a disproportionally large effect on the light signal. Therefore, glass plates as used in previously known above surface optical touch systems are unsuitable when the light is transmitted closer to the plate, since the accuracy of the system is impaired by the distortions in the plate.

Additionally, a frame for assembly of the plate of the optical touch sensitive system and a panel, such as an LCD panel, may introduce distortion in the form of uncontrolled warpage, i.e. a twist or curve in the plate is introduced even if it is usually flat. The uncontrolled warpage may even block the light transmitted across the plate. This is due to uncontrolled twisting of the frame as such when it is attached to the panel.

Although not described in relation to touch systems, methods of minimizing glass warpage are known from the window industry and from the display panel industry. Such solutions include pre-bent glass in order to control warpage. However, such solutions are unsuitable/insufficient for touch sensitive systems since they typically require bulky frames at the border of the glass and/or pressure points closer to the center of the panel where force may be applied to control the shape of the glass. These solutions are unsuitable where a minimal/lightweight border bezel is required, and no supporting objects may touch the glass further in than at the borders. Additionally, pre-bent glass is expensive and fragile to transport.

Therefore, an improved frame assembly for holding a plate of an optical touch sensitive system relative to a panel would be advantageous and in particular allowing for improved precision, increased compactness, cost-effectiveness, and/or controlled curvature would be advantageous. Further, a touch panel having a shape conducive to transmitting as much light from the emitters as possible to the detectors is needed.

SUMMARY OF THE INVENTION

Accordingly, embodiments of the present invention preferably seek to mitigate, alleviate or eliminate one or more deficiencies, disadvantages or issues in the art, such as the above-identified, singly or in any combination by providing an assembly, a method for assembling, and a kit of frame elements according to the appended patent claims.

A first embodiment of the invention describes an assembly for holding and controlling curvature of a plate for an optical touch sensitive system, comprising a first frame element extending in a first plane and configured to extend at least partially around a panel; at least one second frame element extending in a second plane and forming a support portion for the plate, and at least one spacing element positioned at least partially between the support portion and the first frame element, the spacing element being configured to control a curvature of the first frame element, and wherein the at least one second frame element is configured to engage the plate at the support portion, is attached to the first frame element, and wherein the shape and/or position of the second frame element is controlled by the curvature of the first frame element with said spacing element, to control a curvature of the plate.

A second embodiment of the invention describes a method for assembling a panel and a plate for an optical touch sensitive system, comprising: providing a first frame element extending in a first plane and configured to extend at least partially around a panel; providing at least one second frame element forming a support portion for the plate; supporting the plate by the support portion; attaching the second frame element to the first frame element such that the support portion extends at least partially in a second plane generally opposite at least a portion of the first frame element and is spaced apart from the first plane; and controlling a curvature of the first frame element with a spacing element attached to the first frame element and thereby tilting the support portion to control a curvature of the plate.

A third embodiment of the invention describes a kit of frame elements for assembling a panel and a plate for a touch sensitive system, comprising: a first frame element extending in a first plane; at least one second frame element forming a support portion for the plate and being attachable to the first frame element, and a spacing element adjustably attachable to the first frame element; wherein at least a portion of the support portion is tiltable, by the spacing element, relative to the first frame element to extend in the second plane, which is curved.

Some embodiments of the invention provide for controlling curvature of a plate for an optical touch sensitive system such that it does not occur when the plate is assembled with a panel. This prevents distortion in the plate from affecting a light signal transmitted across the plate, which in turn allows improvements in accuracy and lower light budget of the system. Additionally, or alternatively, embodiments provide for controlling curvature such that the field of view, for a detector receiving light from a light emitter of the touch sensitive system, is increased compared to a substantially flat plate. Again, the improved field of view provides for improved accuracy of the touch sensitive system and allows for a better light budget. Furthermore, embodiments provide for an assembly that is compact at the same time as curvature may be controlled. Also, the curvature may be controlled without contacting the center of the plate.

A fourth embodiment of the invention describes a touch sensing apparatus, comprising a touch surface; a set of emitters arranged around the touch surface to emit first beams of light to propagate across the touch surface, a set of light detectors arranged around the touch surface to receive light from the first set of emitters, wherein each light detector is arranged to receive light from more than one emitter; a processing element configured to determine, based on output signals of the set of light detectors, the position of an object on the touch surface, wherein the touch surface is curved in a first axis according to a first parabola.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIG. 1 is a top view of the first frame element showing cross-sectional axes A-A and B-B;

FIGS. 2*a*-2*d* are cross-sectional views of embodiments of assemblies;

FIGS. 5*a*-5*h* are side views and perspective views of an embodiment of the assembly comprising a screw arrangement for configuring frame shape.

FIG. 12*c* shows a section view along the x-axis of an optical touch system with a touch surface having a curved profile in the x-axis and a curved profile in the y-axis;

FIG. 12*d* shows a section view along the y-axis of an optical touch system with a touch surface having a curved profile in the x-axis and a curved profile in the y-axis;

FIG. 17b shows a graph of light emitted from a point at an edge of a curved touch surface and received at a detector at an opposite edge of the touch surface with respect to the angle of the emitter light;

FIG. 18a shows a curvature of a real touch surface vs a parabolic curved surface along an x-axis;

FIG. 20b shows curvature of a touch surface along an x-axis according to the embodiment of FIG. 20a;

FIG. 20c shows curvature of a touch surface along a y-axis according to the embodiment of FIG. 20a;

FIG. 20d shows curvature of a touch surface along a diagonal line according to the embodiment of FIG. 20a;

FIG. 21b shows curvature of a touch surface along an x-axis line according to the embodiment of FIG. 21a;

FIG. 21c shows curvature of a touch surface along a y-axis line according to the embodiment of FIG. 21a;

FIG. 21d shows curvature of a touch surface along a diagonal line according to the embodiment of FIG. 21a.

DETAILED DESCRIPTION OF THE PREFERRED EMBODIMENT

Figure 2C:
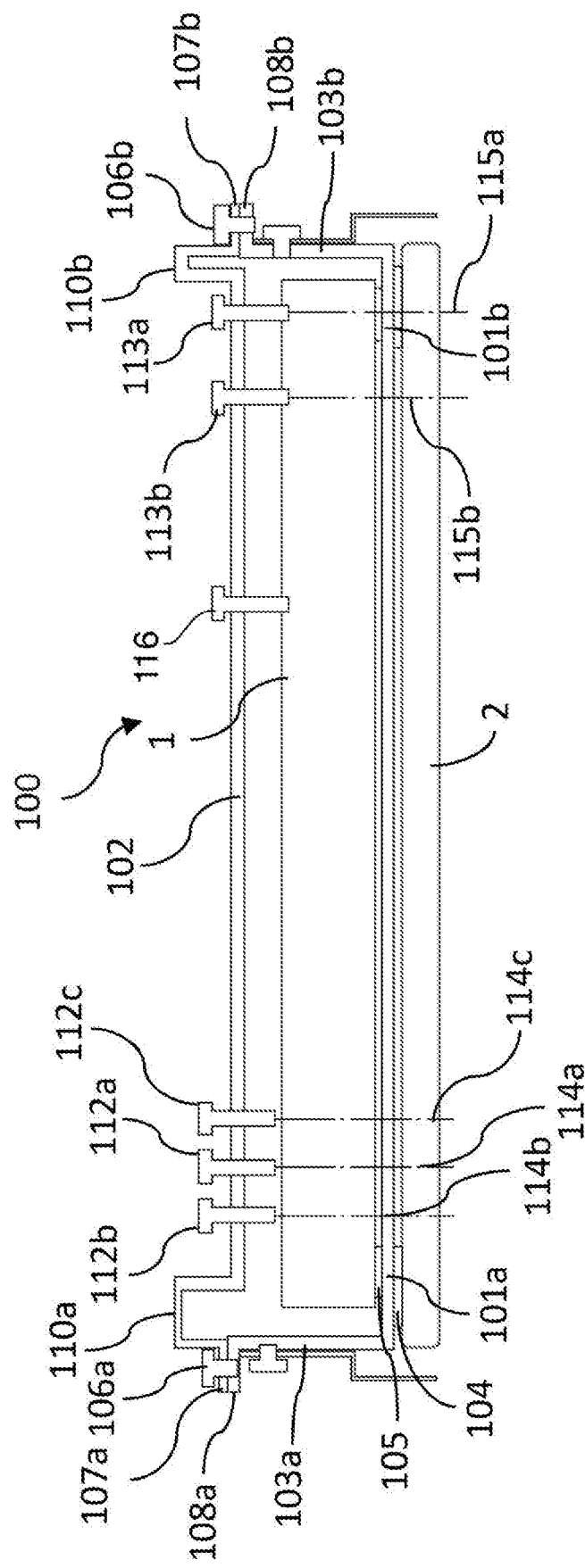

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

In optical touch sensitive systems, a plate 2 of the system, such as a glass plate may be arranged opposite a panel 1, such as an LCD panel or additional frame. The plate 2 is normally substantially flat. The perimeter of the plate 2 after integration is a concern: the four sides/edges of the plate 2 must all be plane or slightly concave as seen from the touch surface, i.e. the side of the plate 2 above which light is transmitted. An aspect of this is to ensure that the mechanical parts that hold or support the perimeter of the plate 2 are free from convexity. Sometimes, there are several components that are involved in holding the plate 2 (back cover, carriers, edge cover, screw bosses etc.) The stiffer component of the assembly, the more it will govern the final shape of the plate 2.

In prior art solutions, the frame that holds the plate 2 at the edge/perimeter may introduce some twist (the corners will not lay perfectly on a flat plane) to the plate. Twist may induce convexity along the plate diagonals and should thus be minimized or avoided. The twist tolerance depends, e.g., on glass specification, product, size, shape of integrated glass perimeter, and on how a VESA mount is attached.

FIG. 1 shows an embodiment of a frame assembly 100, 200 that prevents inducement of convexity along the plate, such as along the plate edges and/or diagonals. Some embodiments avoid convexity and may even induce concavity to further improve the touch system. Frame 109 is formed from first frame element 102. Attachment element 112 and spacing element 116 are described in the embodiments below.

According to some embodiments of the invention, an assembly 100, 200, which is configured to hold or support the plate 2 and the panel 1, applies a controlled force to the plate 2 such that curvature of the plate 2 is controlled. In the embodiments illustrated in FIGS. 2a-2c and 3a-3d, the force applies a torque to a support portion 101a, 101b for the plate 2. In the embodiments of FIGS. 4a-4c, the force is substantially straight and perpendicular to the plate 2. In the following, the embodiments of FIGS. 2a-2c, 3a-3d, 4a-4c, and 5a-5g will be described separately. However, these embodiments may be combined to provide further embodiments, such as the combination illustrated in FIGS. 6a-6c.

FIGS. 2a-2d illustrate embodiments wherein the frame assembly 100 comprises a first frame element 102 and at least one second frame element 103a, 103b. The first frame element 102 may form a rear bracket frame that extends at least partially over the backside of the panel 1. The second frame element 103a, 103b may form a holder or support bracket. Furthermore, second frame element 103a, 103b may extend along at least a portion of a perimeter of the plate 2 and/or the panel 1. Separate second frame elements 103a, 103b may extend at least partially along the perimeter of different sides of the plate 2 and/or panel 1. For example, two second frame elements 103a, 103b may extend along opposing perimeters of the plate 2 and/or panel 1. Alternatively, four second frame elements 103a, 103b may extend along the perimeter of the plate 2 and/or panel 1, i.e. one along each side of a rectangular plate 2 and/or panel 1.

As is illustrated in FIGS. 4a-4c, the panel 1 may be held between the first frame element 102 and the second frame element 103a, 103b. The plate 2 may be supported or held at a first side of a portion of the second frame element 103a, 103b forming the support portion 101a, 101b. The panel 1 may be held or supported by a second side of the support portion 101a, 101b, which forms a support portion for the panel 1. An adhesive 104, such as an adhesive tape, may be arranged between the support portion 101a, 101b and the plate 2. A gasket 105 may be arranged between the support portion 101a, 101b and the panel 1.

In one embodiment, elements 102, 103 (shown in the figure as comprising elements 103a and 103b) are formed from a single piece.

The second frame element 103a, 103b may be attached to the first frame element 102.

In the embodiments of FIGS. 2a-2c and 3a-3d, the second frame element 103a, 103b, is attached to the first frame element 102 by at least one attachment member 106a, 106b, such as a screw, a weld, a rivet etc. Therefore, the second frame element 103a, 103b may be rigidly attached to the first frame element 102.

The first frame element 102 may comprise a flange 107a, 107b that extends at the perimeter of the first frame element 102. Similarly, the second frame element 103a, 103b may comprise a flange 108a, 108b. When assembled, the flange 107a, 107b of the first frame element 102 may be arranged in abutment with the flange 108a, 108b of the second frame element 103a, 103b. The flange 107a, 107b of the first frame element 102 may be held together with the flange 108a, 108b of the second frame element 103a, 103b by the attachment member 106a, 106b.

The first frame element 102 may form a frame 109 (shown in FIG. 1) that extends in a first plane. The frame 109 is configured to extend at least partially around a first side of a panel 1. The first side of the panel 1 may be the backside of the panel 1. In some embodiments, the frame 109 has a width, such as 3-10 cm. The frame 109 may extend from the edges of the first side towards the center of the first side of the panel 1. Therefore, the frame 109 may be rectangular, and made from a single piece of material.

Figure 3A:
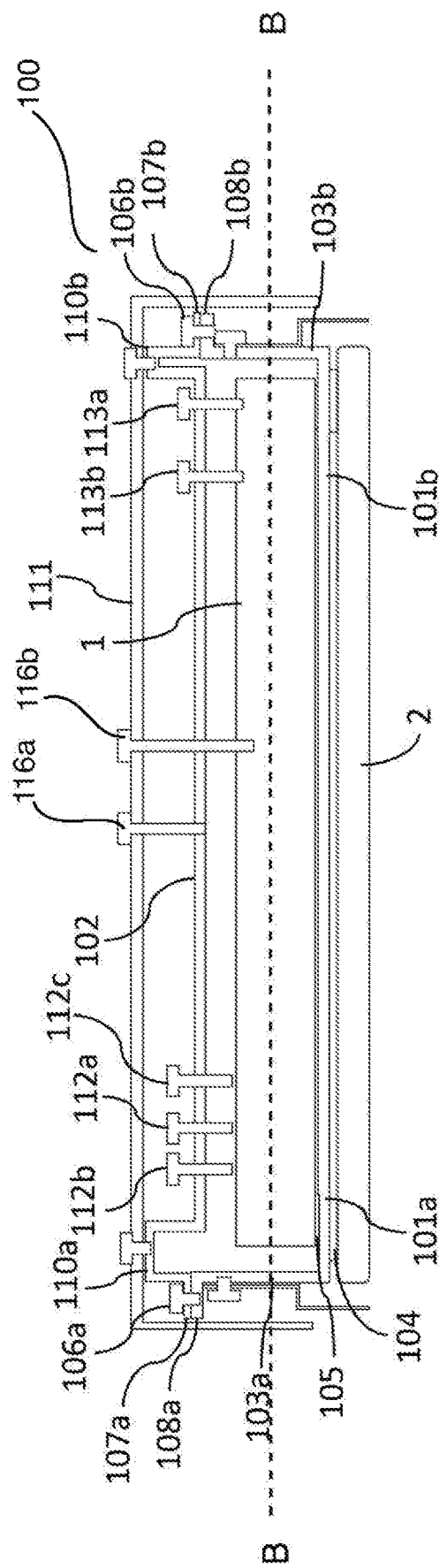
FIG. 3*a* is a schematic illustration showing the cross-section axis B-B of FIG. 1 of the assembly with the second frame element relative to the first frame element and holding the plate in a flat plane.
Figure 3B:
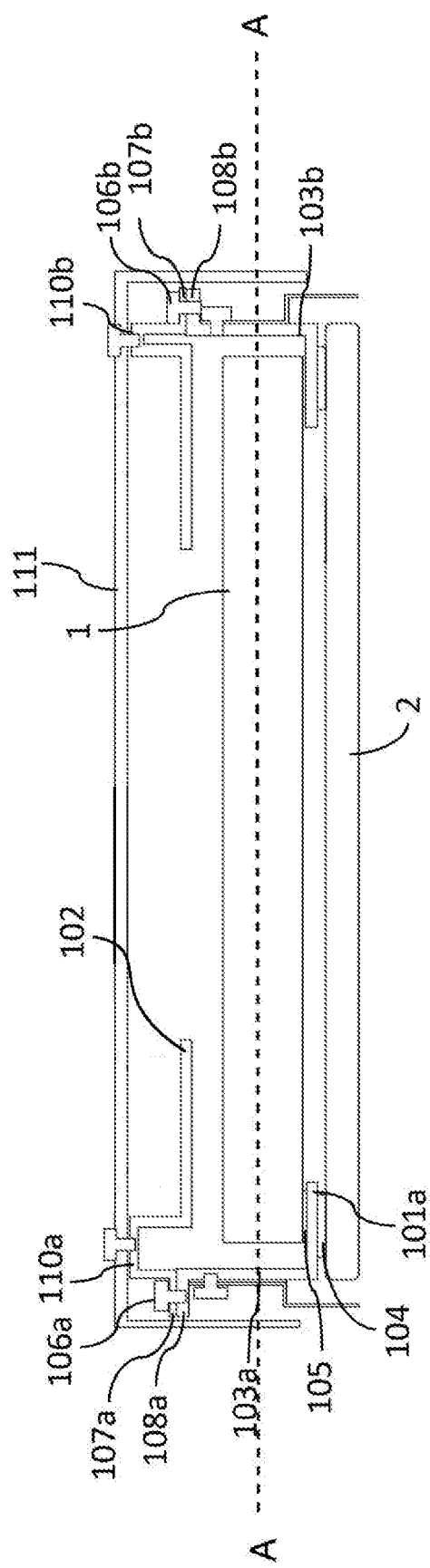
FIG. 3*b* is a schematic illustration showing the cross-section axis A-A of FIG. 1 of the assembly with the second frame element relative to the first frame element and holding the plate in a flat plane.
Figure 4A:
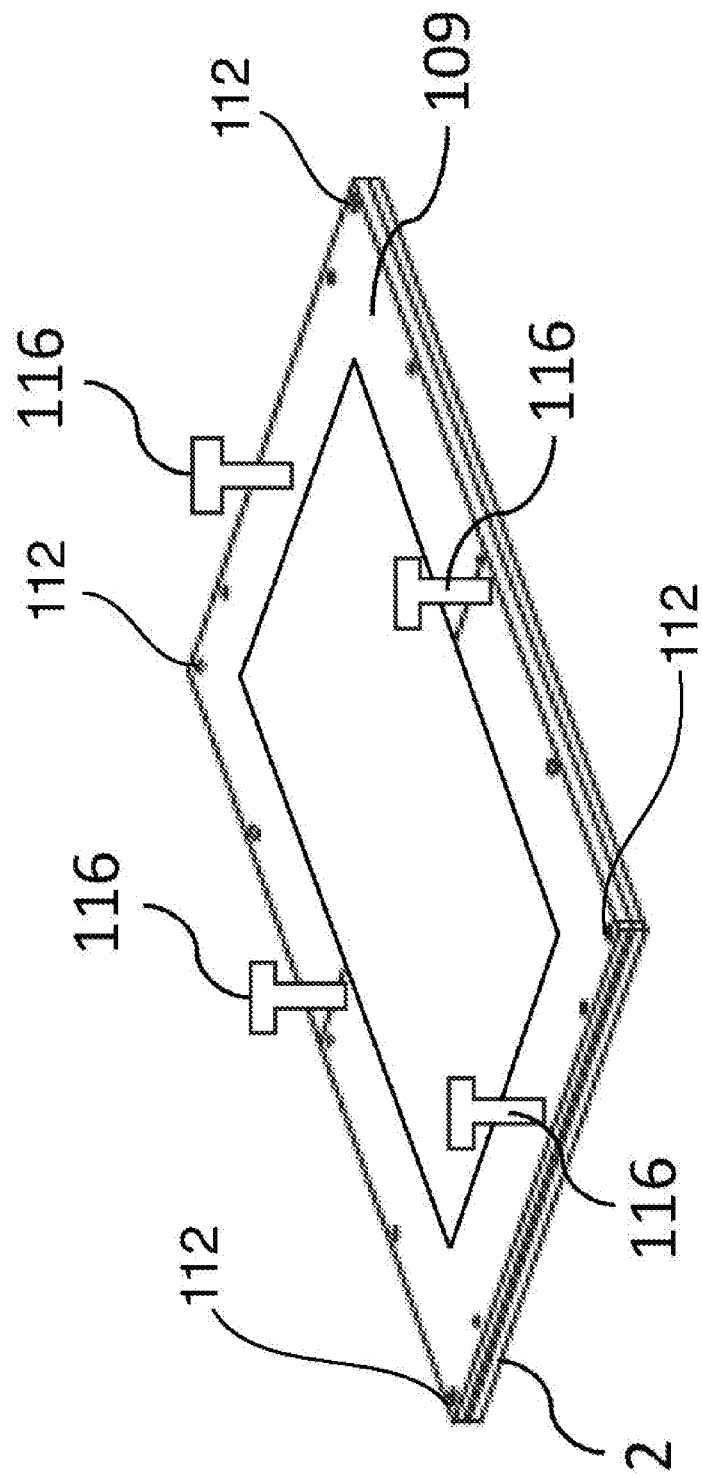
FIG. 4*a* is a perspective view of the first frame element.
Figure 4B:
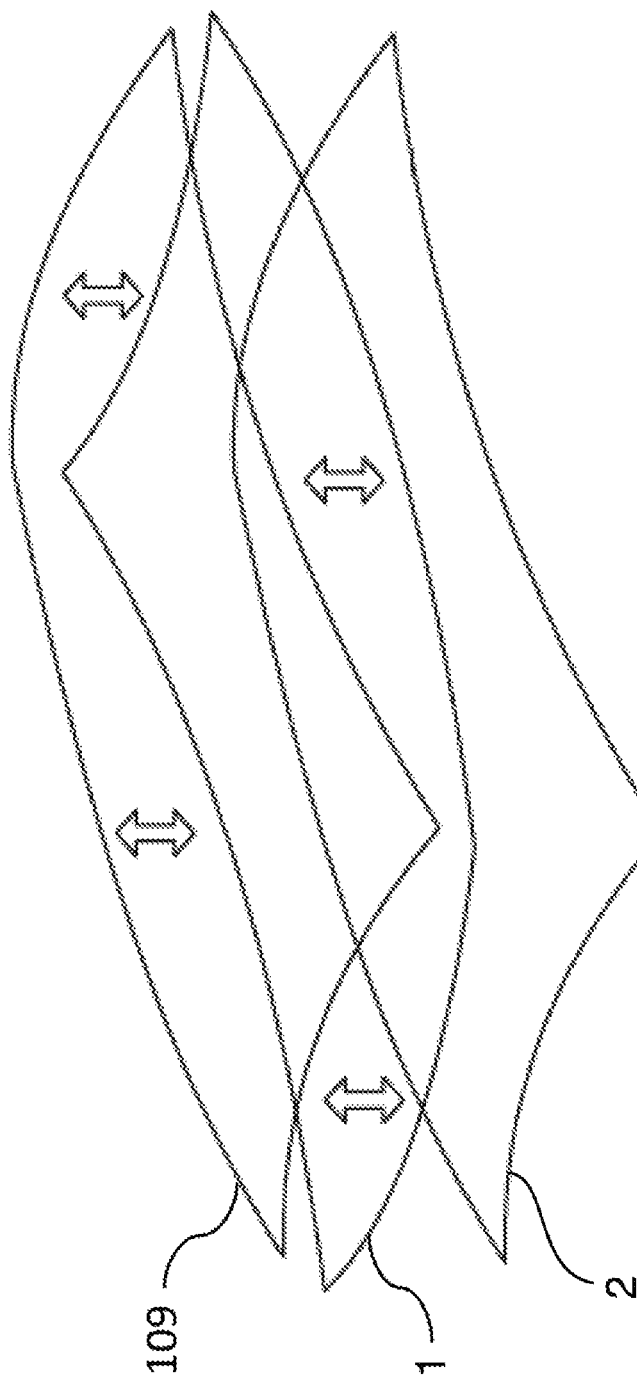
FIG. 4*b* is a schematic illustration of the panel in a convex shape and the frame of the first frame element in a concave shape, including plate 2 also controlled into a concave shape.
Figure 4C:
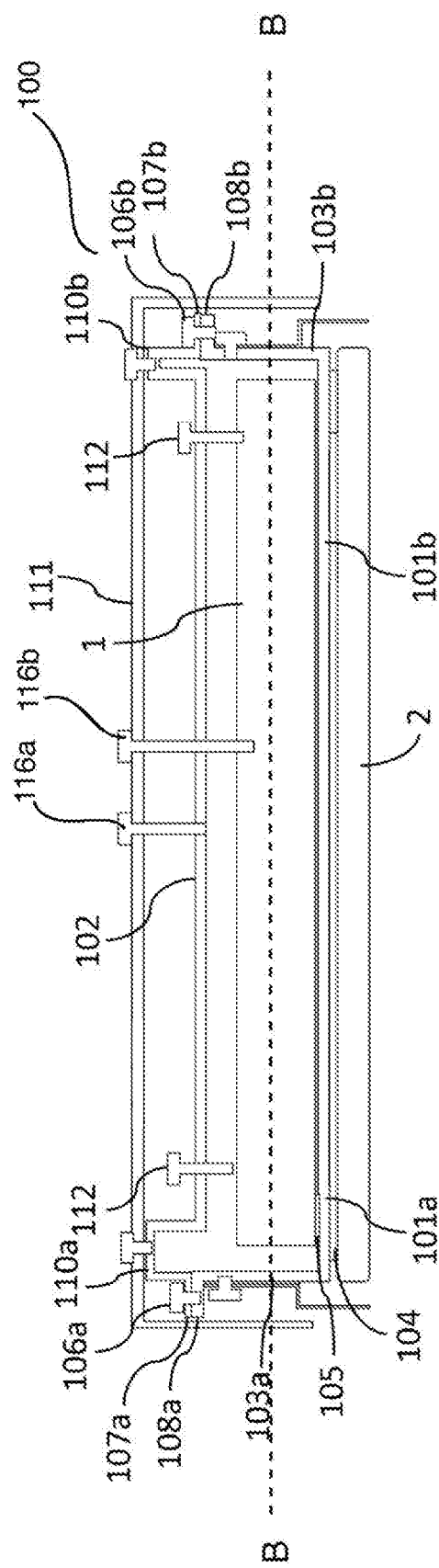
FIG. 4*c* is a side view showing screws 116*a* and 116*b*.

As is illustrated in FIGS. 3a and 3b, the assembly 100 may comprise at least one support area 110a, 110b for supporting a back cover 111. The support area 110a, 110b may extend in a plane that is substantially parallel to the first plane, in which the frame 109 extends. The support area 110a, 110b may be located further away from the support portion 101a, 101b of the second frame element 103a, 103b than the frame 109, such that the frame 109 and the back cover 111 are spaced apart. In the illustrated embodiment, the support area 110a, 110b is provided between the flange 107a, 107b and the frame 109 of the first frame element 102. The back cover 111 may be attached to the support area 110a, 110b, e.g. by attachment elements, such as screws.

In other embodiments, the support area 110a, 110b is provided by the flange 108a, 108b of the second frame element 103a, 103b. The flange 107a, 107b of the first frame element 102 may be connected to the second frame element 103a, 103b between the flange 108a, 108b and the support portion 101a, 101b of the second frame element 103a, 103b.

The second frame element 103a, 103b may form the support portion 101a, 101b. For example, the second frame element 103a, 103b may form an elongated member that is at least partly L-shaped in cross-section. When assembled, the second frame element 103a, 103b may extend along the perimeter of the panel 1, and wrap around the perimeter of the panel such that the support portion 101a, 101b extends at least partially in a second plane generally opposite the frame 109 and spaced apart from the first plane. Thereby the second frame element 103a, 103b is configured to extend at least partially at a second side of the panel 1, e.g. at a front side of the panel 1.

In some embodiments, the second frame element 103a, 103b has a first portion and a second portion. The first portion may be provided at an angle relative to the second portion. The second portion may form the support portion 101a, 101b and be configured to extend in the second plane opposite the frame 109. The first portion may extend between the second portion and the first frame element 102. Also, the first portion may extend along the edge or side surface of the plate 2 when assembled. The first frame element 102 may be connected to the first portion of the second frame element 103a, 103b. The first portion may be substantially perpendicular to the second portion.

Figure 3C:
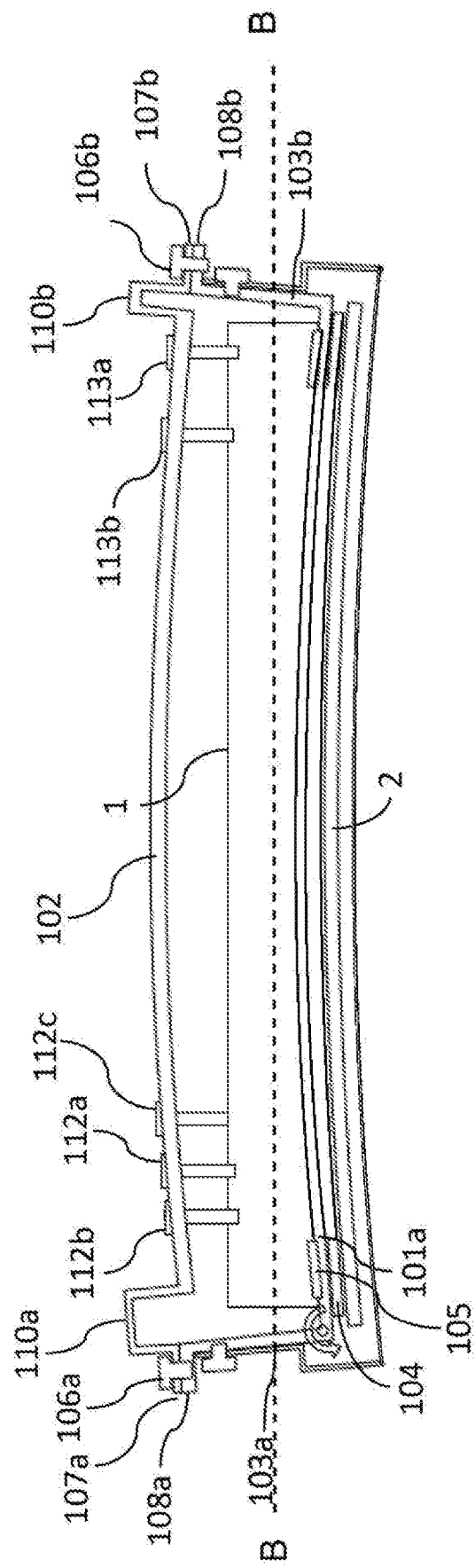
FIG. 3*c* is a schematic view (cross section) showing the cross-section axis B-B of FIG. 1 of the assembly with the second frame element warped relative to the first frame element and holding the plate in a curved plane that is concave.
Figure 3D:
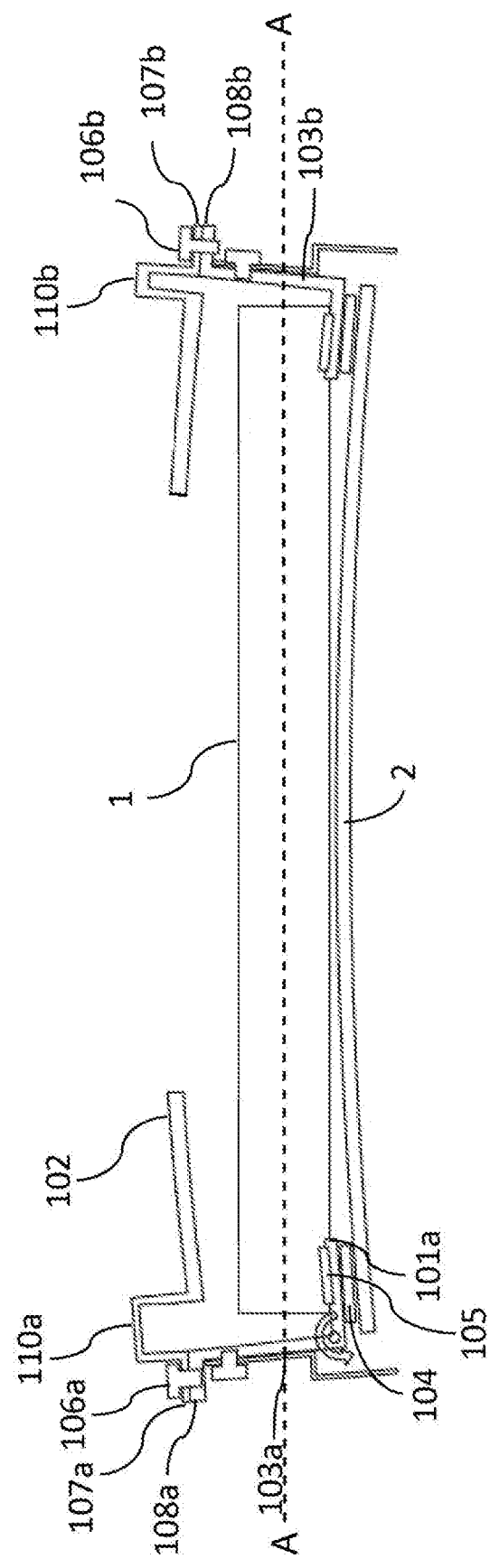
FIG. 3*d* is a schematic view (cross section) showing the cross-section axis A-A of FIG. 1 of the assembly with the second frame element warped relative to the first frame element and holding the plate in a curved plane that is concave.

As is illustrated in FIGS. 3a-3d, the first frame element 102 may be attached to the first portion of the second frame element 103a, 103b such they are fixed relative to each other. Furthermore, the second frame element 103 is tiltable relative to the first frame element 102. A force applied to the first frame element 102 is transferred to the second frame element 103 such that the support portion 101a, 101b is tilted towards the first frame element 102. Thus, a torque may control tilt of the second portion of the second frame element 103a, 103b, i.e. the support portion 101a, 101b that supports the plate 2, relative to the first frame element 102, which is illustrated with a curved arrow in FIGS. 3c and 3d. In some embodiments, the angle of tilt of the support portion 101a, 101b is controlled to be neutral, i.e. the angle of tilt of the support portion 101a, 101b is controlled such that it is substantially parallel with the panel 1 and/or controls the plate 2 to be in a flat plane, as is illustrated in FIGS. 3a and 3b. In other embodiments, the angle of tilt of the support portion 101a, 101b is controlled to be negative relative to the touch surface, i.e. the angle of tilt of the support portion 101a, 101b is controlled such that the free end of the support portion 101a, 101b is tilted towards the frame 109, as is illustrated in FIGS. 3c and 3d. In the latter case, the plate 2 is given a slightly concave shape, i.e. in the direction from the touch surface of the plate 2 towards the panel 1. In each of these cases curvature is controlled such that the field of view, for a detector receiving light from a light emitter of the touch sensitive system, is improved since convexity in the plate is avoided. Again, improved field of view provides for improved accuracy of the touch sensitive system and allows for lower light budget. Furthermore, since the support portion 101a, 101b only needs to extend a short distance over the plate 2 at the perimeter the assembly is compact at the same time as curvature may be controlled. Also, curvature may be controlled without contacting the center of the plate. When the concavity is applied, the sensitivity of the system may be even further improved.

FIGS. 2a-2d and 3a-3d illustrate embodiments of an attachment element 112 for attaching the first frame element 102 to the panel. A plurality of attachment elements 112 (e.g. as shown in triplicate as elements 112a, 112b, and 112c) may be arranged around the frame 109, such as at each corner of the frame 109, which is illustrated as circles in FIG. 4a. Each attachment element may comprise a group of screws 112a, 112b, 112c, 113a, 113b. Each screw may be arranged in a hole of the frame 109, which may be threaded. Each attachment element may comprise at least two screws 112a, 112b, 112c, 113a, 113b. At least one of the screws 112a, 113a may be arranged to displace the frame 109 away from panel 1, which is indicated with an arrow in FIG. 2d e.g. by having a thread in the frame 109 and pushing on the panel 1. At least one other of the screws 112b, 112c, 113b may be arranged to displace the frame 109 towards the panel 1, which is also indicated with an arrow in FIG. 2d. e.g. by having a thread in the panel and a hole in frame 109.

FIG. 2a illustrates an embodiment wherein each attachment element comprises at least three screws 112a, 112b, 112c. All three screws 112a, 112b, 112c are arranged closer to a center of the first frame element 102 than a perimeter of the support portion 101a, 101b, i.e. an imaginary extension 114a, 114b, 114c of the longitudinal axis of each screw 112a, 112b, 112c passes outside the support portion 101a, 101b when viewed in cross-section, as is illustrated in FIG. 2a. In the illustrated embodiment, a first screw 112a is arranged between a second screw 112b and a third screw 112c. FIG. 2a only illustrates one group of screws. However, a group of screws may be arranged at any location around the frame 109 to attach the first frame element 102 to the panel 1.

FIG. 2b illustrates an embodiment wherein each group of screws consists of only two screws 113a, 113b. A first screw 113a is arranged opposing the support portion 101a, 101b, i.e. an imaginary extension 115a of the longitudinal axis of the first screw 113a passes through the support portion 101b when viewed in cross-section, such as through the center thereof, as is illustrated in FIG. 2b. A second screw 113b of the two screws is arranged closer to a center of the first frame element 102 than a perimeter of the support portion 101b, i.e. an imaginary extension 115b of the longitudinal axis of the first screw 113b passes outside the support portion 101b when viewed in cross-section, as is illustrated in FIG. 2b.

Figure 2D:
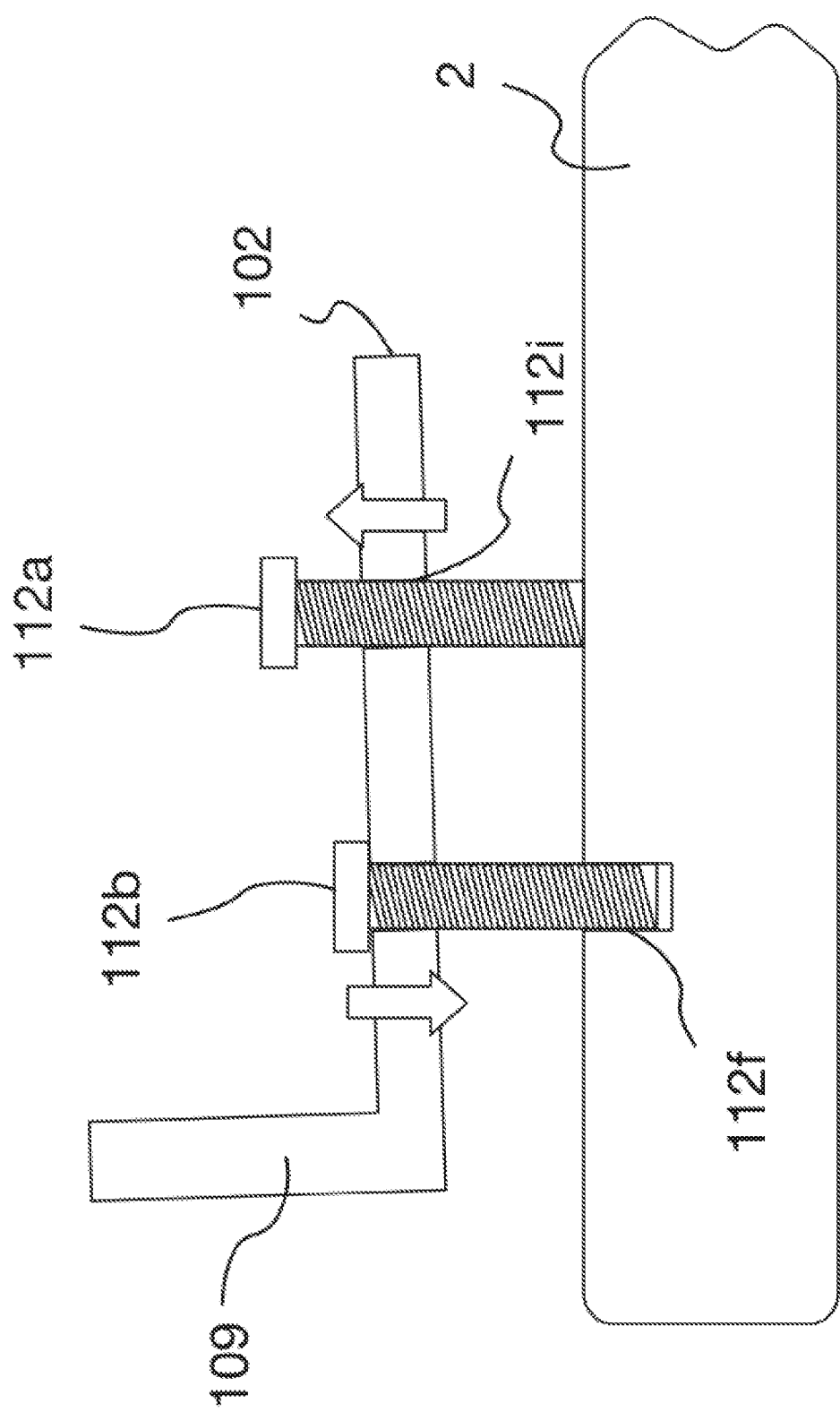

As shown in FIG. 2d, the first screw 112a is arranged to displace the frame 109 away from panel 1. This may be enabled by a threaded hole 112i in the frame 102 which the first screw engages while a head of the screw abuts the panel 1. The second screw 112b is arranged to displace the frame 109 towards the panel. This may be enabled by a threaded hole 112f in the panel 1, which the second screw 112b engages while the head of the second screw 112b abuts the surface of the frame. By using screw 112a and/or 112b, forces may be applied to frame 102 and/or panel 2 to control bending or rotation of the frame/panel.

Since the first screw 113b is aligned over the support portion 101a, 101b in the embodiment of FIG. 2b, only two screws are required to control bending or rotation of the frame.

In FIGS. 2a-2b, only one group of screws is illustrated. However, a group of screws may be arranged at any location around the frame 109 to support the plate 2 and the panel 1.

FIG. 2c illustrates that a combination the embodiment of FIGS. 2a and 2b, i.e. groups of screws with two as well as three screws may be arranged around the frame 109. Therefore, flexibility is provided for.

As is illustrated in FIGS. 2a-2c and 3c and 3d, each group of screws 112a, 112b, 112c, 113a, 113b may apply a force to the frame 109. Therefore, a torque may be applied at the second frame element 103a, 103b via controlling the curvature of the frame 109 such that tilt of the support portion 101a, 101b, and thereby curvature of the plate, is controlled. In the assembly illustrated in FIG. 3a, a net force is applied such that the frame is substantially flat and parallel with the panel 1. In the assembly illustrated in FIGS. 3c and 3d, a net force away from the support portion 101a, 101b is provided to the frame 109, which will be slightly concave when viewed from the touch surface of the plate 2. As a consequence, a torque will be provided at to the second frame element 103a, 103b, which will tilt the support portion 101a, 101b along the edge or perimeter of the plate 2. Therefore, controlling the curvature of the first frame element 109 may control curvature of the plate. The plate 2 may become concave as viewed from the touch surface of the plate 2.

FIGS. 4a-4c, 5a-5g and 6a-6c illustrate embodiments wherein an alternative or additional control of the shape of the frame 109 may be introduced. As shown in FIG. 4a, attachment elements 112 may be arranged at the corners of the frame 109. The attachment elements 112 may comprise the group of screws 112a, 112b, 112c, 113a, 113b as described above with regard to FIGS. 2a-2c and 3a-3d. The attachment elements 112 may be arranged to pull the panel 1 towards the frame 109. This may be done with or without tilting the support portion 101a, 101b as described above. At least one spacing element 116 (where spacing element 116 may comprise screw 112 and a separate spacing component) may be arranged along the perimeter of the frame 109 between two attachment elements 112. The spacing element 116 is arranged in the assembly to apply a force to the frame 109 directed away from the panel 1. Thereby, a force applied by the spacing element 112 may be transferred to the second frame element 103a, 103b such that the support 101a, 101b is tilted as described above, whereby curvature of the plate 2 is controlled.

As is illustrated in FIG. 4b, the general shape of the frame 109 will be concave, whereas the general shape of the panel 1 may be convex. The panel may also remain substantially plane depending on its rigidity. The resulting shape of the plate 2 will be concave. Therefore, each side of the frame 109 may be controlled to follow a curved path. The curvature may be controlled by adjusting the force applied by each spacing element 116 and/or via the number of spacing elements 116 along each side of the frame 109. As a result, the support portion 101a, 101b, at least at the free end of the support portion 101a, 101b, may also follow a curved path. Therefore, at least a portion of the support portion 101a, 101b may extend in a plane that is curved.

When the second frame element 103a, 103b is disassembled or only attached to the first frame element 102, it may have a relaxed state. In the relaxed state, the support portion 101a, 101b extends in a plane that is substantially flat. The second frame element 103a, 103b may be deflectable from the relaxed state to a deflected state or stressed state, such as by the attachment elements 112 and spacing elements 116. The level of tilt at the opposing ends of the support 101a, 101b where the attachment elements 112 are provided may be less than the level of tilt between the ends where spacing element(s) 116 is/are provided. As consequence, the second frame element 103a, 103b may be deflected to the deflected or stressed state. In the deflected or stressed state, the support portion 101a, 101b extends, along its length, in a plane that is curved. A cross section of this plane taken along the support portion 101a, 101b, such as at the free end or tip of the support portion 101a, 101b may form a parabolic concave curve along at least a portion of the length of the support portion 101a, 101b. A combination of the attachment element 112 and the spacing element 116, that together may form a screw arrangement, may hold the second frame element 103a, 103b in the deflected or stressed state when assembled with the first frame element 102.

The spacing element 116 may be provided by a single screw that engages a thread in the frame 109 while its tip engages or abuts a surface on panel 1. Alternatively, panel 1 comprises a threaded hole into which spacing element 116 is threaded so that spacing element 116 can be used to displace the frame 109 towards panel 11. Additionally, element 116 may comprise a spacer component such as a washer, spacer, etc. In FIGS. 3a and 3b and FIG. 6a, two spacing elements 116a, 116b are shown for illustrative purposes and may form separate embodiments. A single-spacing element 116a, 116b may be used in other embodiments. The head of the spacing element 116a, 116b may abut the back cover 111 while the spacing element 116a, 116b may engage the frame 109, wherein the frame 109 may be pulled towards the back cover 111. As a result, the frame 109 becomes concave. In some embodiments, the spacing element 116a does not abut or engage the panel 1, wherein the panel 1 may be unaffected by the force applied to the frame 109. In other embodiments, the spacing element 116b is sufficiently long such that a tip of the spacing element 116b abuts a surface of the panel 1. This adds further control of the shape of the plate 2.

In some of the embodiments, the frame assembly 100 comprises a plurality of spacing elements 116 arranged spaced apart from corners of the frame 109. One or several spacing elements 116 may be arranged along each perimeter or side of the frame 109. If a single spacing element 116 is arranged along each side, it is preferably centered between the corners of the frame 109.

Each spacing element 116 may comprise a screw with a predefined length. This means that the screw can be fully seated such that the head and tip abut respective surfaces, whereby a predefined curvature of the plate 2 is obtained. The level of curvature may be adjusted by one or several spacers arranged between the head and the surface which the head engages. This is particularly useful if multiple spacing elements 116 are arranged along a single side, or if different sides have different lengths. The more spacers provided, the less force will be applied to the frame 109. Alternatively, as shown in FIG. 5h, predefined height differences may be generated via other methods, e.g. by milling the frame to the predefined heights, allowing a more continuous support structure.

FIGS. 5a-5h illustrate embodiments of an assembly 200, which may be combined with the first frame element 102 described above. The embodiments shown in FIGS. 5a-5h are shown inverted relative to the embodiments shown previously, with the plate 2 at the top.

Figure 5A:
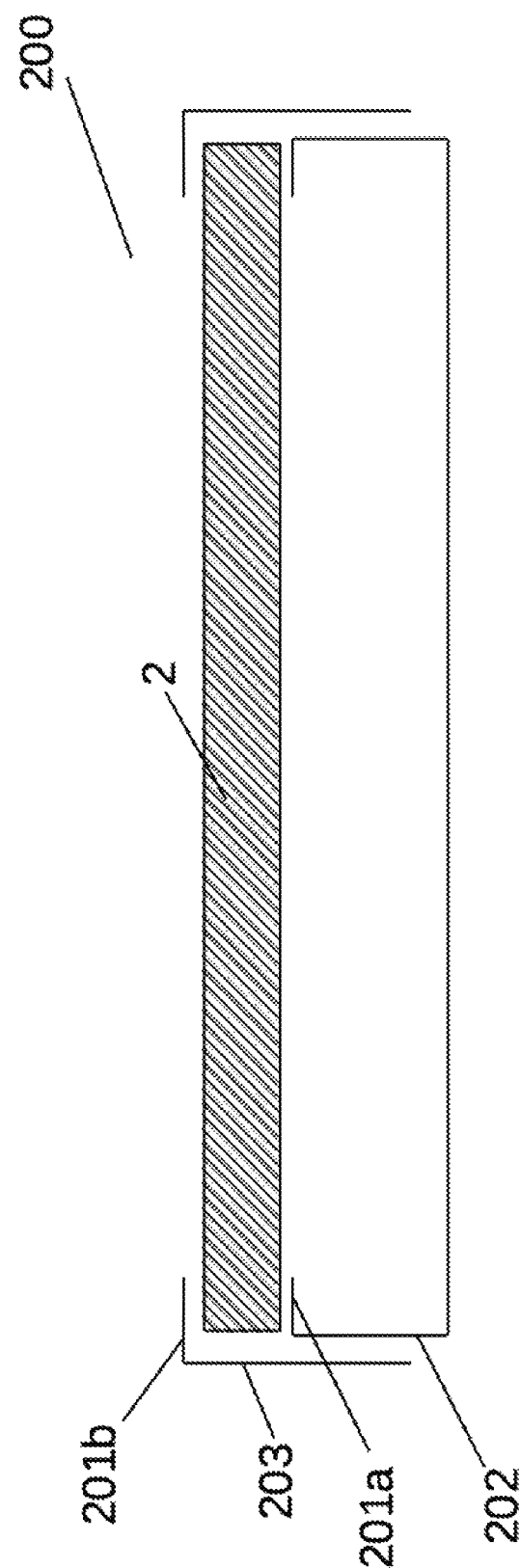
Figure 5B:
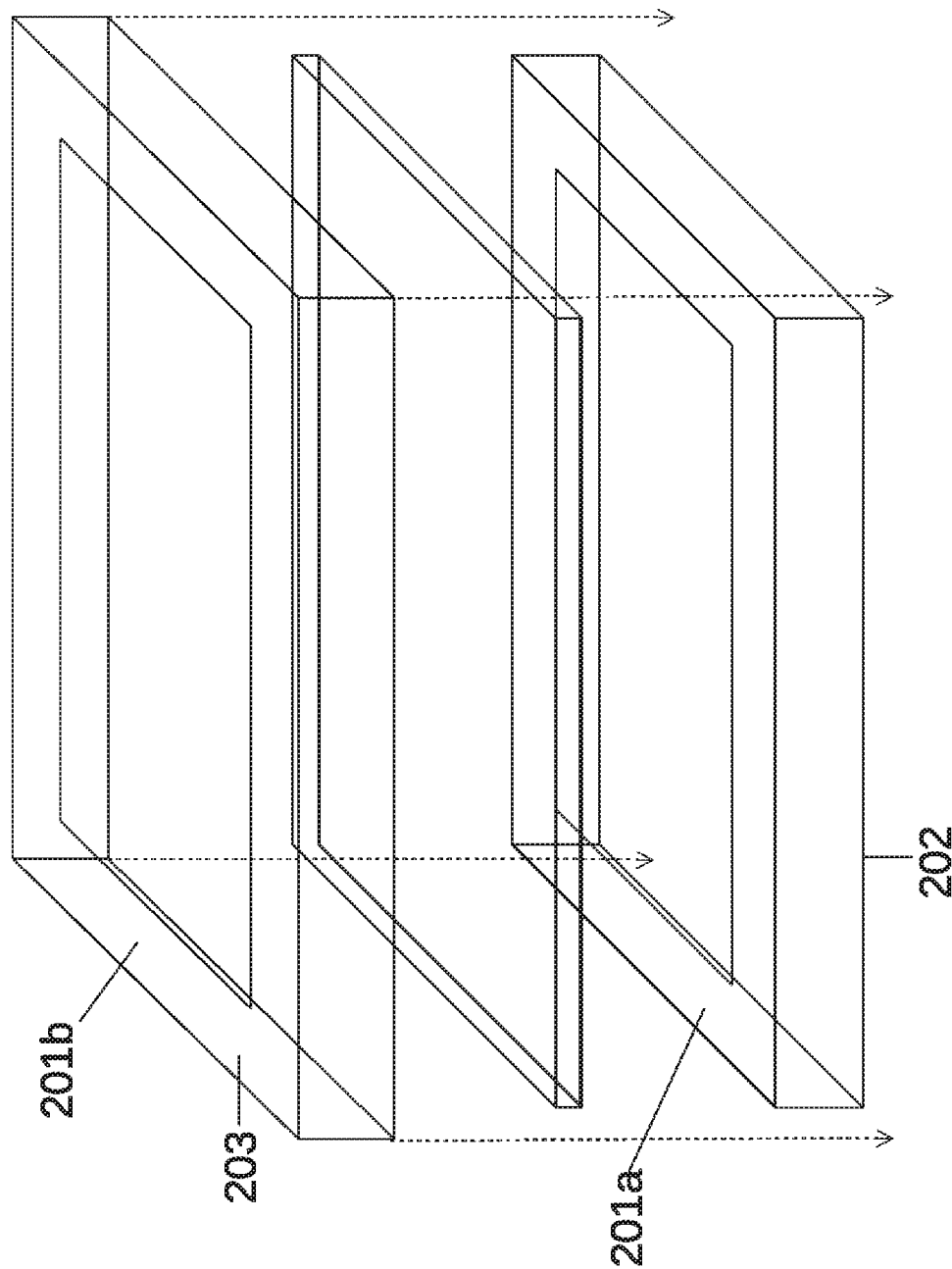

As shown in FIGS. 5a and 5b, the frame assembly 200 may comprise a first frame element 202, and a second frame element 203. The first frame element 202 and the second frame element 203 may be elongated members, each having a support portion 201a, 201b. The first frame element 202 and the second frame element 203 may e.g. be L-shaped in cross section. A first portion of each of the first frame element 202 and the second frame element 203 may be configured to extend along the edge of the panel 1. A second portion of each of the first frame element 202 and the second element 203 forms the support portion 201a, 201b, and may be configured to extend from the perimeter of the plate 2 a short distance, such as a 1-3 cm, over the surface of the plate 2 when assembled. Furthermore, the second frame element 203 may be arranged on top of the first frame element 202 and such that the perimeter of the plate 2 is arranged between the second portion of each of the frame elements 202, 203 when assembled. Therefore, each support portion 201a, 201b may support or engage opposing surfaces of the plate 2, such as is illustrated in FIG. 5g.

Figure 5C:
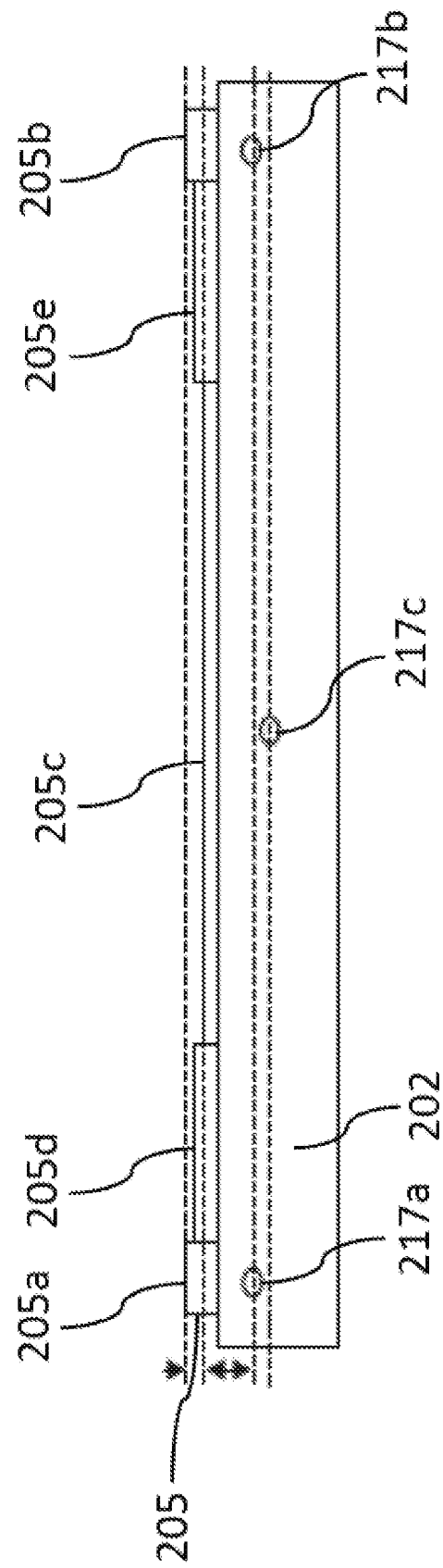
Figure 5D:
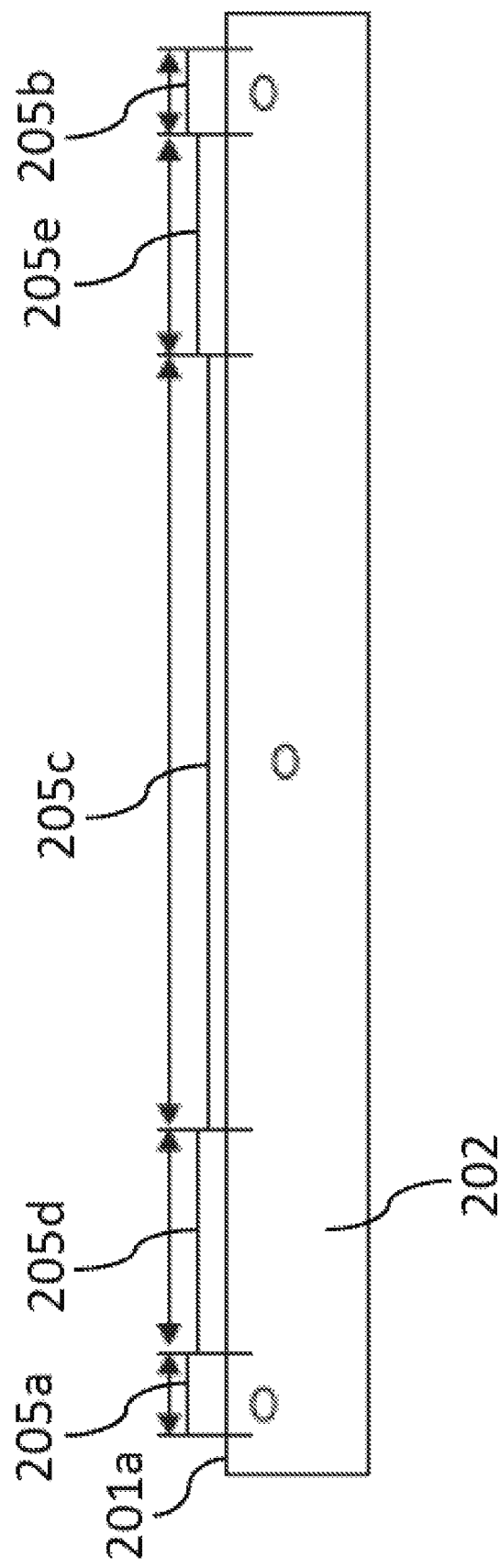

In some embodiments, such as illustrated in FIGS. 5c-5d, a gasket 205 (e.g. gaskets 205a, 205b, 205c, 205d, 205e) is arranged between the first frame element 202 and the second frame element 203. The gasket may e.g. be arranged on the support portion 201a of the first frame element 202. Also, a sealing 204a may be arranged on the support portion 201b of the second frame element 203.

The gasket 205 may have a varying thickness along its length, i.e. also along the length of the first frame element 202. This provides for obtaining a desired curved shape of the perimeter of the plate 2 when captured between the first frame element 202 and the second frame element 203, as is illustrated in FIGS. 5f-5g. For example, the gasket 205 has opposing ends and may be thinner between the opposing ends than at said ends. This provides for obtaining a predefined concavity of the perimeter of the plate 2. The gasket is sufficiently stiff that it is thicker at the ends even when compressed. The gasket 205 may be about 1.5-2.0 mm at the ends and about 1 mm thinner at the center.

In some embodiments, the gasket 205 has a plurality of sections along its length. The thickness of each section may vary. For example, a first section 205a of the gasket is provided at one of its ends and a second section 205b of the gasket at the other of its ends. The first section 205a and the second section 205b may have a first thickness that may be equal at each section. At least a third section 205c of the gasket is arranged between the first section 205a and the second section 205b. The third section 205c has a second thickness. The first thickness is thicker than the second thickness. For example, difference in thickness is about 0.5-2 mm, preferably about 1.0 mm. The difference in thickness may vary depending on the length of the gasket 205 and the edge of the plate 2 at which the concavity is to be introduced. In some embodiments, fourth and fifth sections 205d, 205e may be provided between the first and second sections 205a, 205b and the third section 205c, respectively. The fourth and fifth sections 205d, 205e may add further control of the shape of the concave curve provided by the arrangement 200. The length of each the first and second sections 205a, 205b may be about 2-20% of the total length of the gasket 205. The length of the third section may be about 60-96% of the total length of the gasket 205. The length of each of the fourth and fifth sections 205d, 205e may be about 10-20% of the total length of the gasket 205. In some embodiments the total length of the fourth and fifth sections 205d, 205e is shorter than the length of the third section 205c, and the total length of the first and second sections 205a, 205a is shorter than total length of the fourth and fifth sections 205d, 205e. This provides for a parabolic concave curve along the length of the frame assembly 200.

Figure 5E:
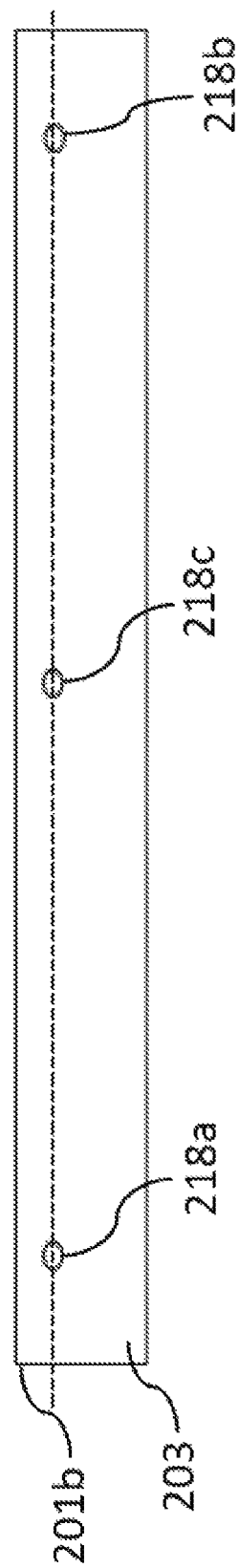
Figure 5G:
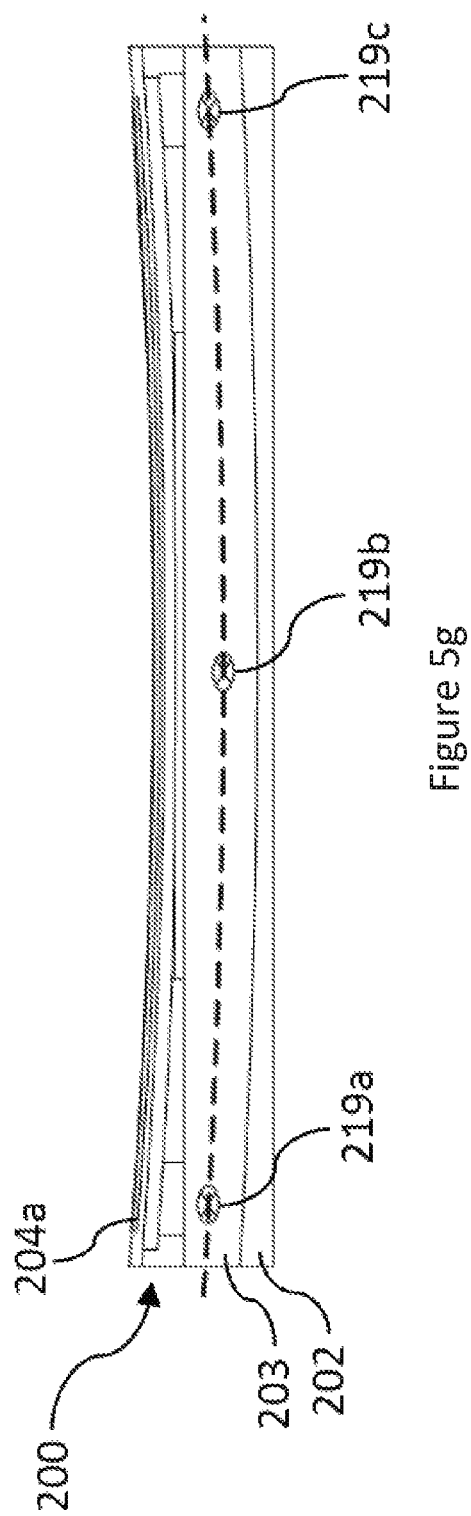
Figure 5H:
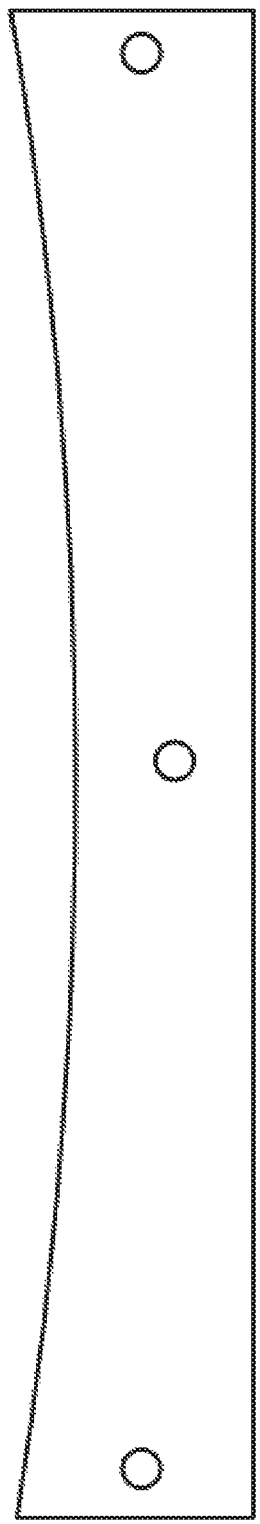

A distance between the support portion 201a of the first frame element 202 and the support portion 201b of the second frame element 203 may be discontinuous in an assembled state, as can be seen in FIG. 5e.

In order to maintain the concavity of the plate 2, the first frame element 202 and the second frame element 203 may be held together such that the distance between the support portions 201a, 201b is maintained in the assembled state. The first frame element 202 has a first hole 217a and a second hole 217b arranged at opposing ends of the first frame element 202, such as at the second portion of the first frame element 202. The first and the second hole 217a, 217b are arranged in a first plane. A third hole 217c is arranged between the first hole 217a and the second hole, such as centered between the first hole 217a and the second hole 217b. The third hole 217c is provided in a plane that is different from the first plane. The distance or offset between the plane in which the first and second holes 217a, 217b are arranged and the plane in which the third hole 217c is arranged may be substantially the same as the difference in thickness between the first and second sections 205a, 205b and the third section 205c, i.e. about 0.5-2 mm. In some embodiments the first and second holes 217a, 217b are centered in each of the first and second sections 205a, 205b of the gasket 205 along the length of the first frame element 202.

Similarly, the second frame element 203 may comprise a first hole 218a and a second hole 218b arranged at opposing ends of the second frame element 203. A third hole 218c may be arranged between the first hole 218a and the second hole 218b of the second frame element 203. The first hole 218a, the second hole 218b, and the third hole 218c of the second frame element 203 is generally arranged in the same plane when the second frame element 203 is disconnected from the first frame element 202. The second frame element 203 may be less stiff or weaker than the first frame element 202 and be deflectable such that each hole 218a, 218b, 218c of the second frame element 203 is aligned with the holes 217a, 217b, 217c of first frame element 202. Therefore, the support portion 201b of the second frame element 203 may be deflected such that it extends in plane, which is curved in the assembled state of the frame assembly 200. Screws 219a, 219b, 219c may be inserted through the aligned holes 217a, 217b, 217c; 218a, 218b, 218c and may directly engage the panel or engage a threaded hole in the panel 1, which will hold the frame elements 202, 203 in the assembled state. Other relative arrangements of the holes 217a, 217b, 217c; 218a, 218b, 218c are foreseen, wherein the center holes 217c, 218c of each frame element 202, 203 are misaligned in the relaxed state of the second frame element 203 but aligned in the deflected or stressed state of the second frame element 203.

In some embodiments, the first frame element 202 forms a frame side, and the second frame element 203 forms an edge cover. If used together with the frame 109 discussed with regard to FIGS. 4a-4c, the frame side may replace the second frame element of the embodiments of FIGS. 4a-4c. Therefore, the frame side comprises the support portion 201a with a support surface generally opposing the frame 109 and is configured to support the gasket 205.

Figure 6:
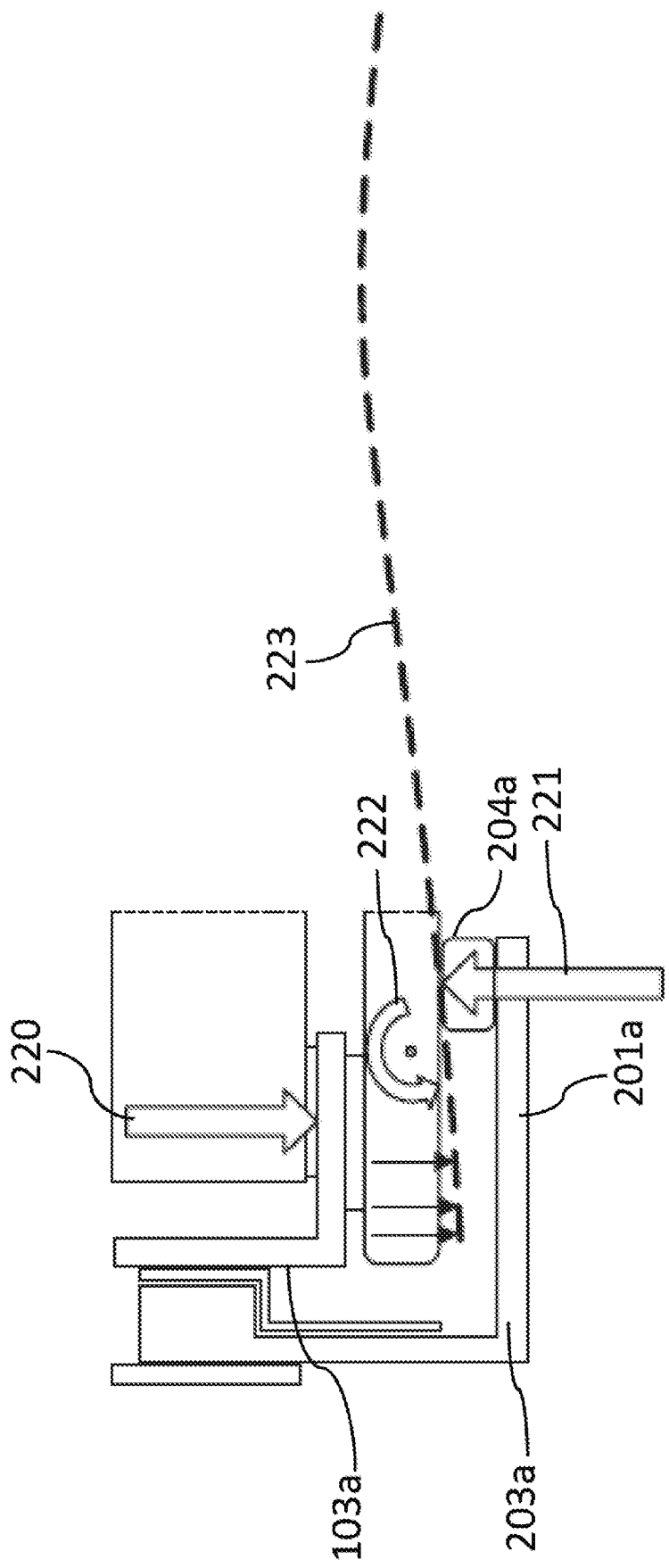
FIG. 6 is a schematic cross section from a first direction of an embodiment of the assembly.

As illustrated in FIG. 6, a component (e.g. a sealing component 204a) may be provided between the support portion 201a and the plate 2. FIG. 6 illustrates the resulting forces and torque generated when a force 220 is applied to second frame element 203a. A second force 221 is applied to support portion 201. Therefore, a net torque 222 is generated, i.e. counter-clockwise in the illustrated arrangement. The plate 2 will assume a curved path, as is illustrated with dotted line 223.

Figure 7:
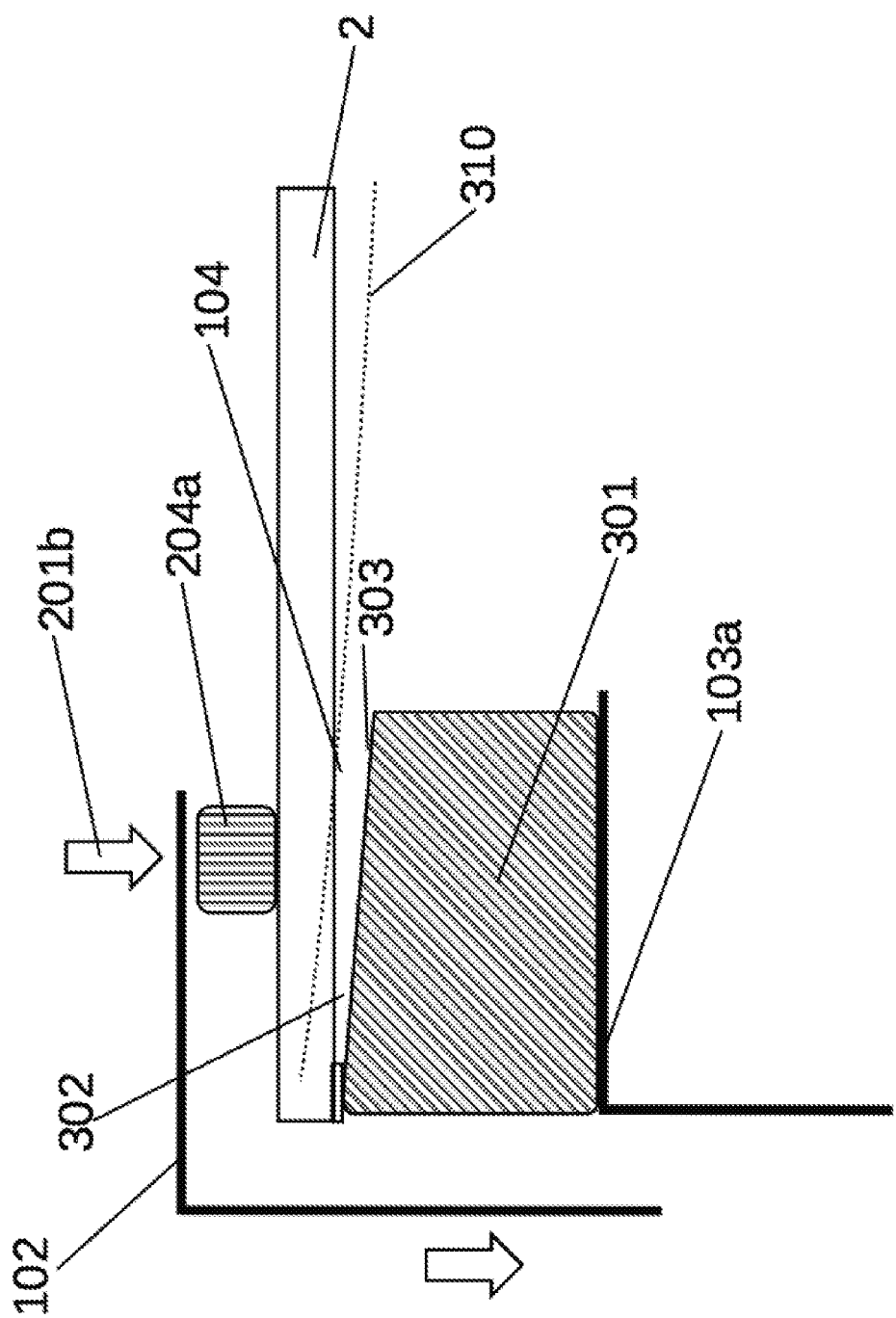
FIG. 7 is a schematic side-view of another embodiment for providing curvature of plate 2.

In an embodiment shown in FIG. 7, an alternative arrangement is provided for providing curvature of plate 2. In this embodiment, support block 301 is arranged to support glass plate 2. Support block 301 has a surface portion comprising a tapered edge 303 at an angle from second frame element 103A. Plate 2 is pressed against the top surface of support block 301 from pressure 201b from first frame element 102 and sealing 204a. Pressure 201b causes plate 2 to follow the contour of the top surface of block 301 and plate 2 is forced into a curving plane at an angle to the plane of second frame element 103A. The resulting path of plate 2 is shown by curvature path 310. Tapered surface portion 303 is angled between 0.5 degrees and 3 degrees from second frame element 103A.

Figure 8:
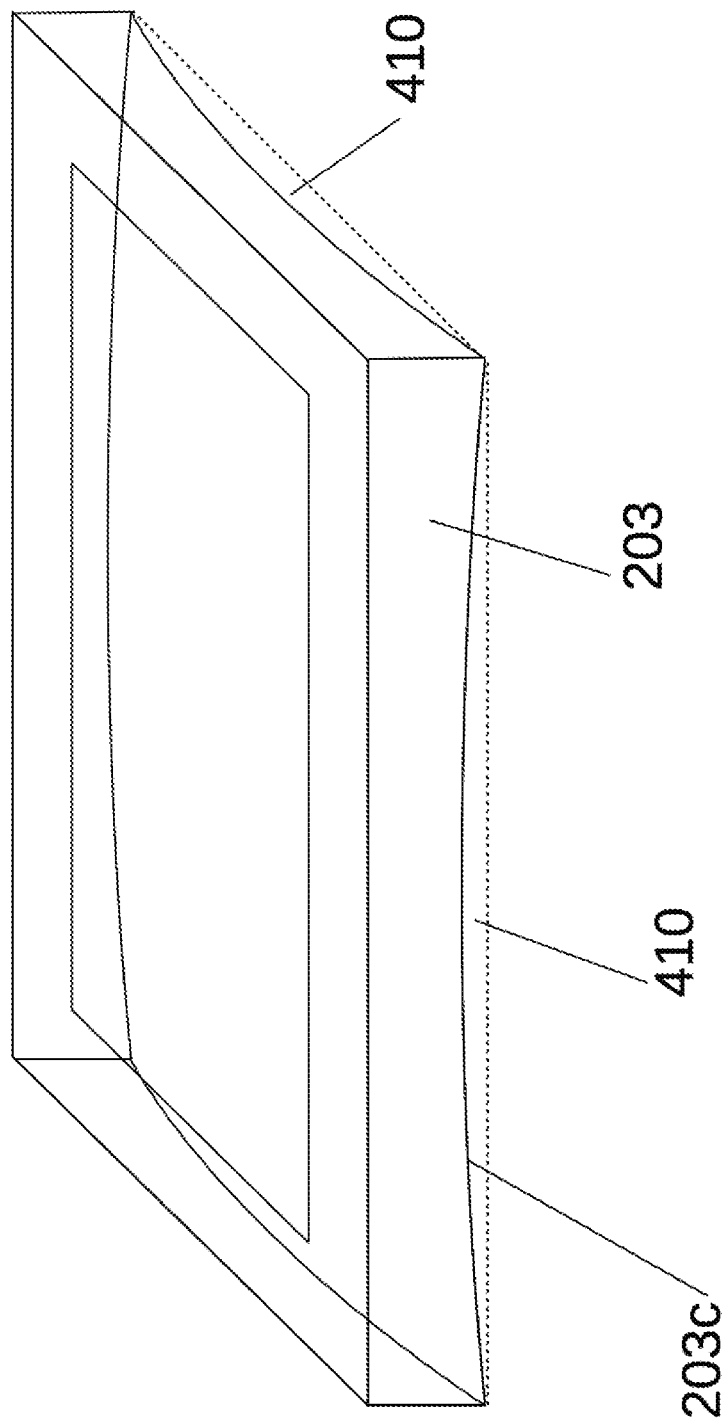
FIG. 8 shows an isometric view of a variation of the embodiment of FIGS. 5*a*-5*g*.

In an embodiment shown in FIG. 8, a variation of the embodiment shown in FIGS. 5a-5g is provided. In this embodiment, second frame element 203 has been modified, such that a portion 410 has been removed from the edge portion 203c of second frame element 203. This reduces the force required to bend second frame element 203 in a manner that results in a curvature of plate 2. Portion 410 may be removed by a milling process, by a carving or cutting process, or second frame element 203 may be formed without portion 410 via a molding process or similar. Portion 410 preferably reduces the depth of second frame element 203 at the narrowest point by between 5-20%.

The frame elements of the embodiments of the assembly may be made from sheet metal and given a desired design, thickness, and/or be made from different materials such that the forces, shapes, torques, etc. discussed above are obtained.

Embodiments comprise a method for assembling the panel 1 and the plate 2 for the optical touch sensitive system. The method may comprise providing the frame elements according to the embodiments presented herein. The method further comprises attaching the first frame element to the second frame element, supporting the plate at a support portion of the assembly, and attaching at least one of the first frame assembly and the second frame assembly to the panel such that the support portion extends in flat or curved plane. Also, the method comprises attaching the second frame element to the first frame element such that the support portion extends at least partially in a second plane generally opposite at least a portion of the first frame element and is spaced apart from the first plane. A curvature of the first frame element may be controlled with a spacing element attached to the first frame element and may thereby tilt the support portion to control a curvature of the plate.

Figure 9:
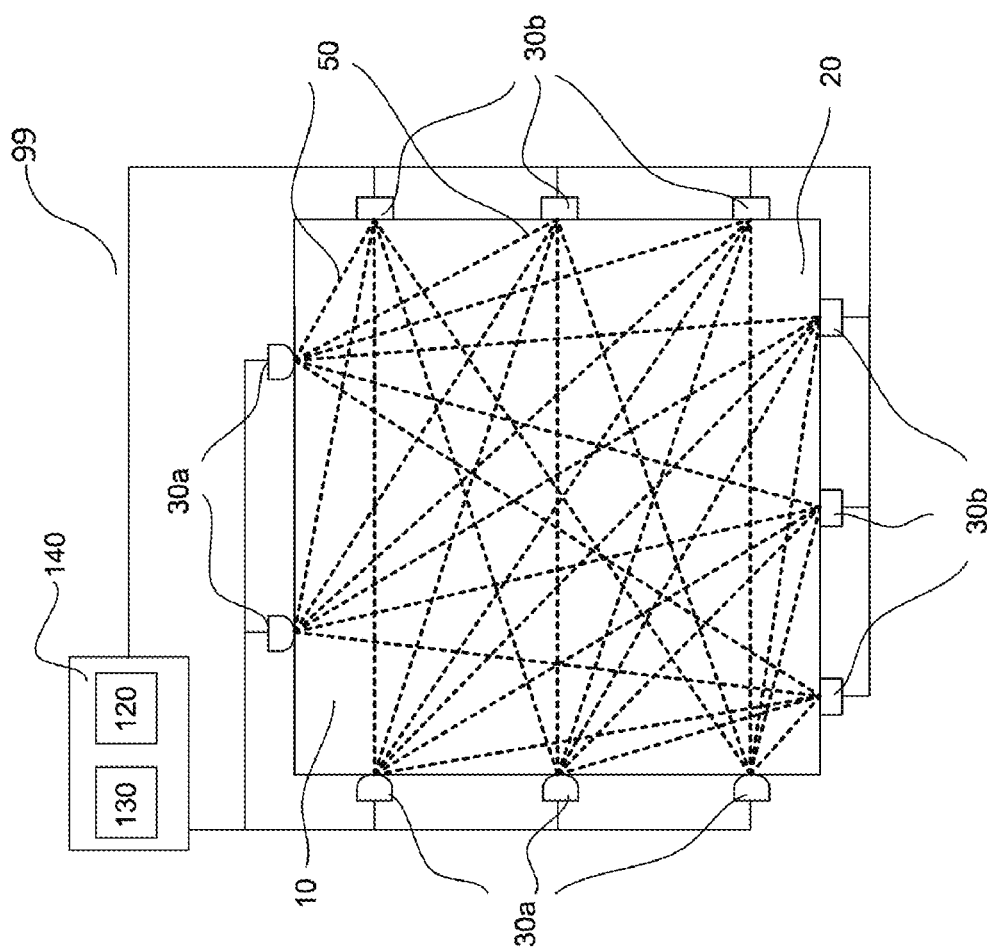
FIG. 9 is a diagram showing a top down view of an optical touch system and corresponding detection lines.

FIG. 9 illustrates a top plan view of an example of a touch-sensitive apparatus 99. Emitters 30a are distributed around the periphery of touch plate 10, to propagating light across touch surface 20. Detectors 30b are distributed around the periphery of touch surface 20, to receive part of the propagating light. The light from each of emitters 30a will propagate to a number of different detectors 30b on a plurality of light paths 50.

The embodiments above describe methods of achieving control of plate shape and curvature. The following embodiments describe desirable shapes of the plate for achieving improved performance of a touch sensor system. Light paths 50 may conceptually be represented as "detection lines" that extend across the touch surface 20 between pairs of emitters 30a and detectors 30b. The emitters 30a and detectors 30b collectively define a grid of detection lines 50 ("detection grid") on the touch surface 20, as seen in a top plan view. The spacing of intersections in the detection grid define the spatial resolution of the touch-sensitive apparatus 99, i.e. the smallest object that can be detected on the touch surface 20. The width of the detection line is a function of the width of the emitters and corresponding detectors. A wide detector detecting light from a wide emitter provides a wide detection line with a broader surface coverage, minimizing the space in between detection lines which provide no touch coverage. A disadvantage of broad detection lines may be a reduced ability to differentiate between separate objects and a lower signal to noise ratio.

As used herein, the emitters 30a may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 30a may also be formed by the end of an optical fiber. The emitters 30a may generate light in any wavelength range. The following examples presume that the light is generated in the infrared (IR), i.e. at wavelengths above about 750 nm. Analogously, the detectors 30b may be any device capable of converting light (in the same wavelength range) into an electrical signal, such as a photo-detector, a CCD device, a CMOS device, etc.

The detectors 30b collectively provide an output signal, which is received and sampled by a signal processor 130. The output signal contains a number of sub-signals, also denoted "projection signals", each representing the energy of light received by one of light detectors 30b from one of light emitters 30a. Depending on implementation, the signal processor 130 may need to process the output signal for separation of the individual projection signals. The projection signals represent the received energy, intensity or power of light received by the detectors 30b on the individual detection lines 50. Whenever an object partially or completely occludes detection line 50, the received energy on this detection line is decreased or "attenuated".

The signal processor 130 may be configured to process the projection signals so as to determine a property of the touching objects, such as a position (e.g. in a x, y coordinate system), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 20, where each attenuation value represents a local degree of light attenuation. The attenuation pattern may be further processed by the signal processor 130 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

In the illustrated example, the apparatus 99 also includes a controller 120 which is connected to selectively control the activation of the emitters 30a and, possibly, the readout of data from the detectors 30b. Depending on implementation, the emitters 30a and/or detectors 30b may be activated in sequence or concurrently, e.g. as disclosed in U.S. Pat. No. 8,581,884. The signal processor 130 and the controller 120 may be configured as separate units, or they may be incorporated in a single unit. One or both of the signal processor 130 and the controller 120 may be at least partially implemented by software executed by a processing unit 140.

Figure 10A:
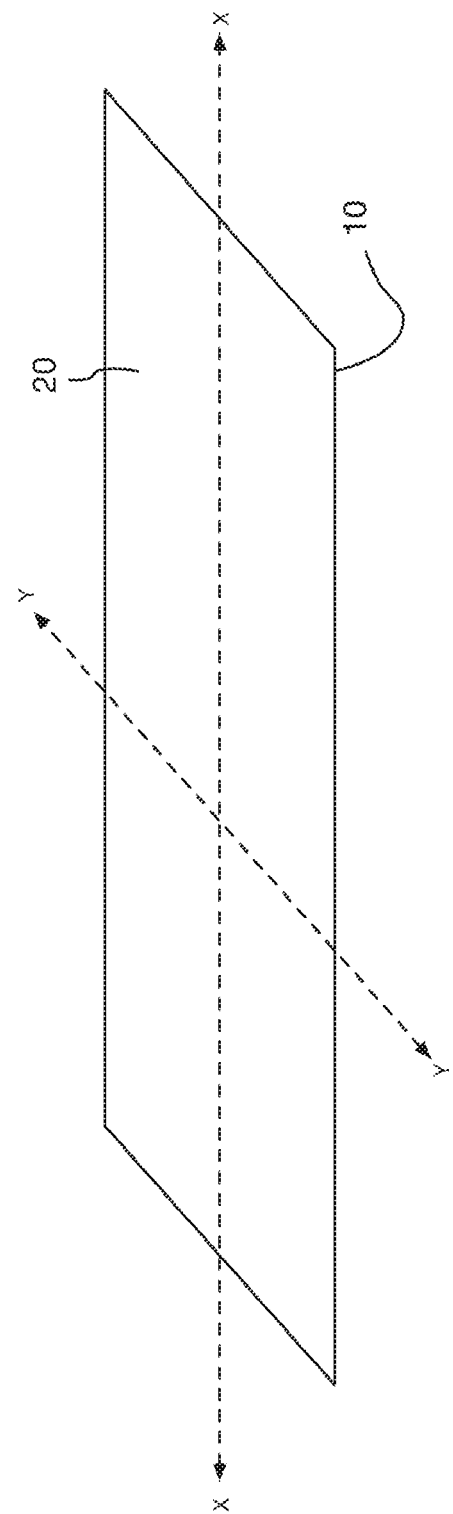
FIG. 10*a* shows an isometric view of a flat touch surface of an optical touch system.

FIG. 10a illustrates a substantially flat rectangular touch plate 10 according to the prior art. In this example, the touch plate is made of glass, plastic, or any other materials such as PMMA (Poly(methyl methacrylate)). Two axes are defined in FIG. 10a. The x-axis is defined as the axis running parallel to and equidistant from the pair of long edges of the rectangle and along the flat surface of the touch surface. The y-axis is defined as the axis running parallel to and equidistant from the pair of short edges of the rectangle and along the flat surface of the touch surface. At least a portion of the top surface of touch plate 10 comprises touch surface 20.

Figure 10B:
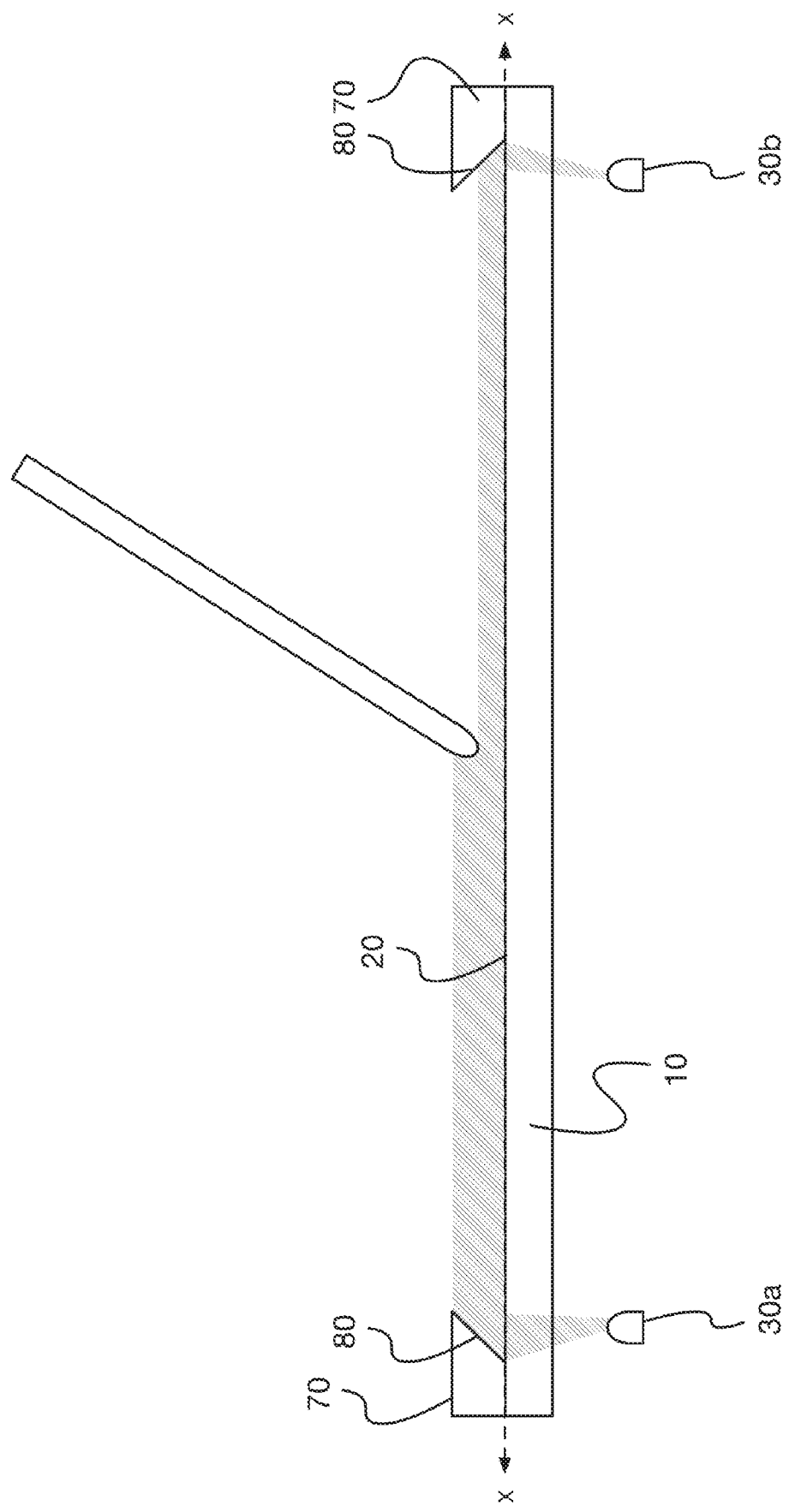
FIG. 10*b* shows a section view of an optical touch system with a flat touch surface.

FIG. 10b illustrates an example of a touch apparatus according to the prior art. FIG. 10b shows the touch apparatus in cross section wherein the cross section runs along the x-axis of the plate 10. Light is emitted by emitter 30a, passes through transmissive plate 10 through touch surface 20 and is reflected by reflector surface 80 of edge reflector 70 to travel in a plane substantially parallel with touch surface 20. The light will then continue until deflected by reflector surface 80 of the edge reflector 70 at an opposing edge of the transmissive plate 10, wherein the light will be deflected back down through transmissive plate 10 and onto detectors 30b. Where an object is applied to touch surface 20, some of the light above the touch surface 20 is occluded. This occlusion is detected by the touch apparatus and used to determine the presence, size, and/or shape of the object. The emitters and detectors may be arranged in a number of other configurations such that the light from the emitters is delivered to the touch surface and delivered from the touch surface to the detectors. Other known arrangements are that of arranging the emitters and detectors above the touch surface and transmitting and receiving the light directly without the use of reflecting surfaces. The light may also be delivered to the touch surface by means of a wave guide, fiber optic cable, or other optical component.

Figure 11A:
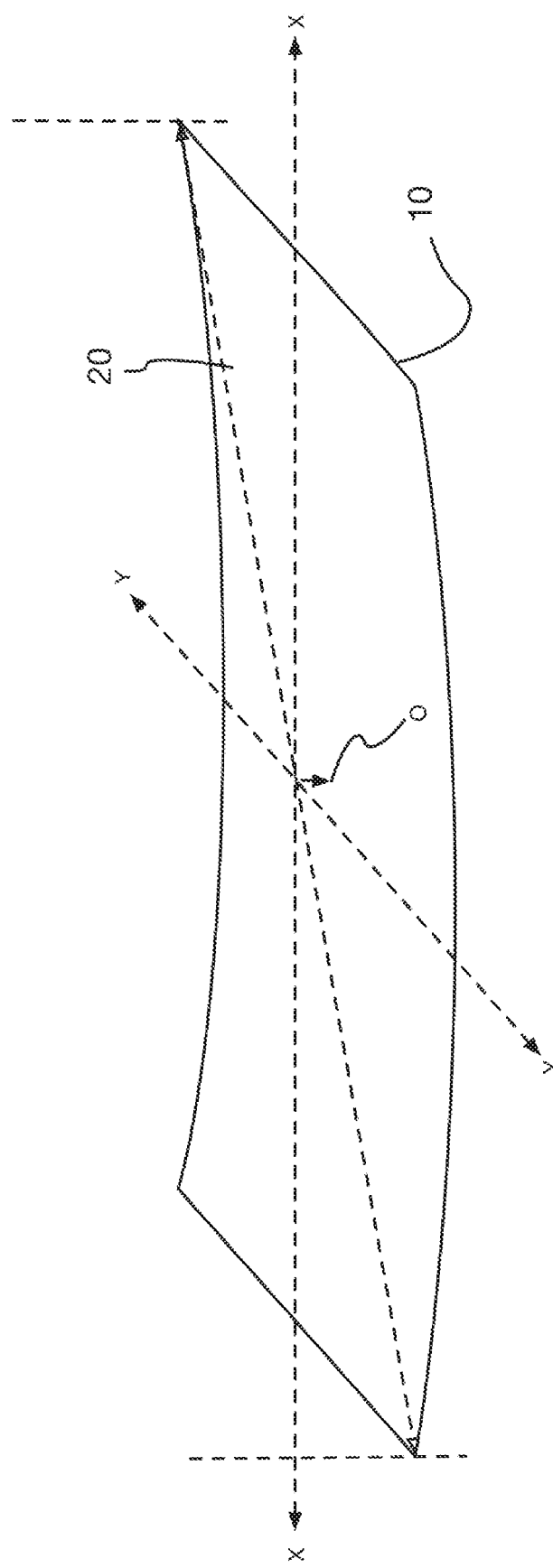
FIG. 11*a* shows an isometric view of a touch surface of an optical touch system having a curved profile in the x-axis.
Figure 11B:
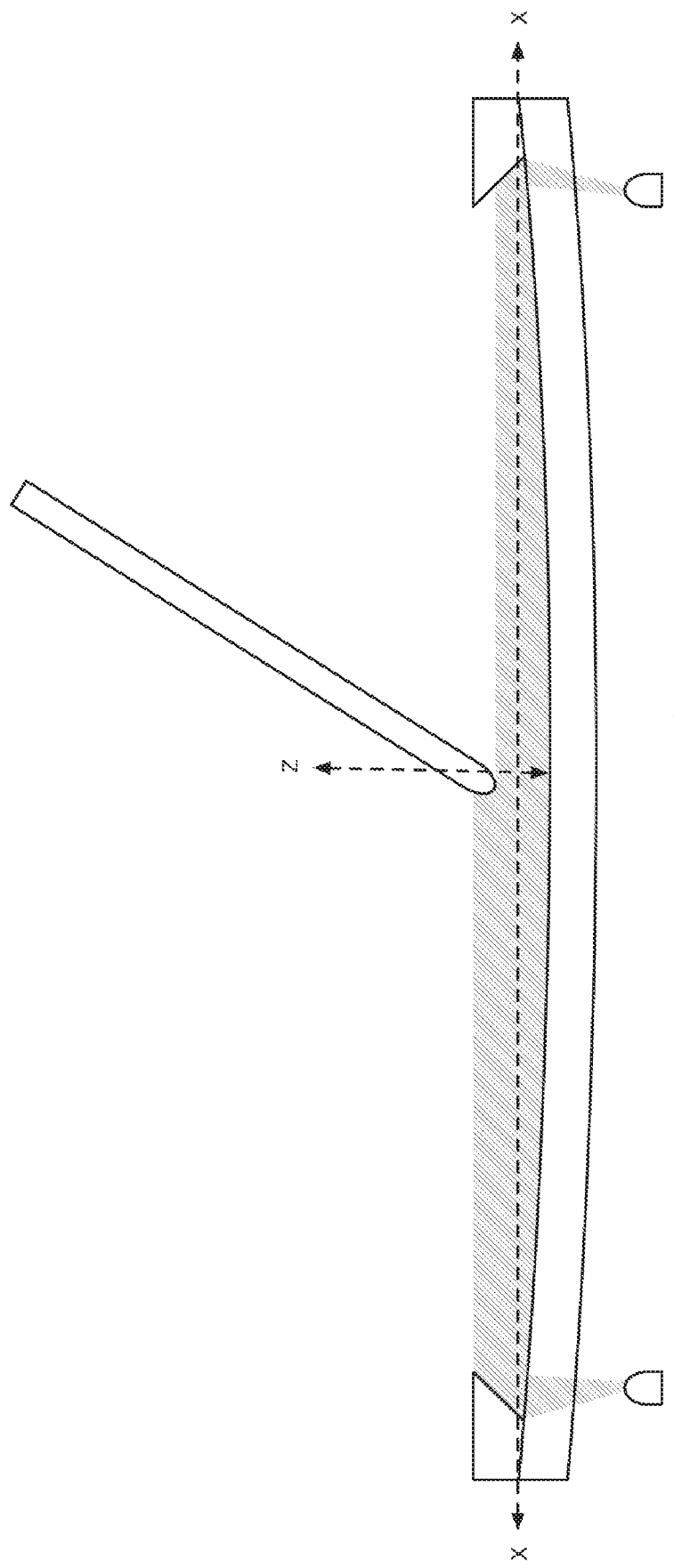
FIG. 11*b* shows a section view along the x-axis of an optical touch system with a touch surface having a curved profile in the x-axis.

FIG. 11a illustrates an embodiment of touch plate 10 similar to that shown in FIG. 10a but wherein the touch plate 10 is curved. In this embodiment, the plate remains substantially flat in the direction of the y-axis but is curved in a concave direction relative to the x-axis. In this embodiment, the x-axis is defined as the axis running parallel to and equidistant from the pair of long edges of the rectangle. The vertex of the parabola or paraboloid of the touch surface is where the touch surface is deepest relative to the edges of the touch plate. Where the x-axis is positioned at the height of the edge of the touch plate, the curvature of the plate can be measured using the distance of the touch surface from the x-axis. FIG. 11b shows a cross-section view along the x-axis of the touch plate 10 of FIG. 11a.

Figure 11C:
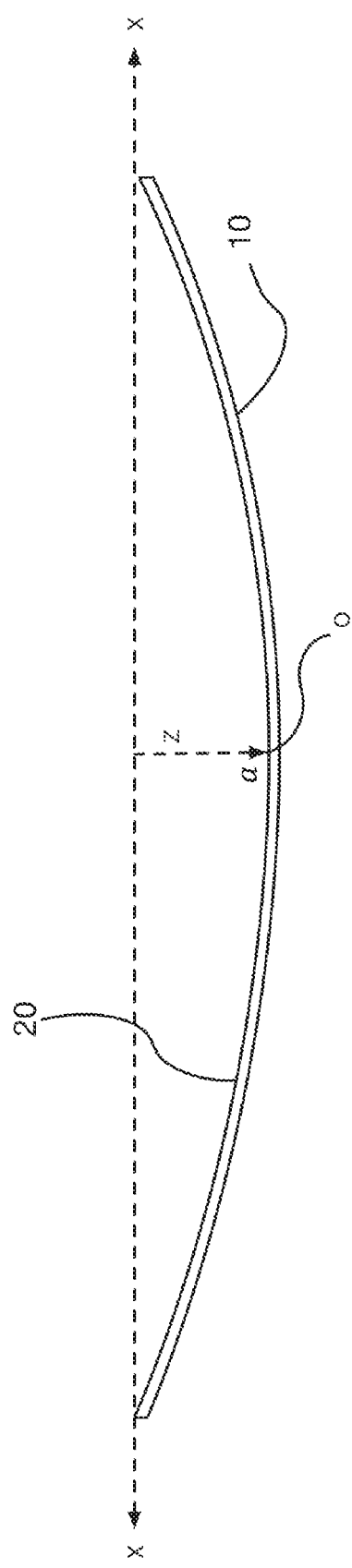
FIG. 11*c* shows a section view along the x-axis of an optical touch system with a touch surface having a curved profile in the x-axis.

FIG. 11c shows an example embodiment of a curved touch plate 10. The touch plate 10 has a width of 1900 mm along the x-axis and a height of 1070 mm along the y-axis. In this example embodiment, the glass is shaped such that the touch surface follows a parabolic curve relative to the x-axis. The midpoint O of touch surface 20 is the center of the touch surface and the midpoint of the x-axis. Where the curvature of the touch surface 20 is parabolic, the maximum distance a between the touch surface and the x-axis is at the center point O of the touch surface.

Figure 11D:
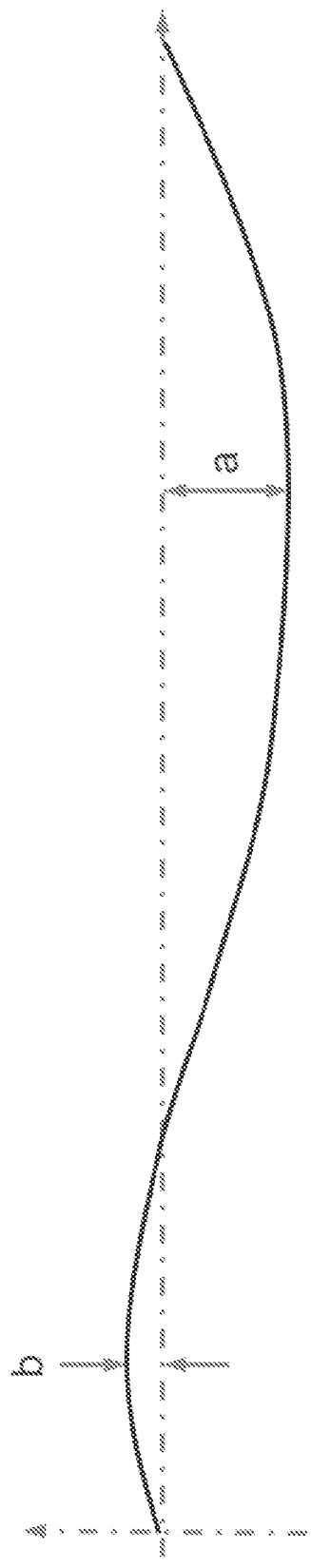
FIG. 11*d* shows an example of types of warpage that a touch panel may exhibit.

FIG. 11d shows the maximum allowed concave distance a and maximum allowed convexity b. The maximum allowed convexity b may be a significant consideration as a portion of the touch surface that is substantially convex may result in occlusion of the light between the emitters and detectors and significant loss of touch signal. The maximum allowed convexity b is a negative number in the present examples.

In one embodiment, the range of the distance a for vertically orientated touch plate is limited in order to improve the yield and performance of touch systems. The range is set dependent on the size of the touch system. A smallest value is needed to assure that non-parabolic deviations in the glass shape and convexity in the integration doesn't result in a convex integrated touch surface. A largest value is needed in order to assure that the height of the light field for the final touch system is kept reasonably low in order to enable better contact detection and lift-off detection for touch objects. Preferably, range of the distance a is 0-2.5 mm.

The maximum distance a is a positive number for a concave glass in the present examples. The curvature of the touch surface may therefore be modelled as:

$$F(x)=-a+cx^2$$

In the present example embodiment, a maximum distance a between the 1900 mm long cross section of the touch surface in FIG. 11c and the x-axis is 2.0 mm. Therefore, an ideal parabolic curve for touch surface 20 may be:

$$F(x)=5.5*10^{-6}*x^2-2.0$$

where F(x) is the distance between the x-axis and the touch surface at position x wherein F(x) is zero at the mid points of the edges. i.e. where the x-axis intersects the perimeter.

Figure 12A:
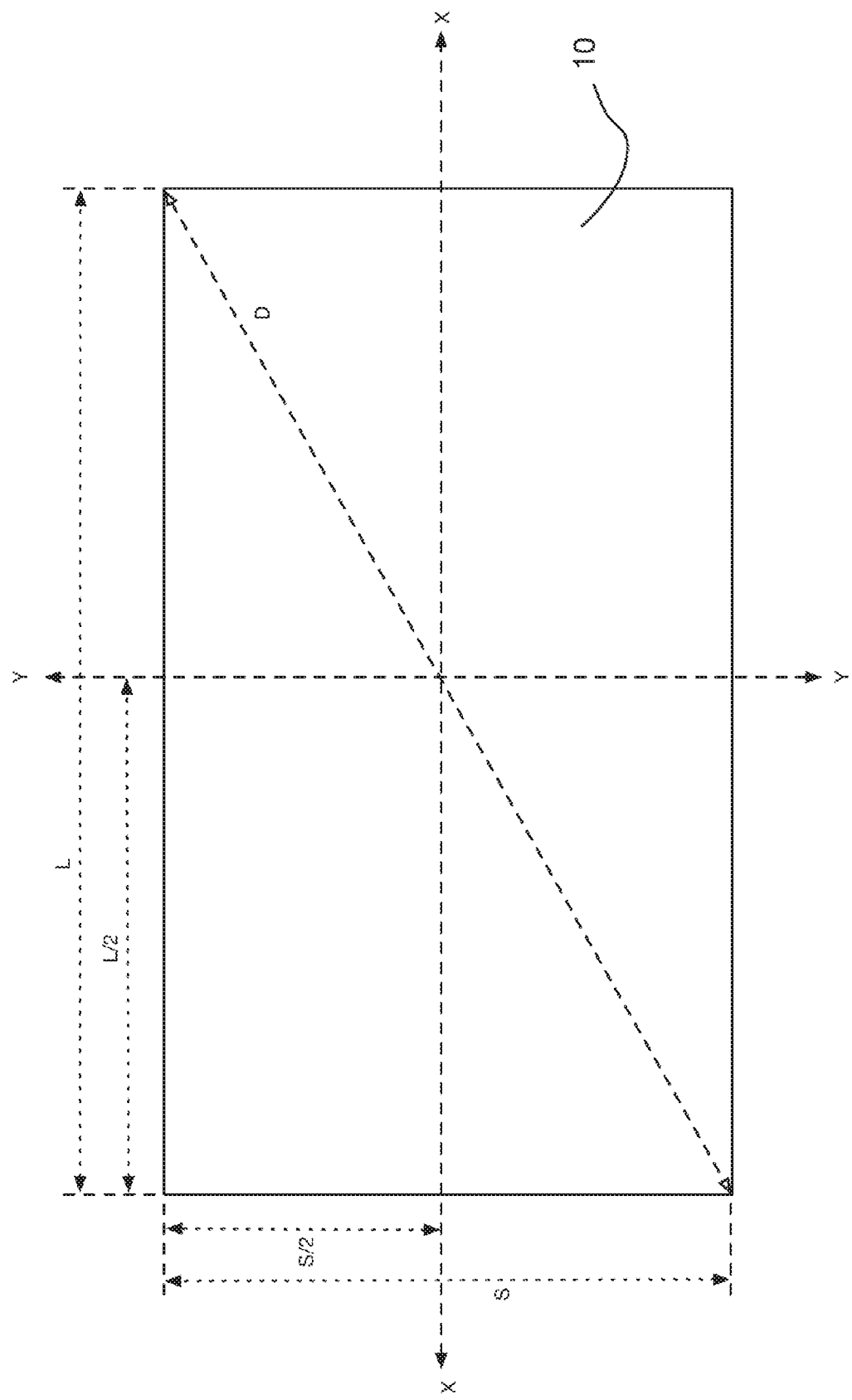
FIG. 12*a* shows top view of a touch surface of an optical touch system.
Figure 12B:
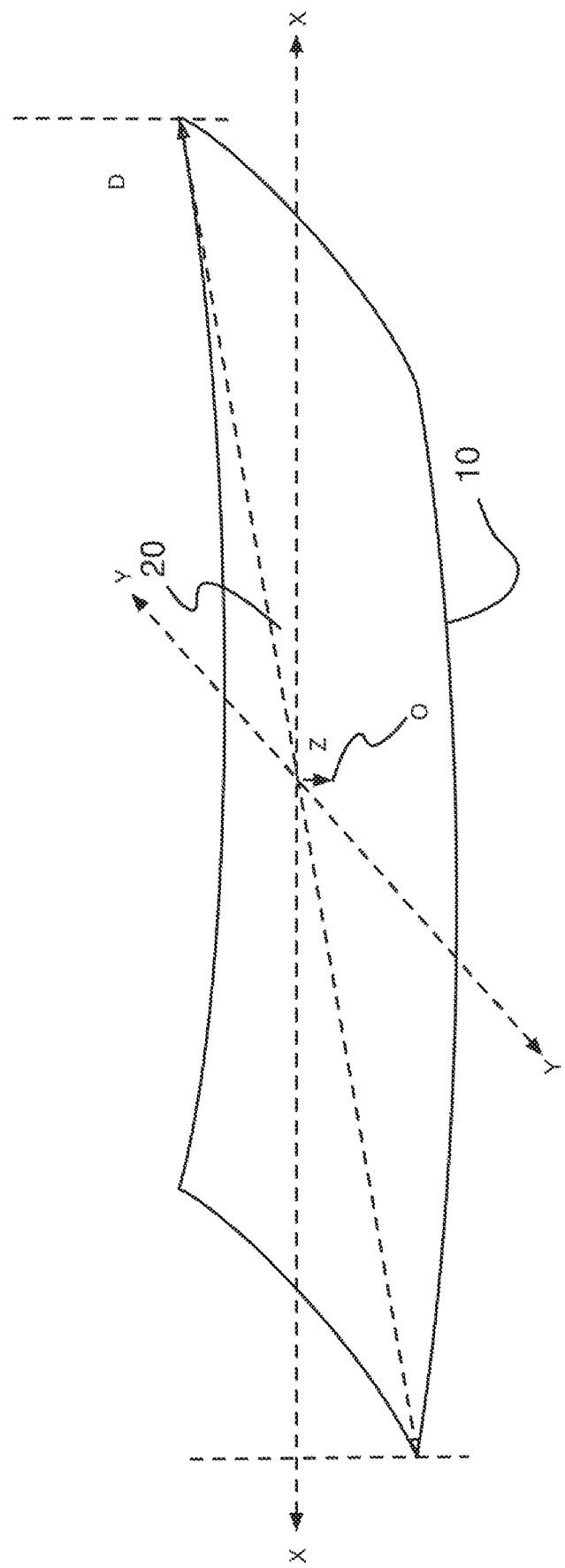
FIG. 12*b* shows an isometric view of a touch surface of an optical touch system having a curved profile in the x-axis and a curved profile in the y-axis.

FIGS. 12a and 12b illustrates an embodiment of touch plate 10 similar to that shown in FIG. 11a but wherein the touch plate 10 is curved in two axes. FIG. 12a shows a top plan view and FIG. 12b shows an isometric view of touch plate 10. In this embodiment, the plate is curved in a concave direction relative to the x-axis and is also curved in a concave direction relative to the y-axis. As with the embodiment shown in FIG. 11a, the x-axis is defined as the axis running parallel to and equidistant from the pair of long edges of the rectangle and passing over the center point O on the touch surface. Therefore, the curvature of the plate can be measured from the distance of the touch surface from the x-axis. Similarly, the y-axis is defined as the axis running parallel to and equidistant from the pair of short edges of the rectangle and passing over the center point O on the touch surface. Therefore, the curvature of the plate along this axis can be measured from the distance of the touch surface from the y-axis.

FIGS. 12c and 12d shows respective section views along the x-axis and y-axis of the touch plate 10 of FIGS. 12a and 12b. In an example embodiment of a curved touch plate 10. The touch plate 10 has a width of 1900 mm along the x-axis and a height of 1070 mm along the y-axis. In this example embodiment, the glass is shaped such that the touch surface follows a parabolic curve relative to the x-axis. The center point O of touch surface 10 is the center of the touch surface and parallel with midpoint of the x-axis. Where the curvature of the touch surface 10 is parabolic, the maximum distance a between the touch surface and the x-axis is at the center point O. The maximum distance a is a positive number for a concave glass in the present examples. The curvature of the touch surface may therefore be modelled as:

$$z(x,y) = -a + b^*x^2 + c^*x^2y^2 + d^*y^2$$

where z is the distance between the plane defined by the x-axis and y-axis and the touch surface, and x and y are co-ordinates in the plane of the glass.

In an example embodiment having a flat perimeter around the plate with a max distance of 2.0 mm measured along the x-direction for y=0 (i.e. middle of plate):

$$z(x,y) = -2 + 5.56e{-}06^*x^2 - 4.74e{-}11^*x^2y2 + 1.7e{-}05^*y^2$$

In another example embodiment having a concave perimeter around the plate with a max distance of 2.0 mm measured along the x-direction for y=0 (mid short to short of screen) and with a max distance of 1.5 mm measured along the y-direction for x=0 (mid long to long of screen). Where the top and bottom edges have 1.0 mm max distance and the left and right edges have 0.5 mm max distance:

$$z(x,y) = -2.5 + 5.56e{-}06^*x^2 - 2.37e{-}11^*x^2{}^*y^2 + 1.28e{-}05^*y^2$$

Figure 13A:
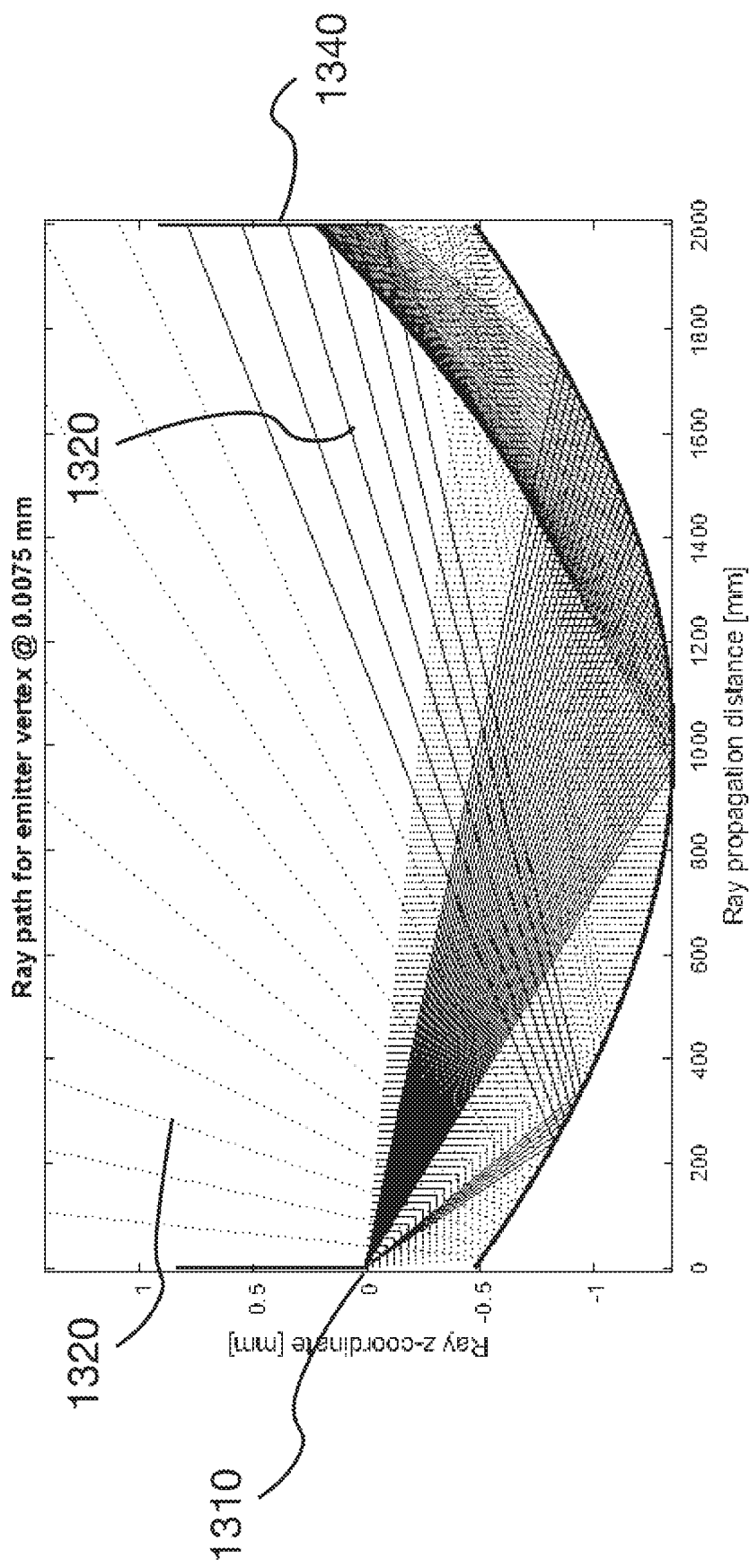
FIG. 13*a* shows a section render of light emitted from a point at an edge of a curved touch surface and propagating across the curved touch surface to be received at a detector at an opposite edge of the touch surface.

FIG. 13a shows a section view along the x-axis of light propagating across an example embodiment of a curved touch plate 10 touch surface having a curved profile in the x-axis. In the section view, the propagation paths of light from a point light source 1310 are shown. Dotted lines 1320 show propagation paths of light emitted from point light source 1310a that are not received by detector surface 1340. Solid lines 1330 show propagation paths of light emitted form point light source 1310 that are received by detector surface 1340. As shown in the figure, a portion of the light is lost above the detector, a portion is lost below the detector, and a portion of the light is received at the detector surface. A person looking from the emitter point towards the mirror image of the detector (mirrored in the touch surface) will perceive the detector size as 2.2 times larger than the real detector. This magnification effect is an effect of using an off axis parabolic mirror. In the specific case of touch systems, this results in a detection signal boost of a factor of 2.2, when comparing to a flat touch surface. This boost applies only to the signal and not significantly to the ambient light otherwise received by the detectors. In a preferred embodiment, the detectors and emitters of the touch system are 3 mm or less above the touch surface (either directly or indirectly) and the length of the detection lines being in the range from 100 to 2500 mm, the angle of incidence is extremely close to 90 degrees. With this, gracing incidence, dirt or anti-glare coatings on the touch surface have no practical impact of the reflection, so it is practically a mirror.

Figure 13B:
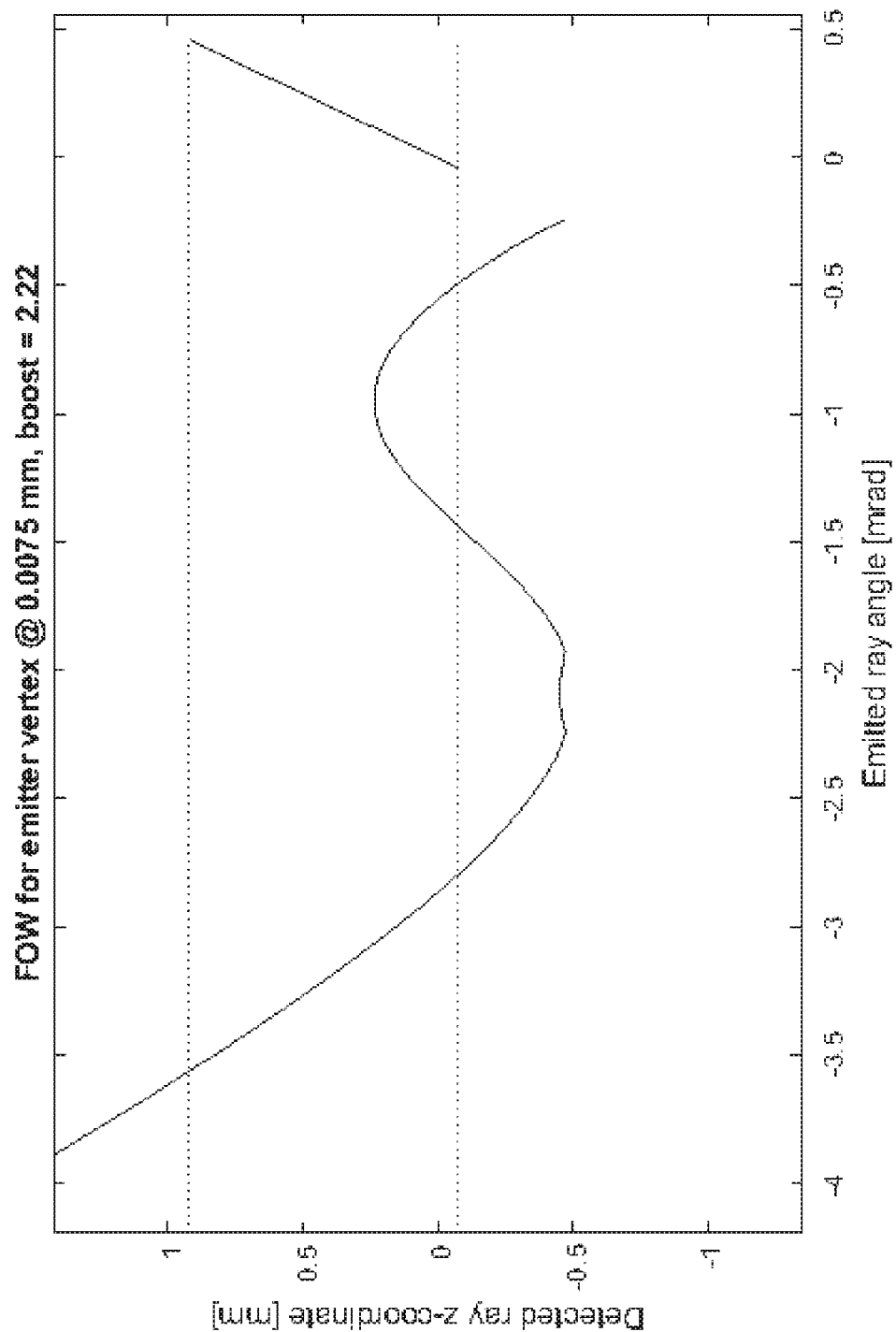
FIG. 13*b* shows a graph of light emitted from a point at an edge of a curved touch surface and received at a detector at an opposite edge of the touch surface with respect to the angle of the emitter light.

FIG. 13b provides a graph of the angle of the emitted light from the point light source 1310 with respect to the z-coordinate of the light path at the edge of the model of FIG. 13a. The detector surface z-coordinate range is shown by the vertical axis. Light emitted by point light source 1310 received at a z-coordinate within that range is received by the detector.

Figure 14A:
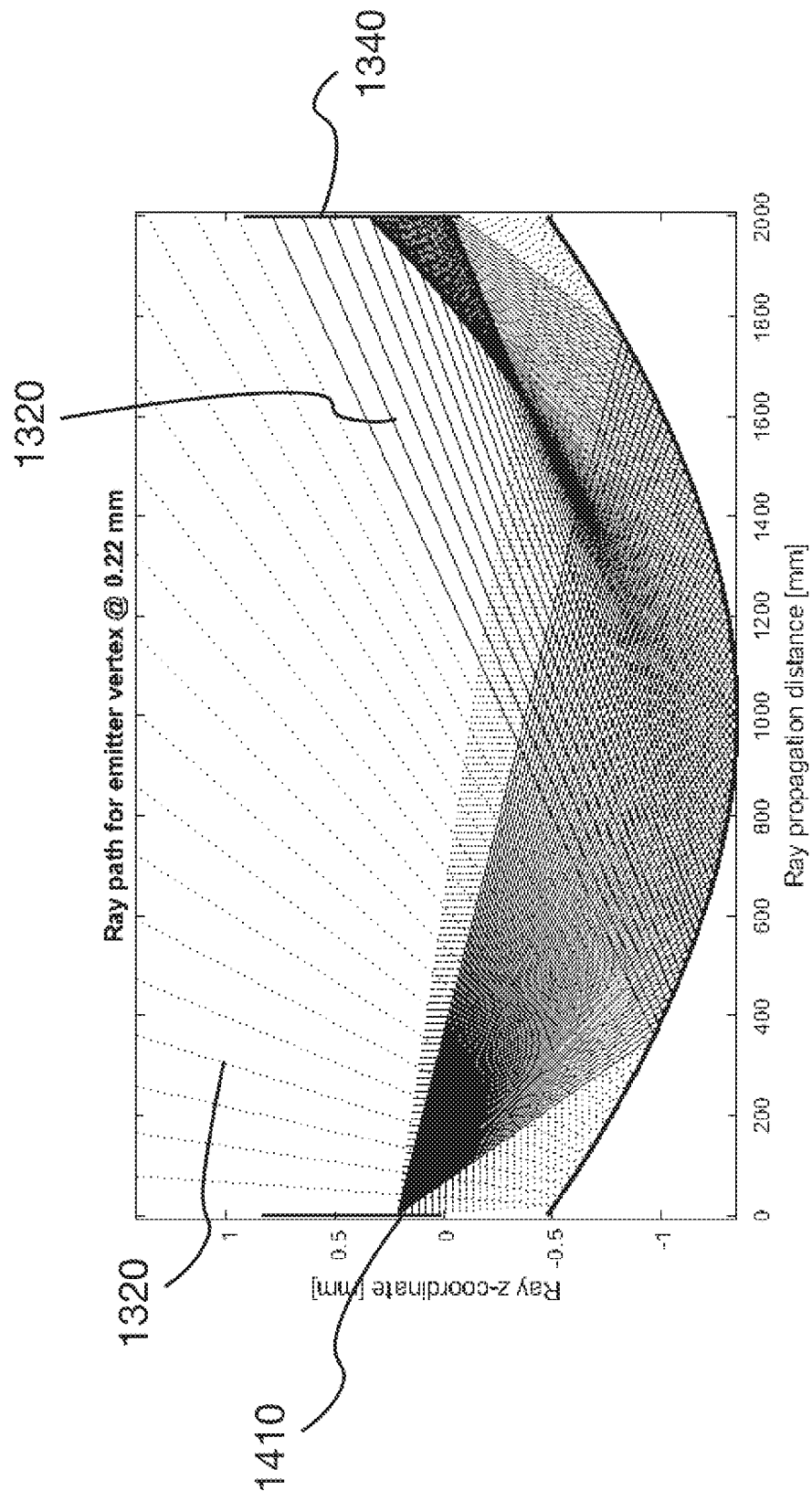
FIG. 14*a* shows a section render of light emitted from a point at an edge of a curved touch surface and propagating across the curved touch surface to be received at a detector at an opposite edge of the touch surface.
Figure 14B:
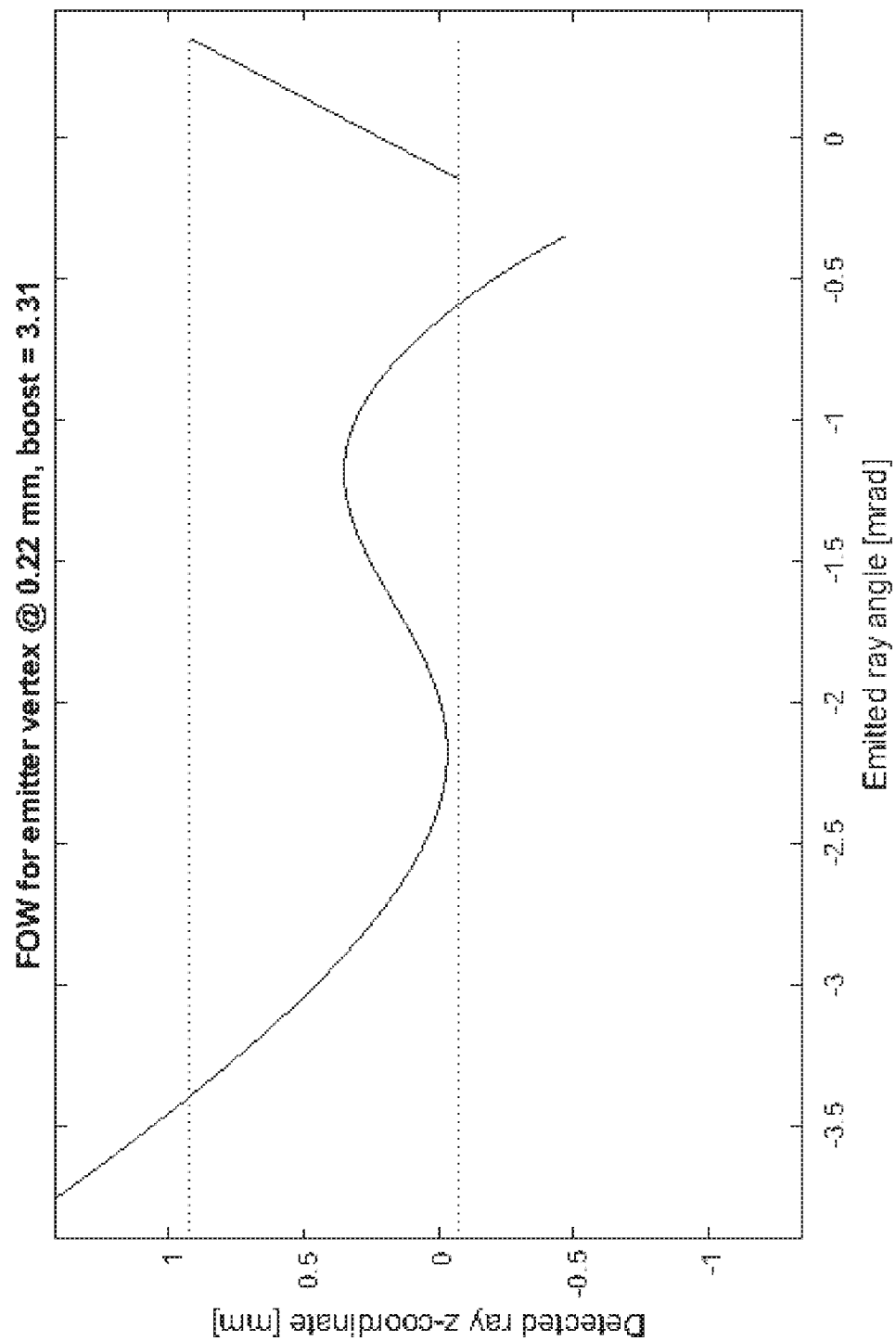
FIG. 14*b* shows a graph of light emitted from a point at an edge of a curved touch surface and received at a detector at an opposite edge of the touch surface with respect to the angle of the emitter light.

FIG. 14a shows a section view of the embodiment of FIG. 13a. In the section view, the propagation paths of light from a second point light source 1410 are shown. In this example, the detection signal boost is approximately 3.3. FIG. 14b shows the corresponding graph of FIG. 13b for the second point light source 1410.

Figure 15A:
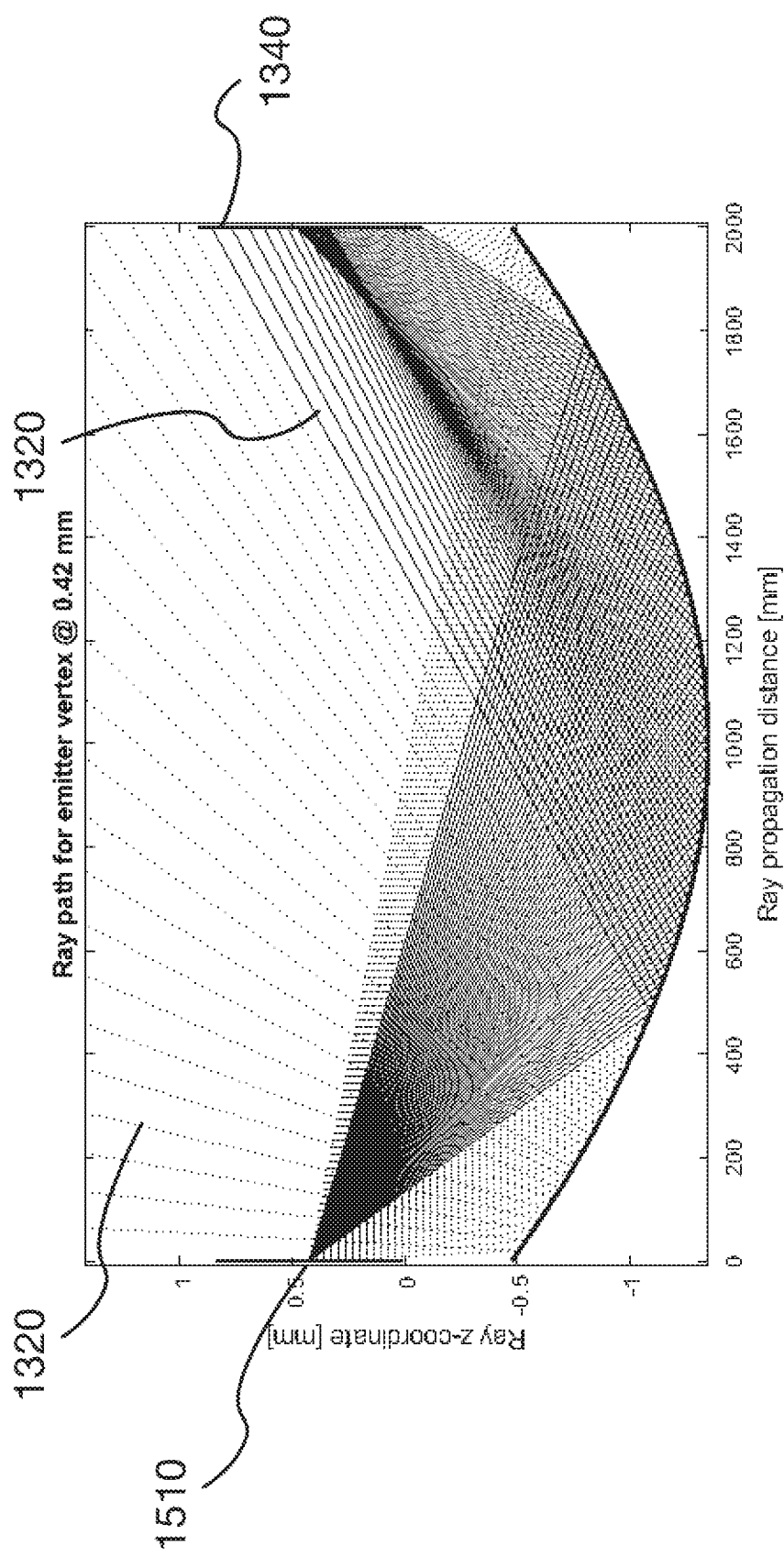
FIG. 15*a* shows a section render of light emitted from a point at an edge of a curved touch surface and propagating across the curved touch surface to be received at a detector at an opposite edge of the touch surface.
Figure 15B:
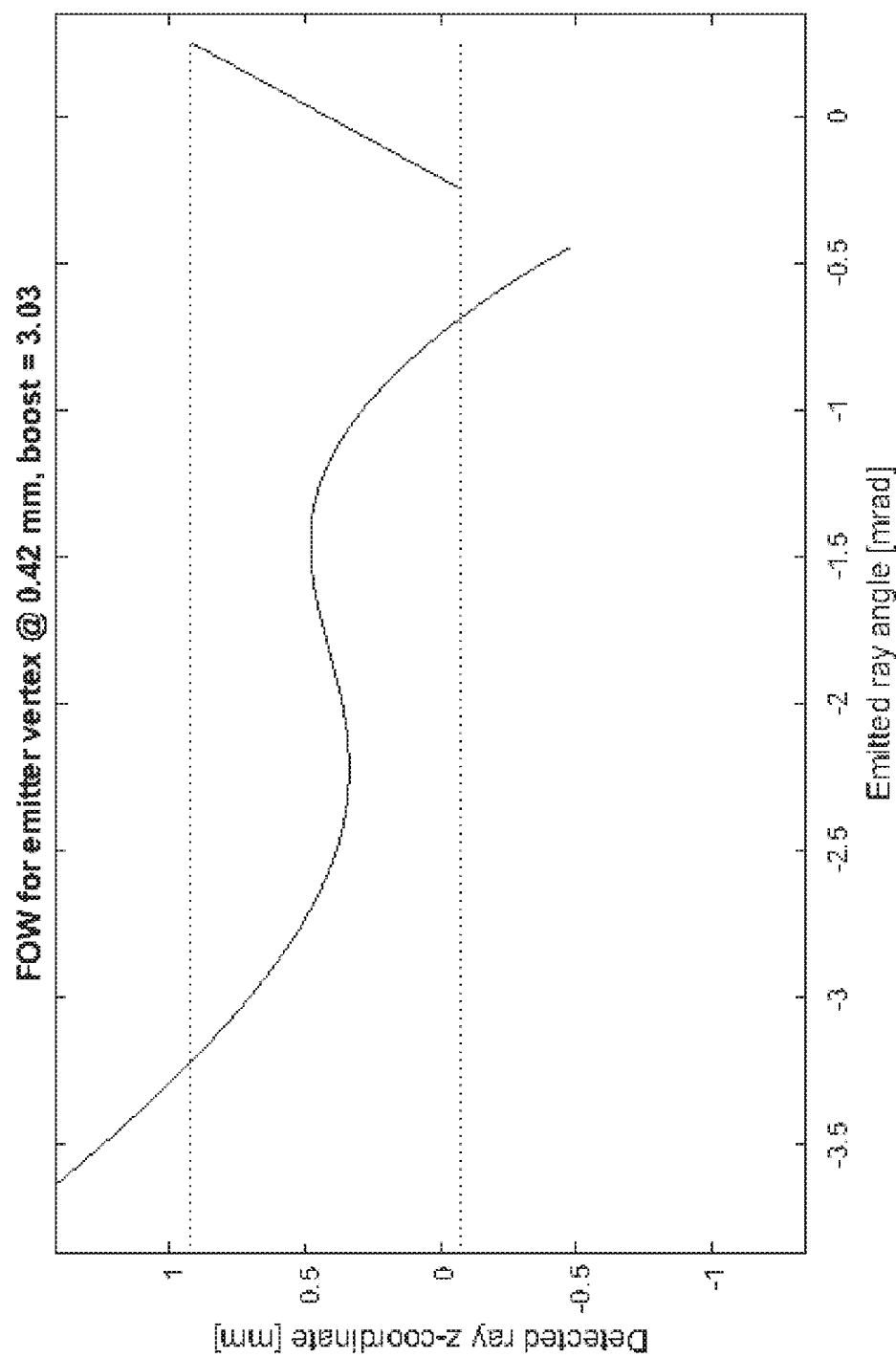
FIG. 15b shows a graph of light emitted from a point at an edge of a curved touch surface and received at a detector at an opposite edge of the touch surface with respect to the angle of the emitter light.

FIG. 15a shows a section view of the embodiment of FIG. 13a. In the section view, the propagation paths of light from a third point light source 1510 are shown. FIG. 15b shows the corresponding graph of FIG. 13b for the third point light source 1510. In this example, the detection signal boost is approximately 3.03.

Figure 16A:
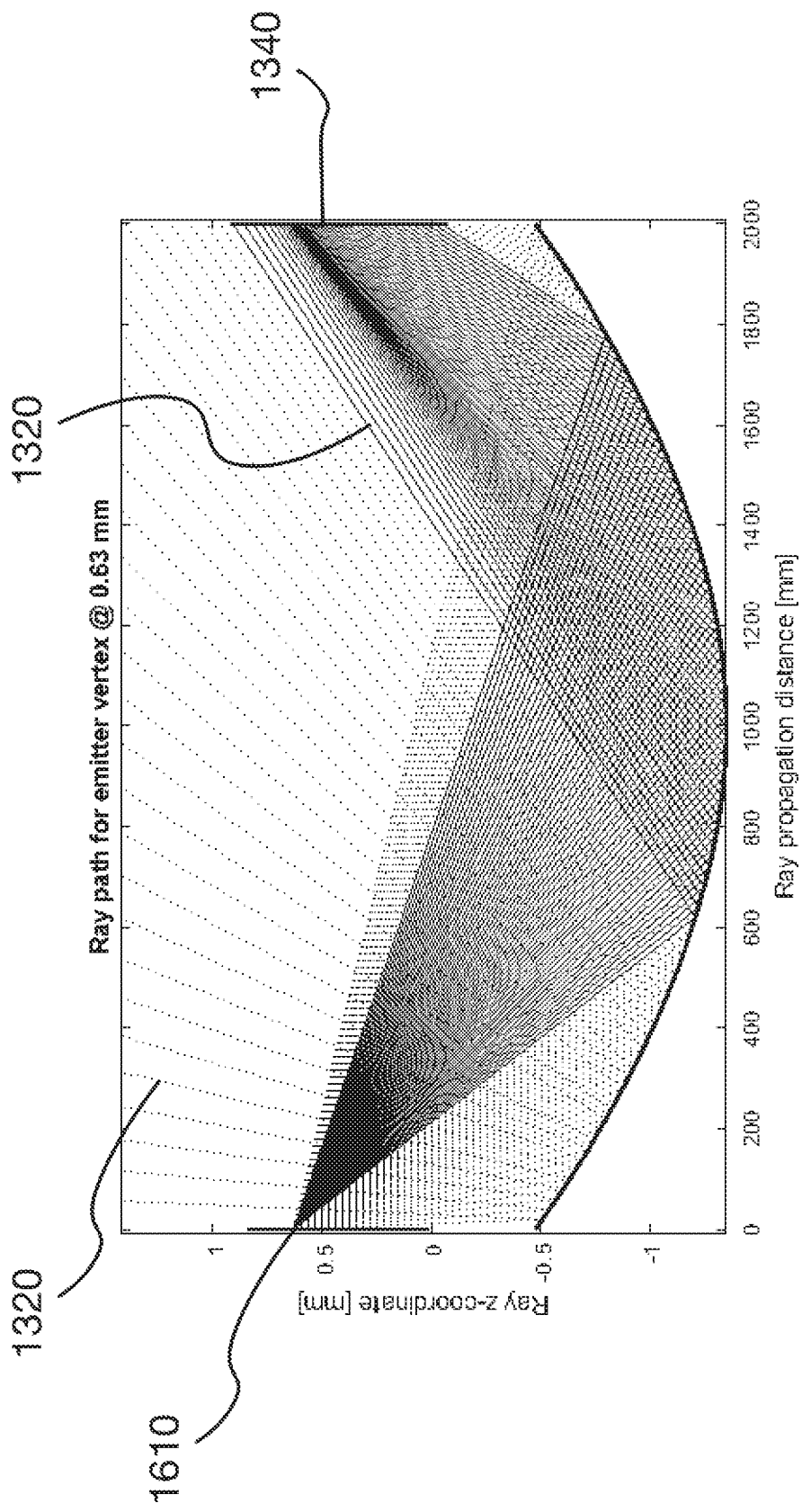
FIG. 16a shows a section render of light emitted from a point at an edge of a curved touch surface and propagating across the curved touch surface to be received at a detector at an opposite edge of the touch surface.
Figure 16B:
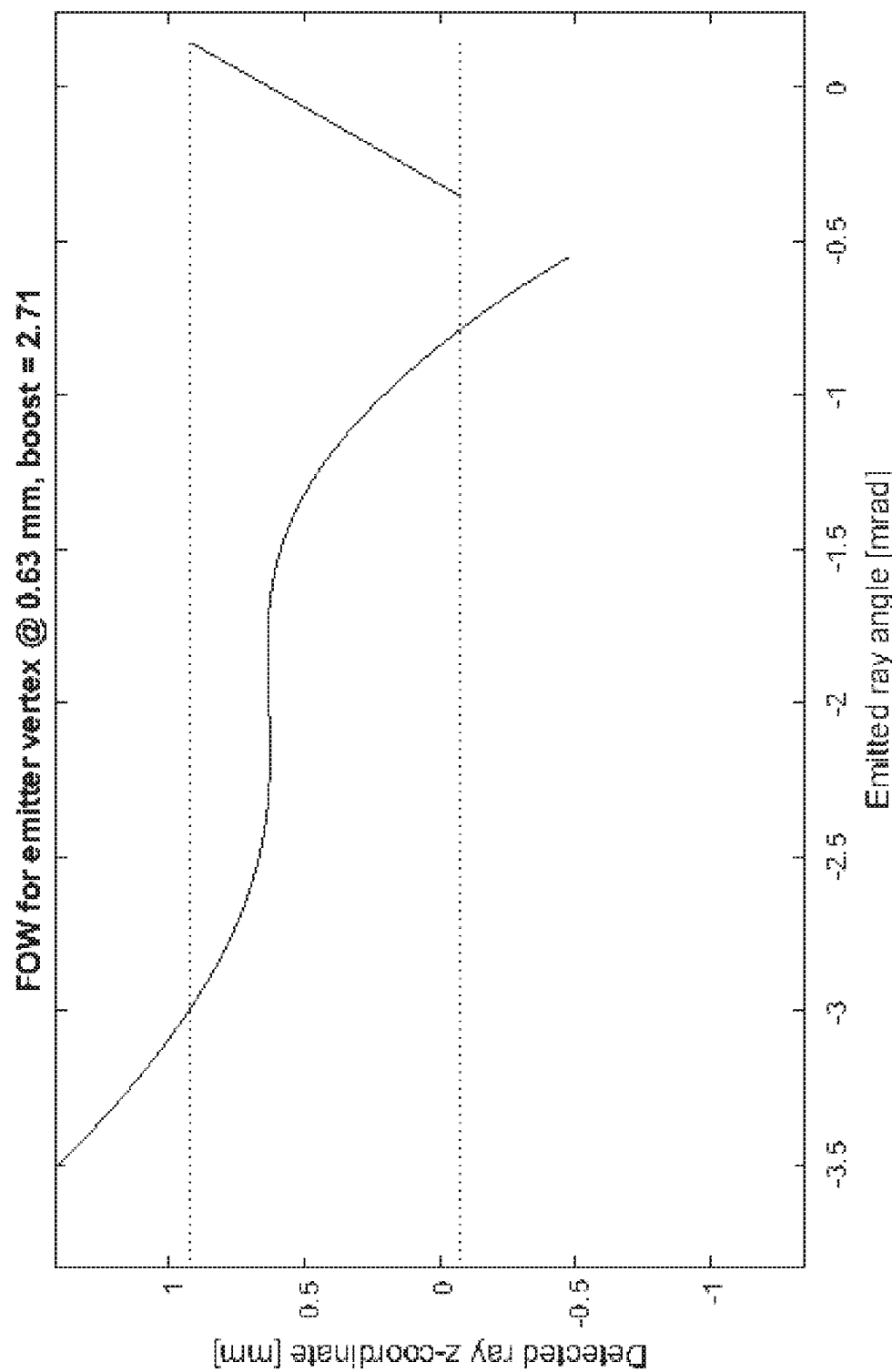
FIG. 16b shows a graph of light emitted from a point at an edge of a curved touch surface and received at a detector at an opposite edge of the touch surface with respect to the angle of the emitter light.

FIG. 16a shows a section view of the embodiment of FIG. 13a. In the section view, the propagation paths of light from a fourth point light source 1610 are shown. FIG. 16b shows the corresponding graph of FIG. 13b for the fourth point light source 1610. In this example, the detection signal boost is approximately 2.71.

Figure 17A:
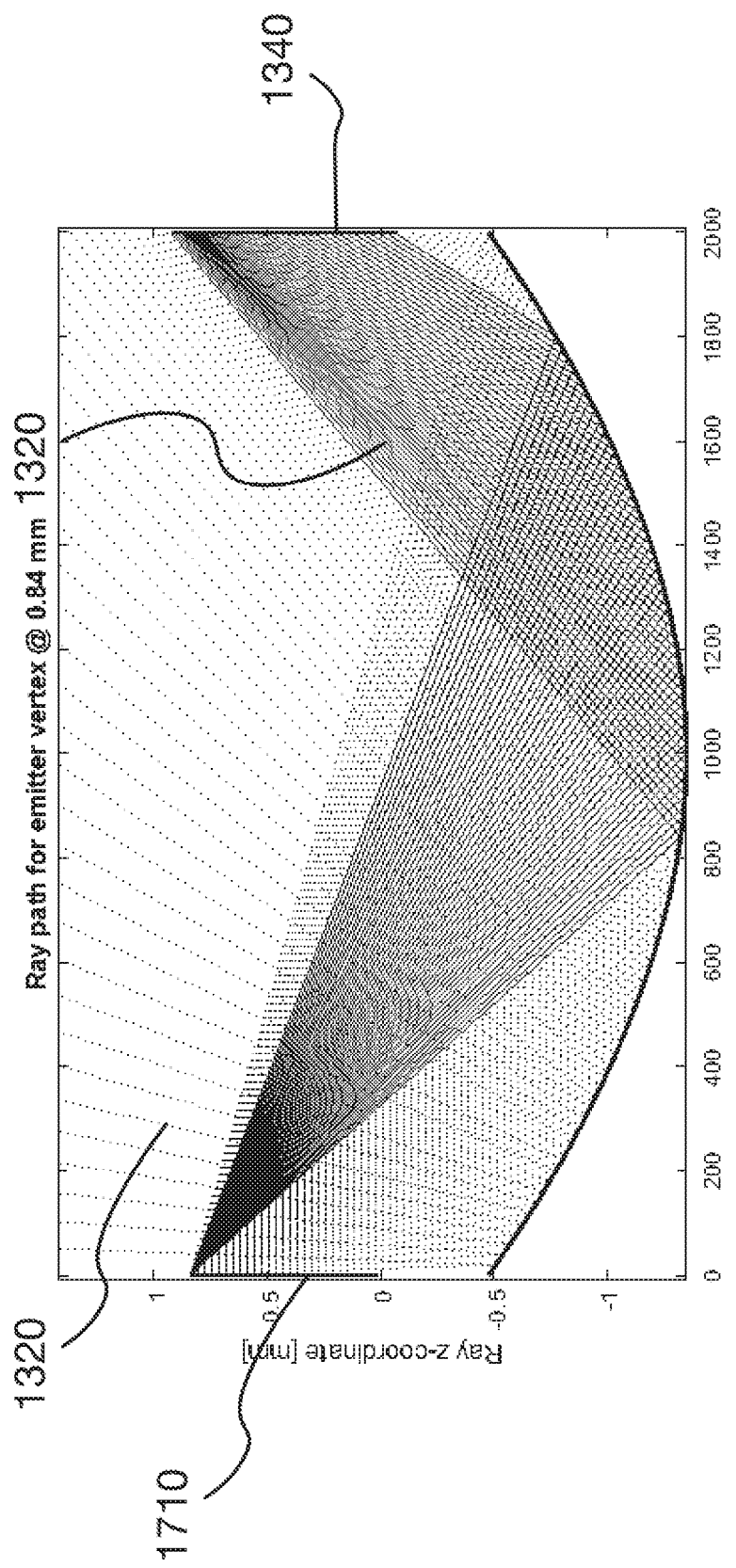
FIG. 17a shows a section render of light emitted from a point at an edge of a curved touch surface and propagating across the curved touch surface to be received at a detector at an opposite edge of the touch surface.

FIG. 17a shows a section view of the embodiment of FIG. 13a. In the section view, the propagation paths of light from a fifth point light source 1710 are shown. FIG. 17b shows the corresponding graph of FIG. 13b for the fifth point light source 1710. In this example, the detection signal boost is approximately 2.19.

FIGS. 13a-17b demonstrate that different emitter positions utilize different parts of the touch surface. The parts of the touch surface that work as reflectors will depend on the actual shape of the glass and the placement and sizes of the emitter and detector apertures surface 1340.

However, the touch plate 10 cannot be manufactured, positioned, or held in shape perfectly. Consequently, a certain amount of deviation can be expected between the curve followed by the touch surface and an ideal parabolic curve.

FIG. 18a shows a graph of a mathematically defined parabolic curve and a real-world parabolic touch surface. In the example embodiment of FIG. 18a, a curved touch plate 10 has a width of 1900 mm along the x-axis and a height of 1070 mm along the y-axis (wherein the x-axis and y-axis are defined as in the embodiment shown in FIG. 12a,4b). In this example embodiment, the glass is shaped such that the touch surface follows parabolic curve 1810 relative to the x-axis. The maximum distance a between the touch surface and the x-axis is 10 mm. The mathematically defined parabolic curve is defined as 1820. The graph shows the deviation between the mathematically defined parabolic curve represented by dotted line 1820 and real touch surface 1810. Here, the real touch surface is asymmetrically warped. FIG. 10b shows the short to short mid cross section of a 2180 mm diagonal, 16:9 ratio, thermally tempered glass that is just within or at the maximum limit of concave distance <6 mm as well as |parabolic deviation|<0.5 mm.

The parabolic fit of the touch surface 1810 has an s-shaped residual. Such asymmetrical warping may be the result of problems with transport rollers or an uneven temperature distribution during the rapid cooling phase of tempering process during manufacture.

Figure 18B:
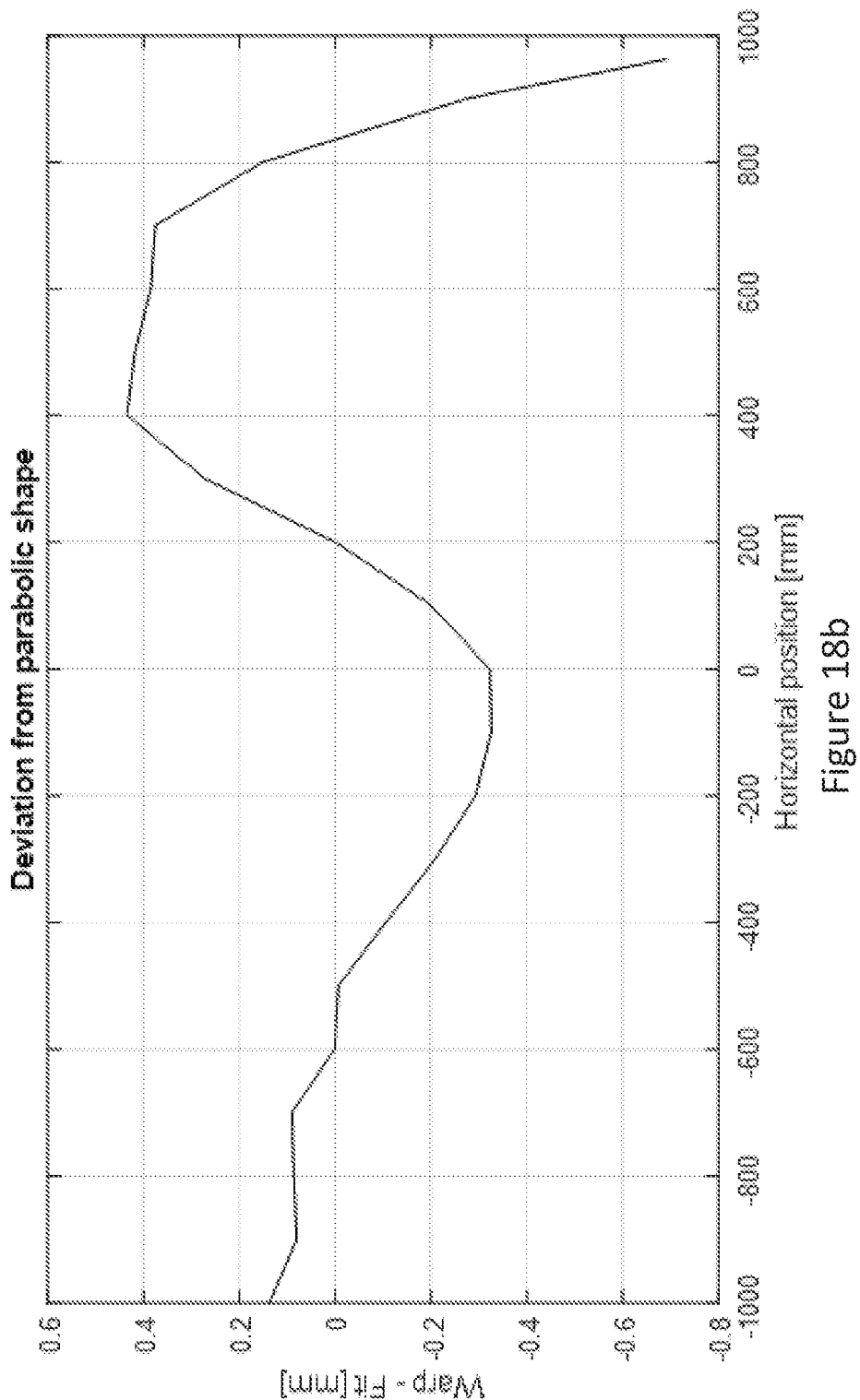
FIG. 18b shows a deviation between a real touch surface vs a parabolic curved surface along an x-axis.

FIG. 18b shows a graph of the deviation between the mathematically defined parabolic curve and a real-world parabolic touch surface of FIG. 18a.

The following table defines a preferred set of restrictions on the shape of the touch surface in order to achieve an optimal touch surface shape. The term 'warp' defines the distance of the touch surface from the respective axis intersecting the center point O in the direction of the z-axis.

| Glass size | Min x-axis warp (mm) | Max x-axis warp (mm) | Min y-axis warp (mm) | Max y-axis warp (mm) | Max convexity* (mm) | Max parabolic deviation (mm) |
|---|---|---|---|---|---|---|
| 55" | 1.0 | 3.50 | 0.0 | 1.35 | 0.1 | 0.5 |
| 65" | 1.0 | 4.50 | 0.0 | 1.65 | 0.1 | 0.5 |
| 70" | 1.0 | 5.10 | 0.0 | 1.85 | 0.1 | 0.5 |
| 75" | 1.0 | 5.70 | 0.0 | 2.00 | 0.1 | 0.5 |
| 84"-86" | 1.0 | 6.00 | 0.0 | 2.00 | 0.1 | 0.5 |

Convexity b is shown in FIG. 18a. Parabolic deviation is shown in FIG. 18b.

Figure 19A:
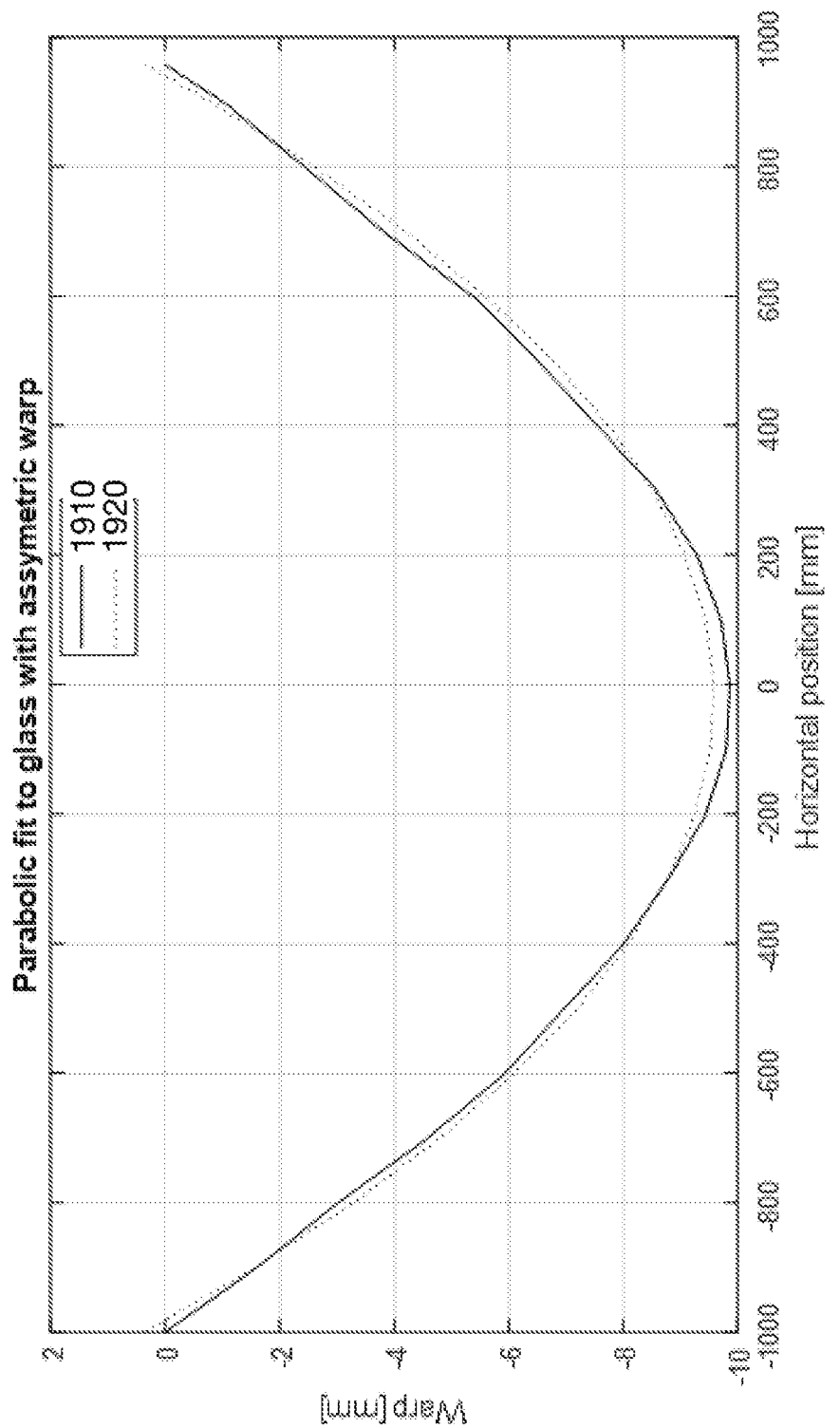
FIG. 19a shows a curvature of a real touch surface vs a parabolic curved surface along an x-axis.

FIG. 19a shows another graph of a mathematically defined parabolic curve and a similar glass to that of FIG. 18a but wherein the glass of FIG. 19a is out of range and not recommended for touch system production. One reason for the large concavity shown in FIG. 19a may be that the tempering process has been run with too large differences between bottom and top cooling parameters in a quenching process during manufacturing. The mathematically defined parabolic curve is defined as 1920. The graph shows the deviation between the mathematically defined parabolic curve and real touch surface 1910.

Figure 19B:
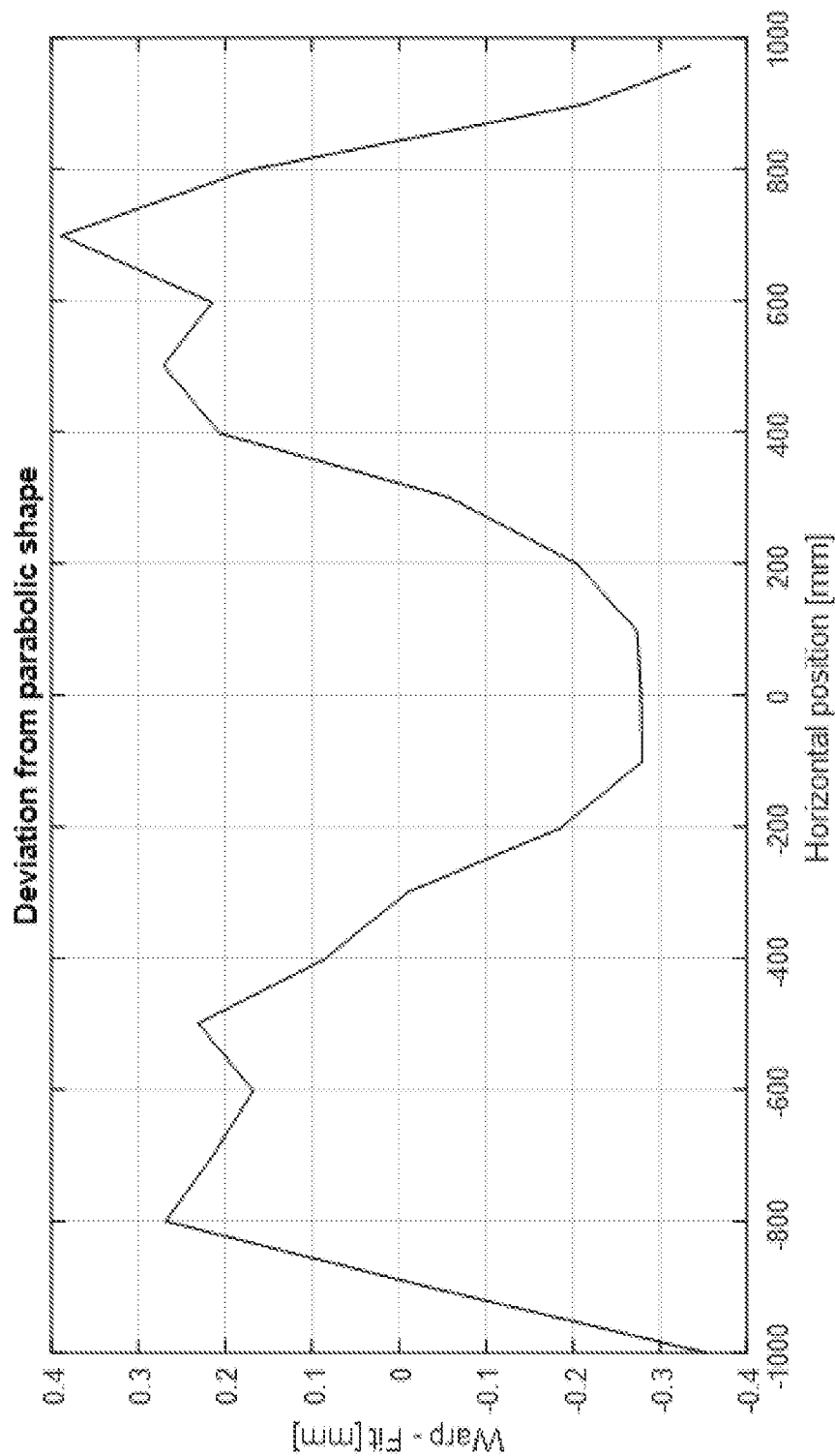
FIG. 19b shows a deviation between a real touch surface vs a parabolic curved surface along an x-axis.

FIG. 19b shows a graph of the deviation between the mathematically defined parabolic curve and a real-world parabolic touch surface of FIG. 19a. The real-world parabolic touch surface of FIG. 19a is an example of a symmetrical but higher order warping (e.g. W shaped). Such warping may significantly reduce signal boost and may be caused by symmetrical temperature problems (e.g. too hot in center or edge of glass) during the manufacturing tempering process.

Figure 20A:
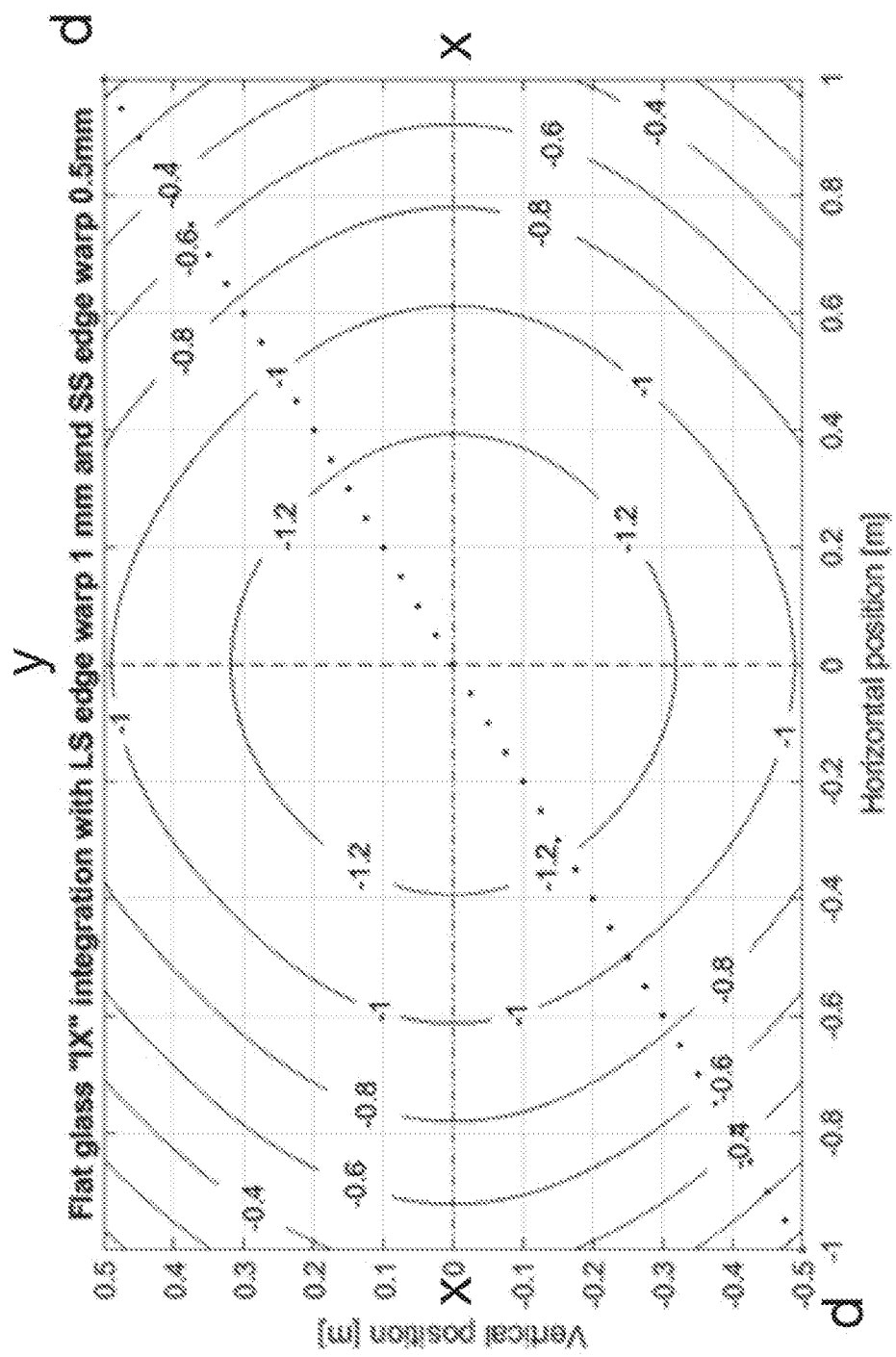
FIG. 20a shows top view of displacement contours for a touch surface according to an embodiment.
Figure 20B:
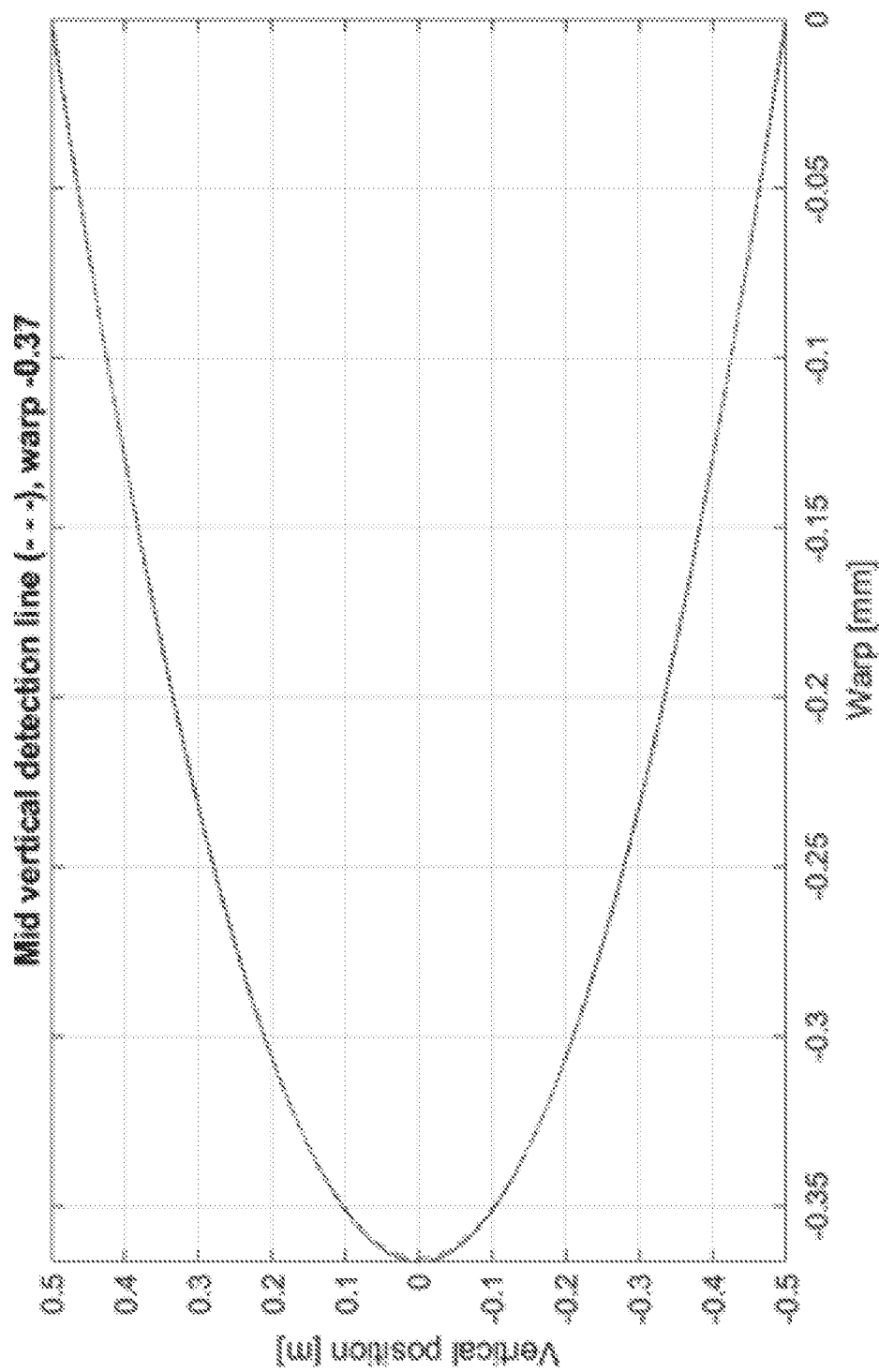

FIG. 20a shows an embodiment in which the touch surface forms a paraboloid. In FIG. 20a, a top plan view of the touch surface is shown with contour lines showing the depth of the touch surface relative to a flat plane intersecting the four corners of the touch surface. The numbers shown on each contour represents the depth of the contour. The x-axis, y-axis, and diagonal-axis d are all shown. The x-axis is defined as an axis running parallel to and equidistant from the pair of long edges of the rectangle. The y-axis is defined as an axis running parallel to and equidistant from the pair of short edges of the rectangle. Diagonal-axis d is defined as an axis running diagonally from one corner to a diagonally opposite corner. In this embodiment, the x-axis, y-axis, and diagonal axis d of touch surface 10 each describe a parabola with respect to the depth of the touch surface. In FIG. 20b, diagonal-axis d is shown running from the bottom left corner to the top right corner. In the example embodiment of FIG. 20a, the curved touch plate 10 has a width of 1900 mm along the x-axis and a height of 1070 mm along the y-axis.

Figure 20C:
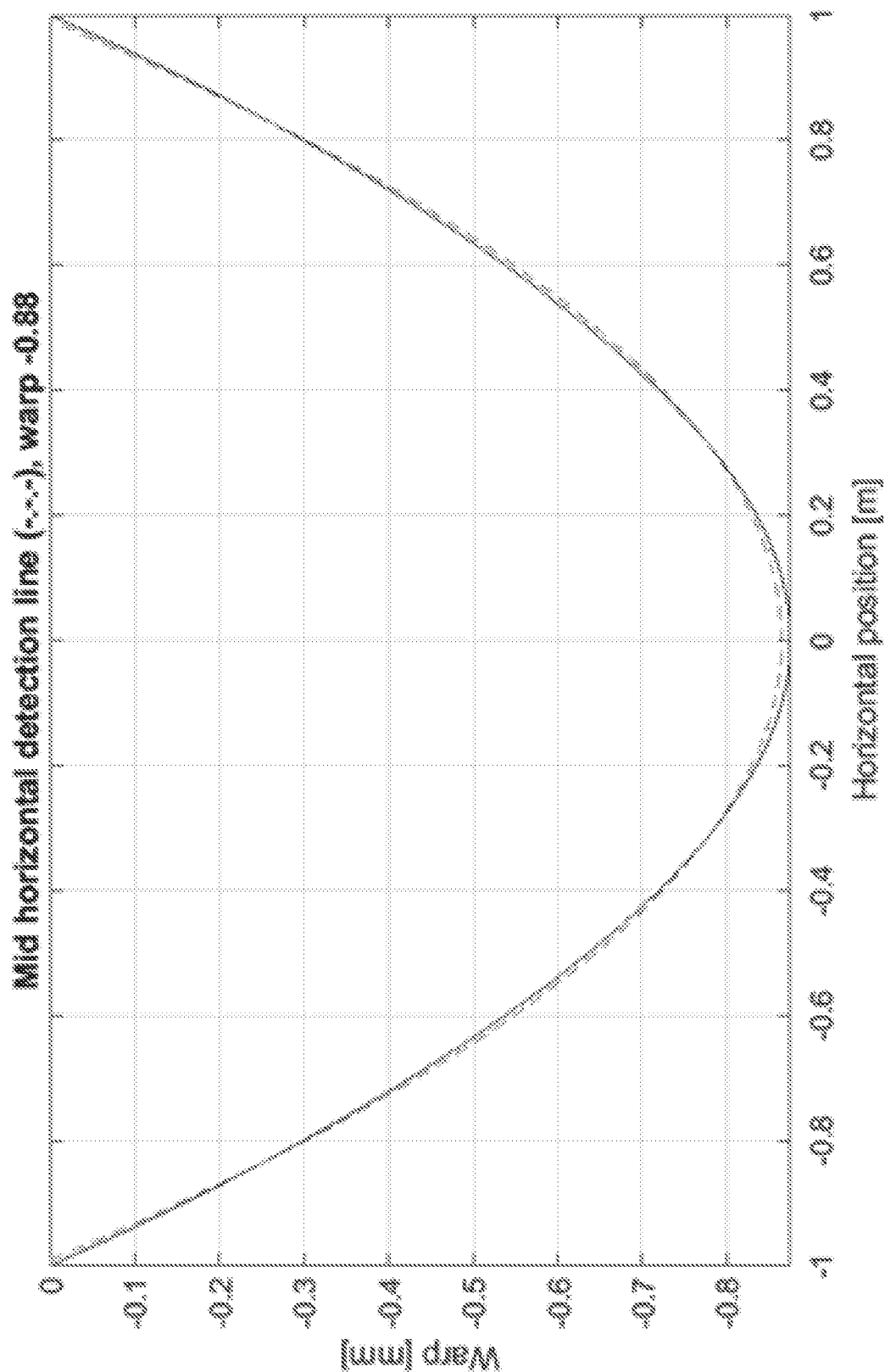
Figure 20D:
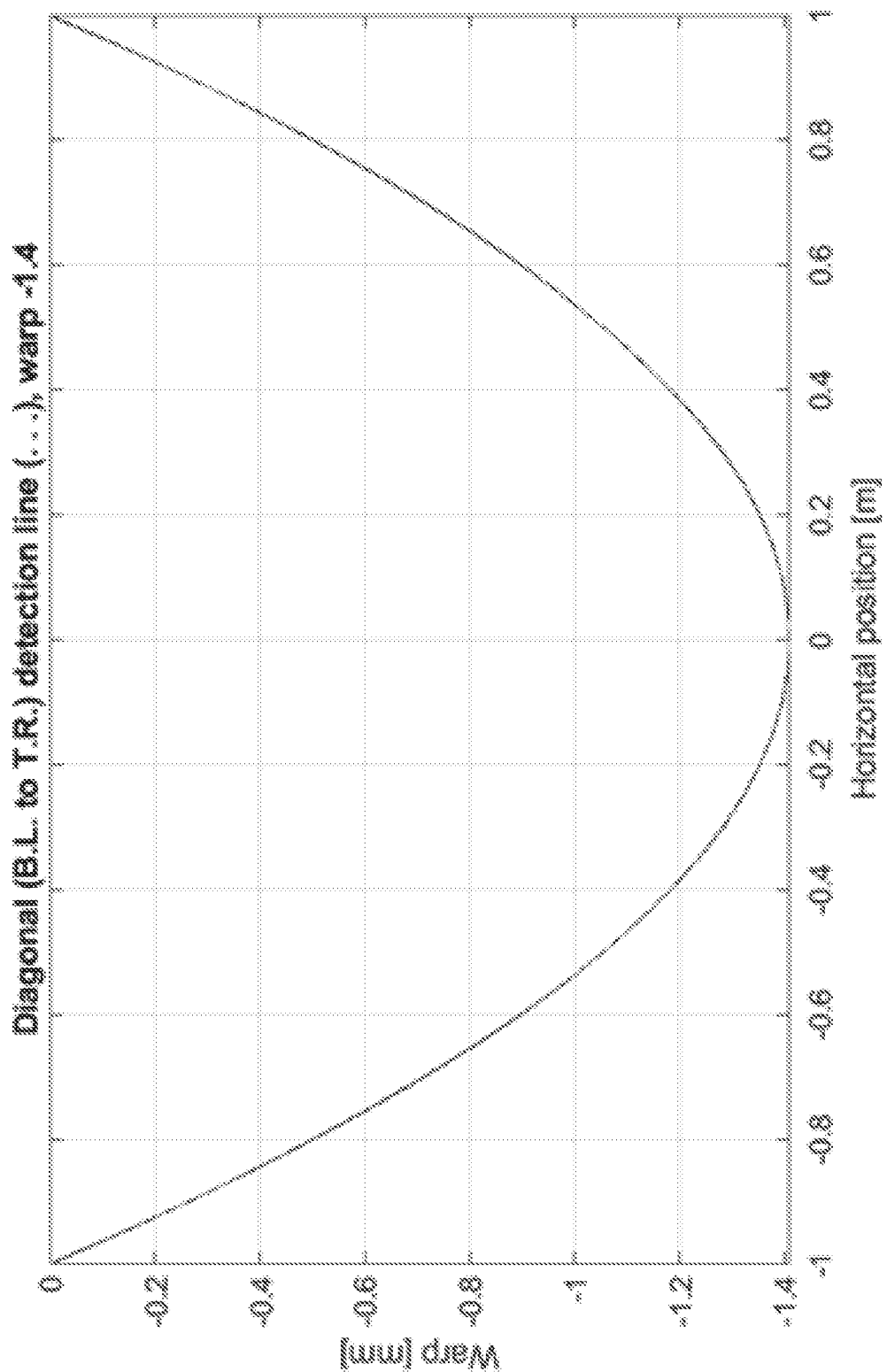

FIGS. 20b-20d show optional parabola configurations for the embodiment shown in FIG. 20a. FIG. 20b shows a graph of the desired parabola of the touch surface underneath the x-axis and relative to the x-axis. The deviation (bottom axis) from the x-axis is shown relative to the position (left axis) along the x-axis. FIG. 20c shows a graph of the desired parabola of the touch surface underneath the y-axis and relative to the y-axis. The deviation (bottom axis) from the x-axis is shown relative to the position (left axis) along the y-axis. FIG. 20d shows a graph of the desired parabola of the touch surface underneath the diagonal-axis and relative to the diagonal-axis. The deviation (bottom axis) from the x-axis is shown relative to the position (left axis) along the diagonal-axis.

The embodiments shown in FIG. 20a-20d describe a touch surface providing substantial signal boost for signals travelling between most emitters and detectors. However, the non-flat perimeter of the touch surface makes manufacture and assembly of such a system more complex.

Figure 21A:
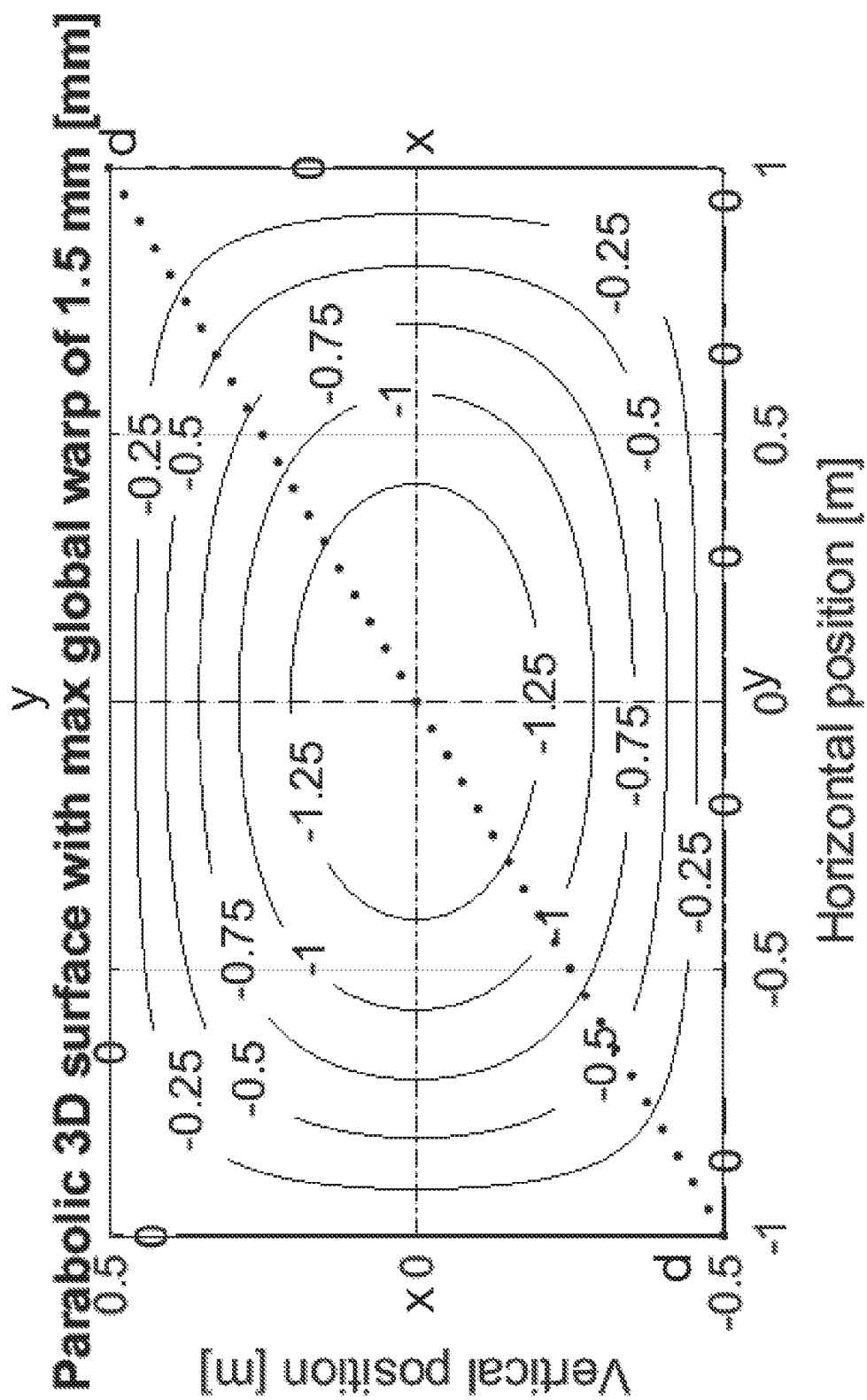
FIG. 21a shows top view of displacement contours for a touch surface according to another embodiment.
Figure 21B:
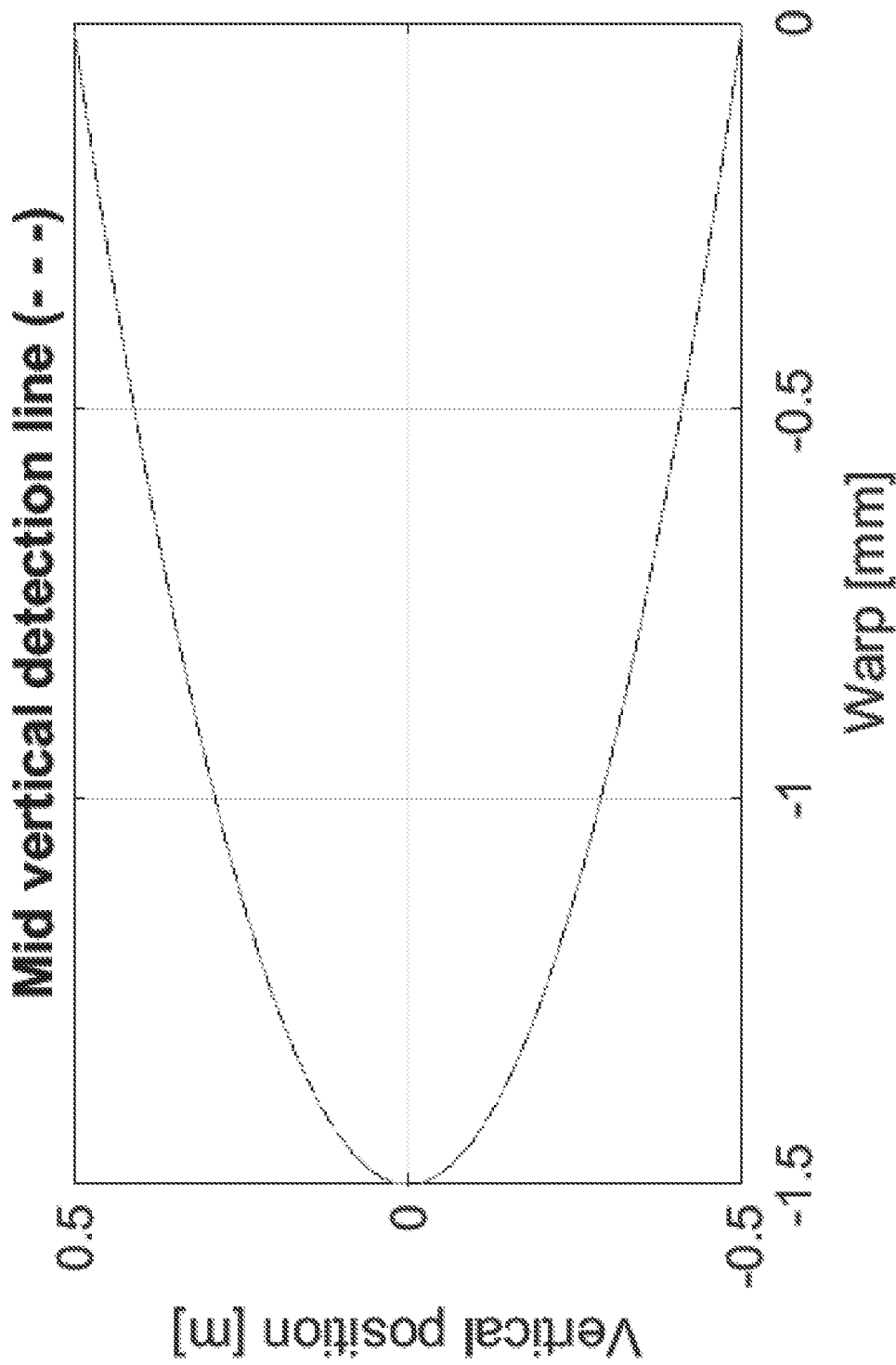

FIG. 21a shows an embodiment in which the touch surface forms an alternative paraboloid to that of the embodiment shown in FIG. 20a. As with FIG. 20a, FIG. 21a provides a top plan view of the touch surface is shown with contour lines showing the depth of the touch surface relative to a flat plane intersecting the four edges of the touch surface 10. The numbers shown on each contour represents the depth of the contour. X-axis, y-axis, and diagonal-axis d are all shown. The x-axis is defined as an axis running parallel to and equidistant from the pair of long edges of the rectangle. In this embodiment, the x-axis of touch surface 10 describes a parabola with respect to the depth of the touch surface. The y-axis is defined as an axis running parallel to and equidistant from the pair of short edges of the rectangle. In this embodiment, the y-axis of touch surface 10 also describes a parabola with respect to the depth of the touch surface. Diagonal-axis d is defined as an axis running diagonally from one corner to a diagonally opposite corner. In FIG. 21b, diagonal-axis d is shown running from the bottom left corner to the top right corner. In the example embodiment of FIG. 21a, the curved touch plate 10 has a width of 1900 mm along the x-axis and a height of 1070 mm along the y-axis. The perimeter of the touch surface of this embodiment is flat or close to flat. In embodiments where the perimeter of the touch surface is flat or close to flat, the surface beneath some detection lines will not be perfect parabolas. Even for an almost perfect integrated glass shape with a warp in the range of 1-2.5 mm some detection lines (a very small portion) will actually have less signal than for a flat glass. This small drawback is counter balanced by the significant overall signal improvements. Furthermore, touch systems where the perimeter of the touch surface is flat or close to flat can be easier to manufacture and assemble.

Figure 21C:
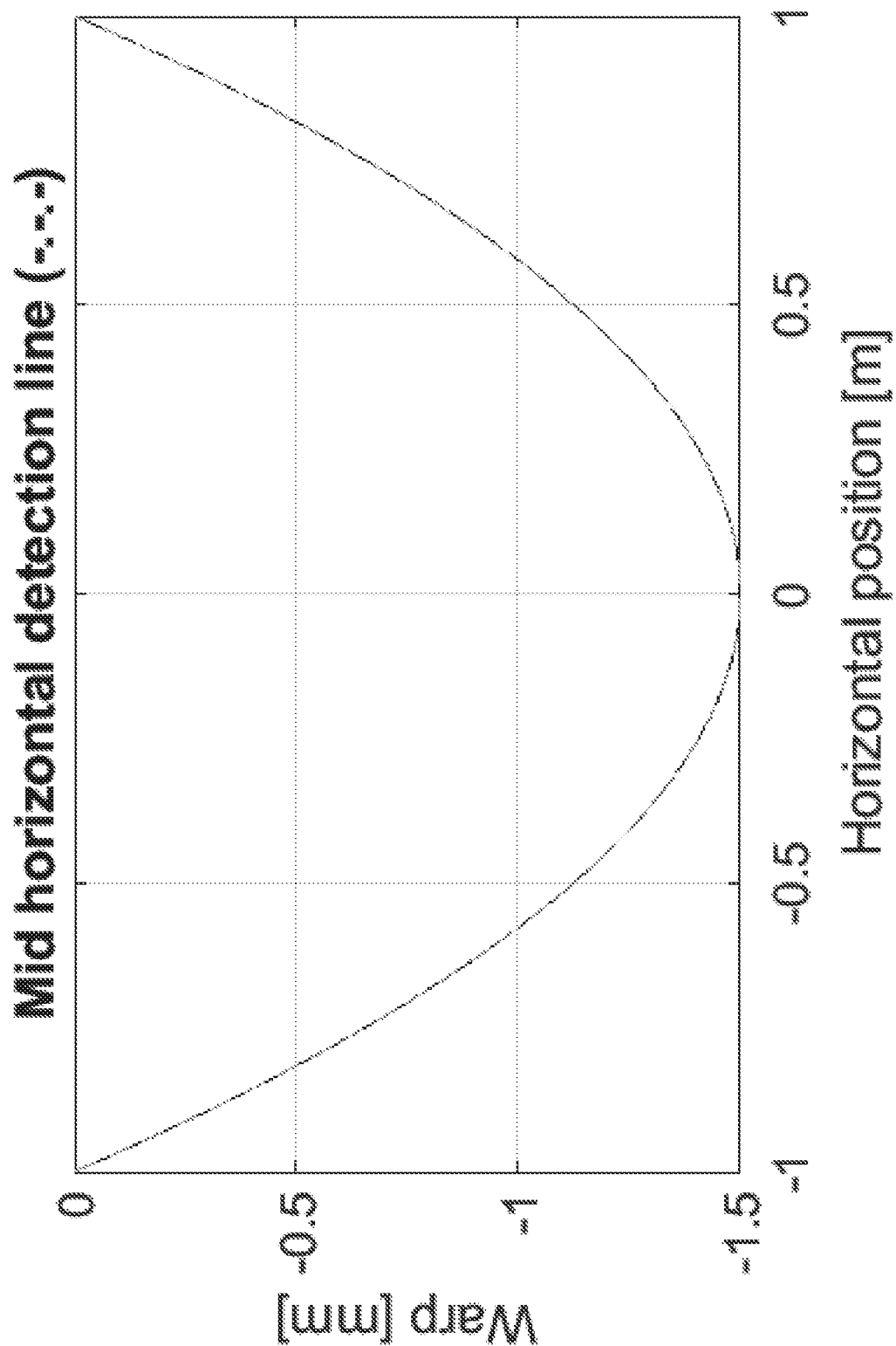
Figure 21D:
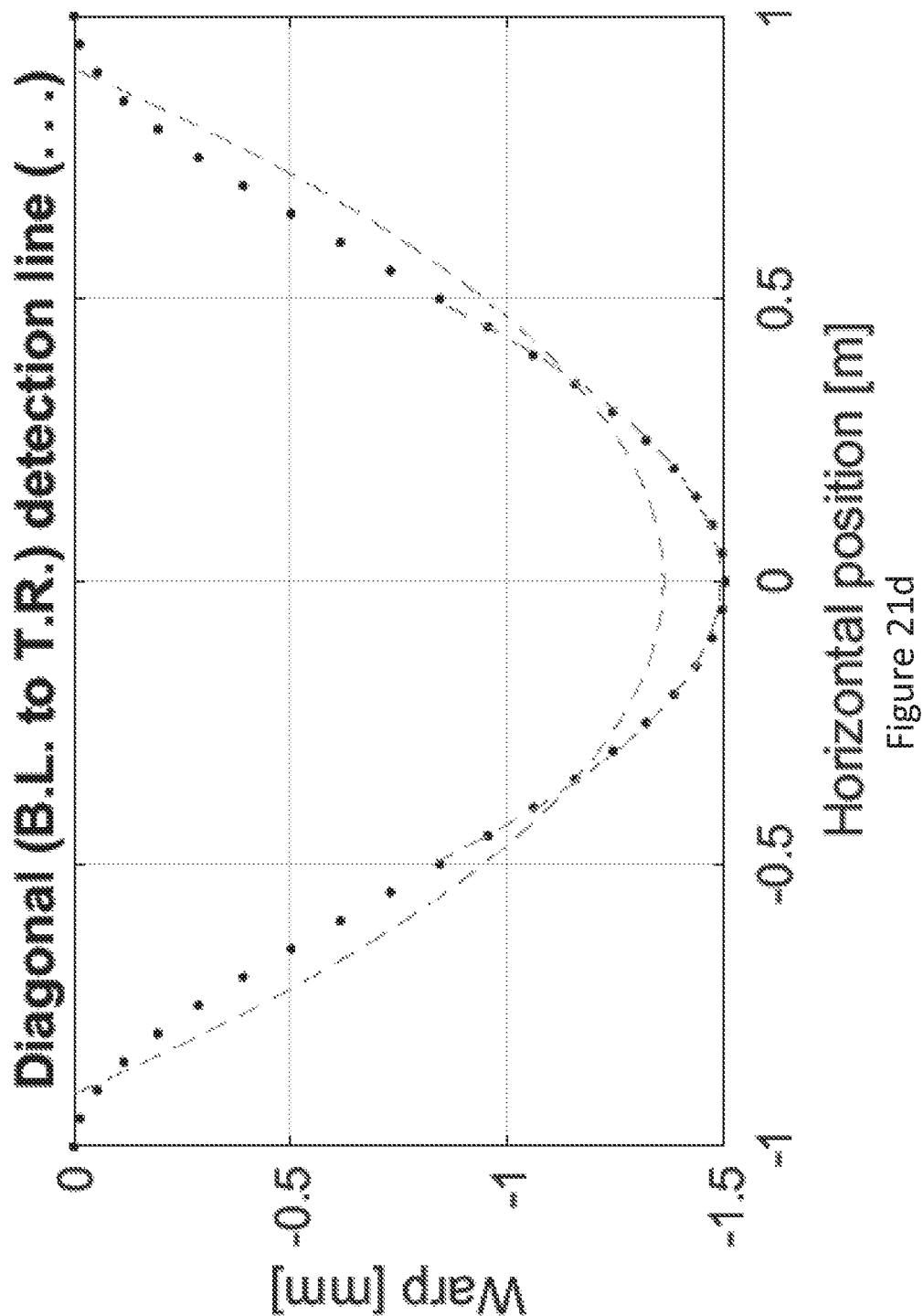

FIG. 21b shows a graph of the desired parabola of the touch surface underneath the x-axis and relative to the x-axis. The deviation (bottom axis) from the x-axis is shown relative to the position (left axis) along the x-axis. FIG. 21c shows a graph of the desired parabola of the touch surface underneath the y-axis and relative to the y-axis. The deviation (bottom axis) from the x-axis is shown relative to the position (left axis) along the y-axis. FIG. 21d shows a graph of the desired parabola of the touch surface underneath the diagonal-axis and relative to the diagonal-axis. The deviation (bottom axis) from the x-axis is shown relative to the position (left axis) along the diagonal-axis.

As will be apparent, the features and attributes of the specific embodiments disclosed above may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

What is claimed is:

1. A touch sensing apparatus comprising:
a display panel;
a plate including a top surface that comprises a touch surface;
one or more emitters arranged adjacent to a periphery of the plate and configured to emit light across the touch surface of the plate;
a set of detectors arranged adjacent to the periphery of the plate and configured to receive light from the one or more emitters; and
a frame assembly configured to support the display panel and the plate,
wherein the touch surface is curved along a first axis, wherein the first axis is substantially parallel to a propagation direction of the emitted light across the touch surface,
wherein at least one edge of the top surface is curved, and
wherein the plate has a first curvature in the touch surface when not installed in the frame assembly, and wherein the plate has a second curvature different from the first curvature when the plate is installed in the frame assembly.

2. The touch sensing apparatus according to claim 1, wherein the first axis is parallel to the at least one edge of the top surface.

3. The touch sensing apparatus according to claim 1, wherein the touch surface is curved along a second axis.

4. The touch sensing apparatus according to claim 3, wherein the second axis is substantially perpendicular to the first axis and in the same plane as the first axis.

5. The touch sensing apparatus according to claim 1, wherein an opposing edge, opposed to the at least one edge of the top surface, is curved.

6. The touch sensing apparatus according to claim 1, wherein a diagonal dimension of the plate is at least 55 inches.

7. The touch sensing apparatus according to claim 1, wherein the frame assembly is configured to control a curvature of the plate.

8. A touch sensing apparatus comprising:
a display panel;
a plate including a top surface that comprises a touch surface;
one or more emitters arranged adjacent to a periphery of the plate and configured to emit light across the touch surface of the plate;
a set of detectors arranged adjacent to the periphery of the plate and configured to receive light from the one or more emitters; and
a frame assembly configured to support the display panel and the plate,
wherein at least one edge of the top surface is curved, wherein a diagonal dimension of the plate is at least 55 inches, and
wherein the plate has a first curvature in the touch surface when not installed in the frame assembly, and wherein the plate has a second curvature different from the first curvature when the plate is installed in the frame assembly.

9. The touch sensing apparatus according to claim 8, wherein the frame assembly is configured to control a curvature of the plate.

10. The touch sensing apparatus according to claim 8, wherein the touch surface is curved along a first axis, and wherein the first axis is substantially parallel to a propagation direction of the emitted light across the touch surface.

11. The touch sensing apparatus according to claim 8, wherein the first axis is parallel to the at least one edge of the top surface.

12. The touch sensing apparatus according to claim 8, wherein the touch surface is curved along a second axis.

13. The touch sensing apparatus according to claim 12, wherein the second axis is substantially perpendicular to the first axis and in the same plane as the first axis.

14. The touch sensing apparatus according to claim 8, wherein an opposing edge, opposed to the at least one edge of the top surface, is curved.

15. A touch sensing apparatus comprising:
a display panel;
a plate including a top surface that comprises a touch surface;
one or more emitters arranged adjacent to a periphery of the plate and
configured to emit light across the touch surface of the plate;
a set of detectors arranged adjacent to the periphery of the plate and configured to receive light from the one or more emitters; and
a frame assembly configured to support the display panel and the plate and to control a curvature of the plate,
wherein the plate has a first curvature in the touch surface when not installed in the frame assembly, and wherein the plate has a second curvature different from the first curvature when the plate is installed in the frame assembly, and
wherein at least one edge of the top surface is curved.

16. The touch sensing apparatus according to claim 15, wherein a diagonal dimension of the plate is at least 55 inches.

17. The touch sensing apparatus according to claim 15, wherein the second curvature is parabolic, and wherein the first curvature is concave.

18. The touch sensing apparatus according to claim 15, wherein the second curvature is along a first axis and along a second axis perpendicular to the first axis.

* * * * *